(12) United States Patent
Conley et al.

(10) Patent No.: US 11,468,046 B2
(45) Date of Patent: Oct. 11, 2022

(54) BLOCKCHAIN METHODS, NODES, SYSTEMS AND PRODUCTS

(71) Applicant: GEEQ CORPORATION, Waterloo (CA)

(72) Inventors: John P. Conley, Brentwood, TN (US); Stephanie A. So, Brentwood, TN (US)

(73) Assignee: GEEQ CORPORATION, Waterloo (CA)

( * ) Notice: Subject to any disclaimer, the term of this patent is extended or adjusted under 35 U.S.C. 154(b) by 167 days.

(21) Appl. No.: 16/962,361

(22) PCT Filed: Jan. 17, 2019

(86) PCT No.: PCT/IB2019/000046
§ 371 (c)(1),
(2) Date: Jul. 15, 2020

(87) PCT Pub. No.: WO2019/142049
PCT Pub. Date: Jul. 25, 2019

(65) Prior Publication Data
US 2021/0073212 A1   Mar. 11, 2021

Related U.S. Application Data

(60) Provisional application No. 62/618,264, filed on Jan. 17, 2018.

(51) Int. Cl.
*G06Q 20/00* (2012.01)
*G06F 16/23* (2019.01)
(Continued)

(52) U.S. Cl.
CPC ...... *G06F 16/2379* (2019.01); *G06F 16/2255* (2019.01); *G06F 16/2365* (2019.01); *G06F 16/27* (2019.01); *G06Q 10/10* (2013.01); *G06Q 20/06* (2013.01); *G06Q 20/085* (2013.01); *G06Q 20/389* (2013.01); *G06Q 20/3825* (2013.01); *G06Q 20/3827* (2013.01); *G06Q 20/3829* (2013.01); *G06Q 20/38215* (2013.01);
(Continued)

(58) Field of Classification Search
USPC .......................... 705/16, 21, 59; 380/44, 262
See application file for complete search history.

(56) References Cited

U.S. PATENT DOCUMENTS

| 10,970,180 | B2 | 4/2021 | Li et al. | |
|---|---|---|---|---|
| 2005/0157699 | A1* | 7/2005 | Sakai | H04N 21/43615 370/351 |
| 2019/0014124 | A1* | 1/2019 | Reddy | H04L 9/3236 |

* cited by examiner

*Primary Examiner* — Dante Ravetti

(57) ABSTRACT

Proposed is a scalable and computationally light approach to validating blockchains called the Catastrophic Dissent Mechanism (CDM). CDM uses anonymous actors who are free to join and leave the system as they please. The mechanism gives all actors strong incentives to behave honestly, both as individuals, and as members of coalitions who might benefit in compromising the integrity of the blockchain. As a result, CDM offers users Strategically Provable Security (SPS). CDM provides a foundation to create an ecosystem of federated chains which can share heterogeneous tokens using different business logic. As a result, new instances of chains can be created to serve as inexpensive, scalable platforms for a wide variety of blockchain applications and to provide a path for existing instances to be upgraded or altered without the use of hard forks or breaking the rule that code is law.

30 Claims, 14 Drawing Sheets

100

(51) Int. Cl.
*G06F 16/27* (2019.01)
*G06F 16/22* (2019.01)
*G06Q 10/10* (2012.01)
*G06Q 20/06* (2012.01)
*G06Q 20/08* (2012.01)
*G06Q 20/38* (2012.01)
*G06Q 20/40* (2012.01)
*G06Q 40/04* (2012.01)
*H04L 9/30* (2006.01)
*H04L 9/32* (2006.01)

(52) U.S. Cl.
CPC ....... *G06Q 20/405* (2013.01); *G06Q 20/4014* (2013.01); *G06Q 20/4037* (2013.01); *G06Q 40/04* (2013.01); *H04L 9/3073* (2013.01); *H04L 9/3213* (2013.01); *H04L 9/3247* (2013.01); *G06Q 2220/00* (2013.01)

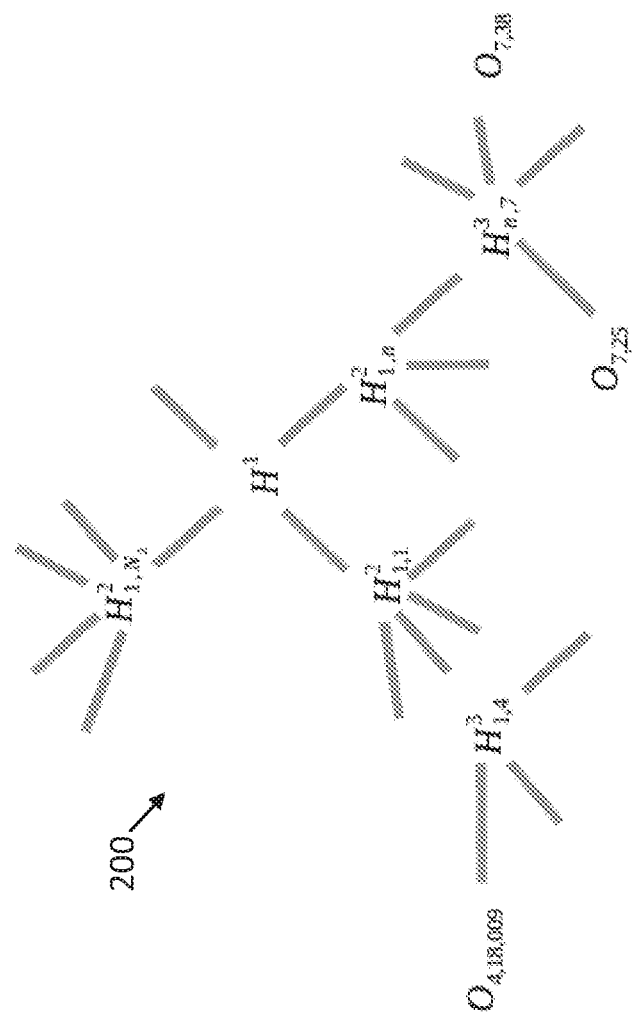
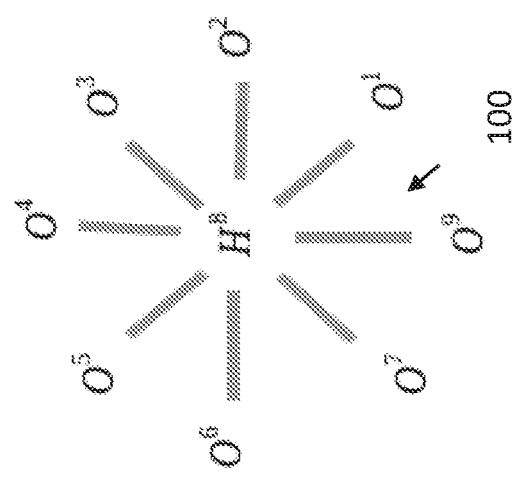

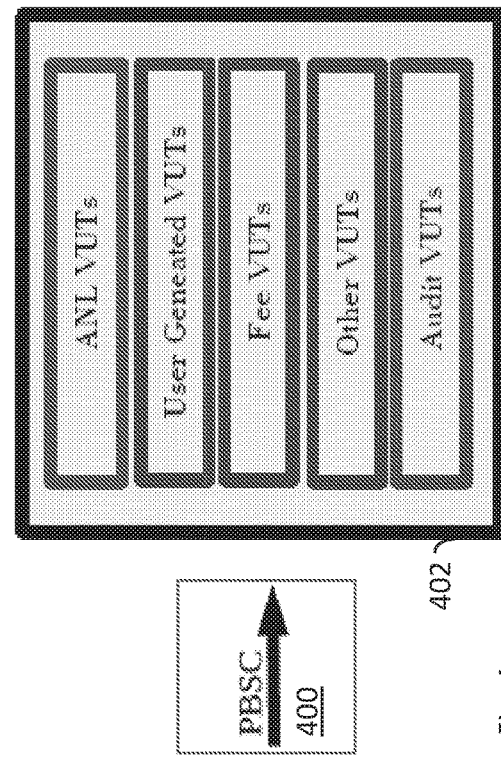
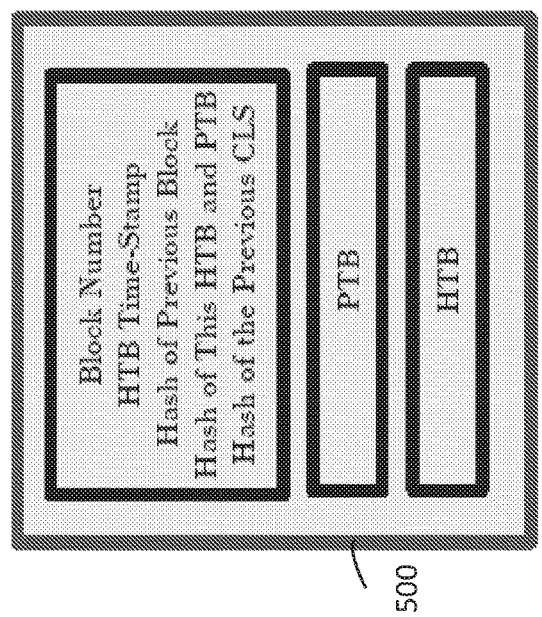
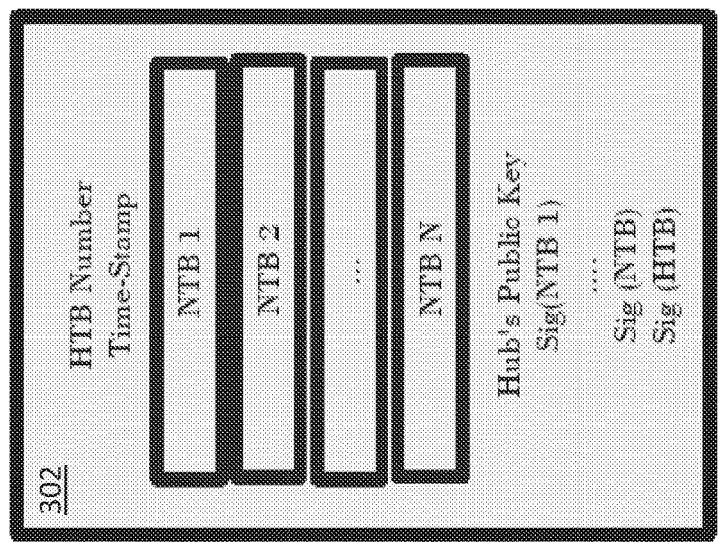
Fig. 4
Fig. 5

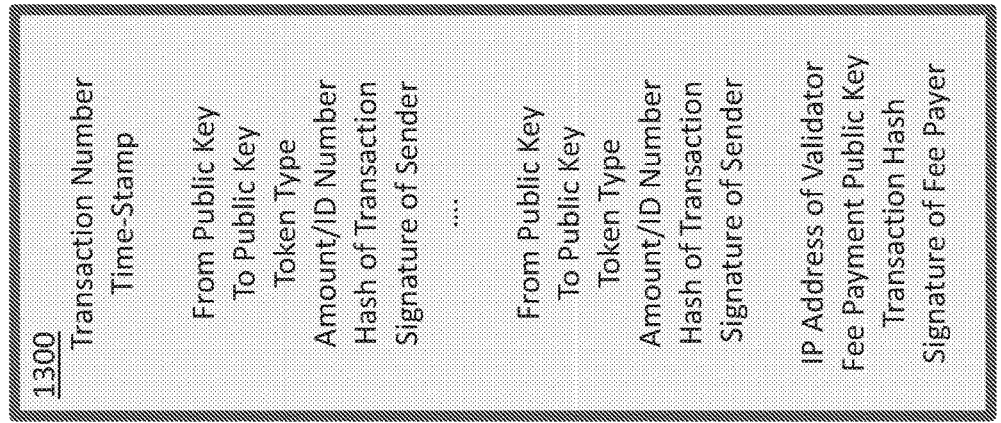

1300
Transaction Number
Time-Stamp

From Public Key
To Public Key
Token Type
Amount/ID Number
Hash of Transaction
Signature of Sender

.....

From Public Key
To Public Key
Token Type
Amount/ID Number
Hash of Transaction
Signature of Sender
IP Address of Validator
Fee Payment Public Key
Transaction Hash
Signature of Fee Payer

Fig. 13

1200
Transaction Number
Time-Stamp
IP Address of Validator
From Public Key
To Public Key
Amount
Transaction Hash
Signature of Sender

Fig. 12

1500
Transaction Number
Time-Stamp

Ledger ID
Data Type
Data
Hash of Data
Signature of Creator
Fee Payment Public Key
Transaction Hash
Signature of Sender

Fig. 15

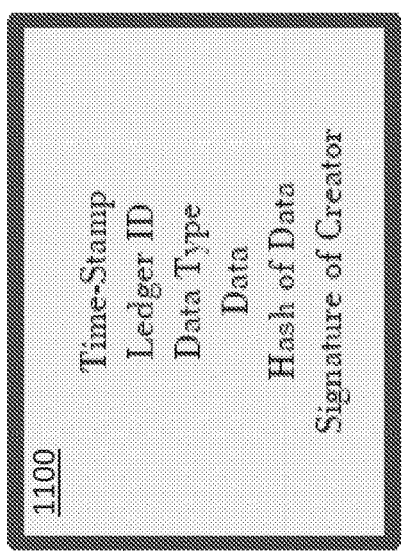

1100
Time-Stamp
Ledger ID
Data Type
Data
Hash of Data
Signature of Creator

Fig. 11

1400
Transaction Number
Time-Stamp

Token Type
To Public Key
To Chain Name
To Node IP Address
Amount/ID Number
Hash of UUT
Signature of Sender
Fee Payment Public Key
Transaction Hash
Signature of Fee Payer

Fig. 14

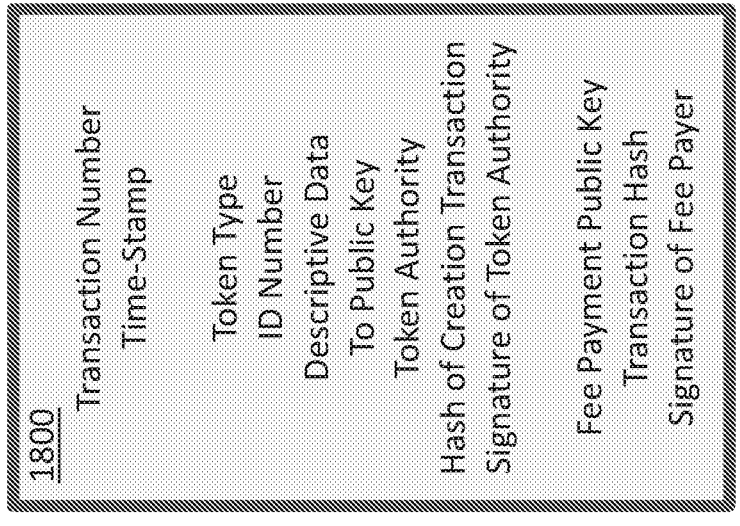

Fig. 18

1800
Transaction Number
Time-Stamp

Token Type
ID Number
Descriptive Data
To Public Key
Token Authority
Hash of Creation Transaction
Signature of Token Authority Fee Payment Public Key
Transaction Hash
Signature of Fee Payer

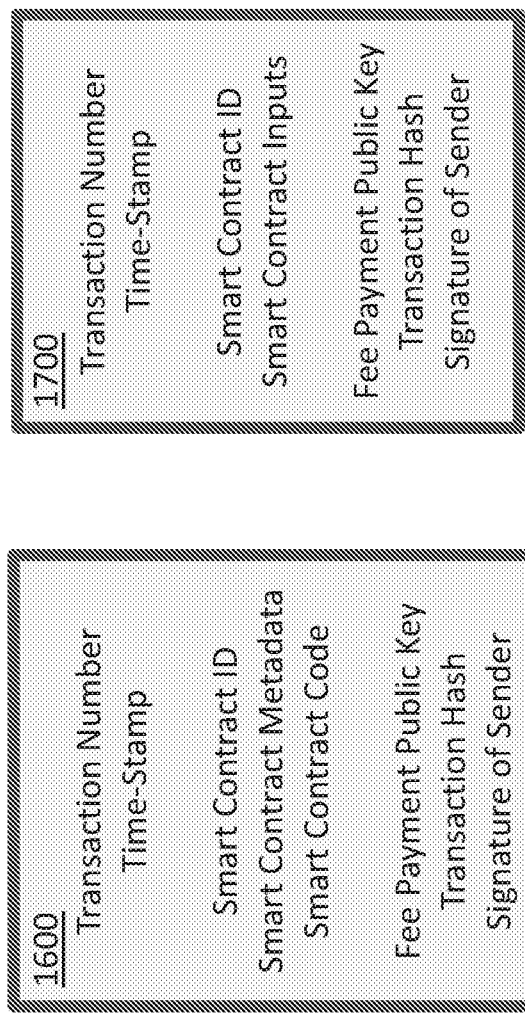

Fig. 17

1700
Transaction Number
Time-Stamp

Smart Contract ID
Smart Contract Inputs

Fee Payment Public Key
Transaction Hash
Signature of Sender

Fig. 16

1600
Transaction Number
Time-Stamp

Smart Contract ID
Smart Contract Metadata
Smart Contract Code

Fee Payment Public Key
Transaction Hash
Signature of Sender

2400
Transaction Number
Time-Stamp
Node's Public Key
Node's IP Address
Action
Transaction Hash
Signature of Sender

Fig. 24

2500
Transaction Number
Time-Stamp
Audit Type
Audit Data
Node's Public Key
Transaction Hash
Signature of Sender

Fig. 25

2600
Transaction Number
Time-Stamp
Token Type
Initiating blockchain entity Public Key
To Public Key
Amount
Transaction Hash
Initiating blockchain entity Signature

Fig. 26

2700
Transaction Number
Time-Stamp
From Public Key
To Public Key
Amount
Transaction Hash
Signature of Sender

Fig. 27

2800
Transaction Number
Time-Stamp
Token Type
To Public Key
To Chain Name
To Node IP Address
Amount/ID Number
Token Destruction Transaction Number
Token Chain Transfer Transaction Number
Hash of CLS for B-2
Hash of CLS for B-1
From Chain Name
Sending Hub's Public Key
Sending Hub's IP Address
Transaction Hash
Signature of Sending Hub

Fig. 28

2900
Transaction Number
Token Type
To Public Key
Amount/ID Number
Full Incoming Token Transfer UUT

Fig. 29

Transaction Number
From Public Key
To System Public Key
Amount
Original Transaction Hash
Signature of Sender
3000

Fig. 30

Transaction Number
From Public Key
To Public Key
Amount
3100

Fig. 31

Transaction Number
ANL transaction number
From Public Key
To Public Key
Amount
3200

Fig. 32

Transaction Number
Audit Type
Audit Data
UUT Transaction Hashes
Auditing Nodes' Public Keys
Failed Nodes' Public Keys
3300

Fig. 33

Transaction Number
From Public Key
To Public Key
Amount
Audit VUT Hashes
3400

Fig. 34

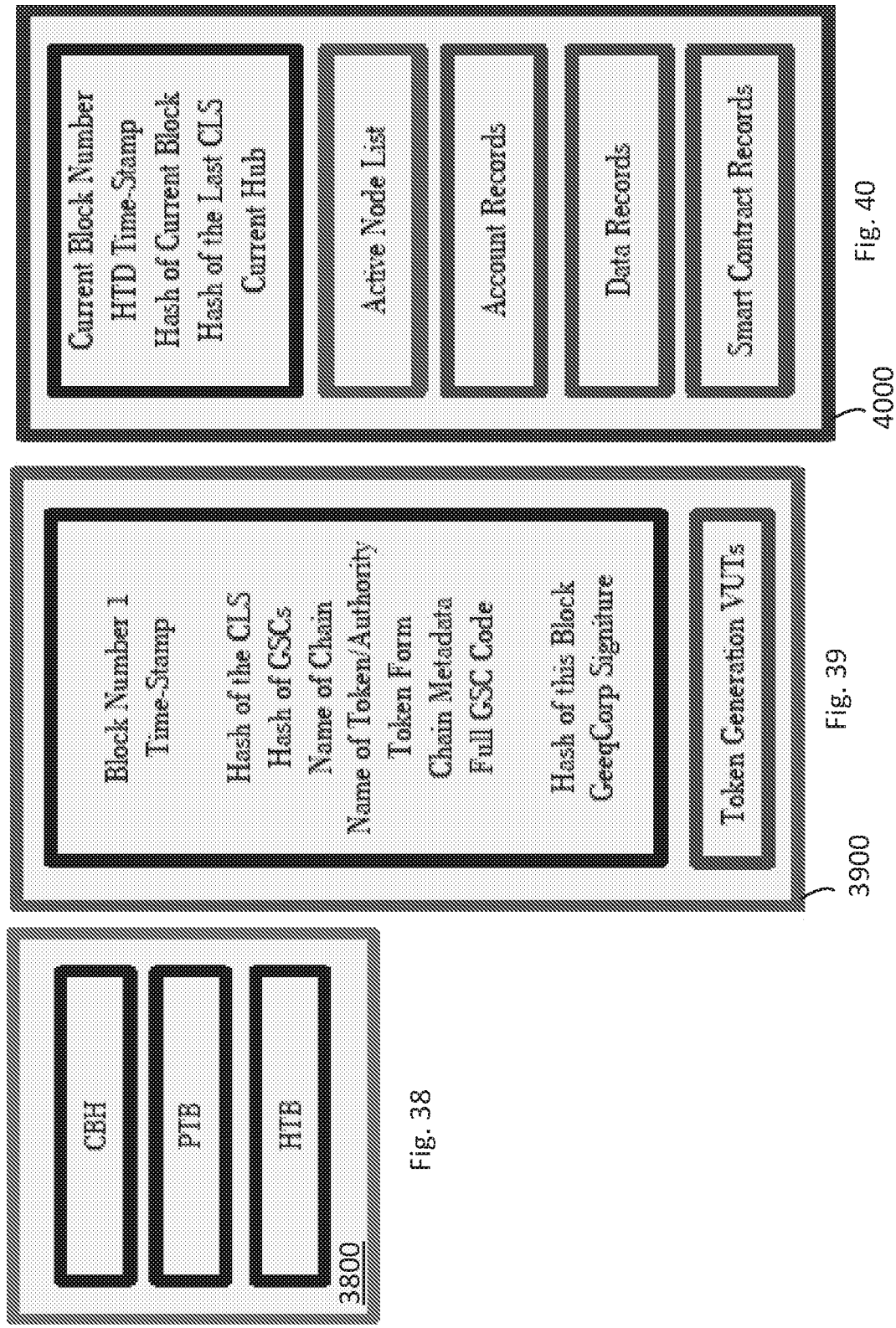

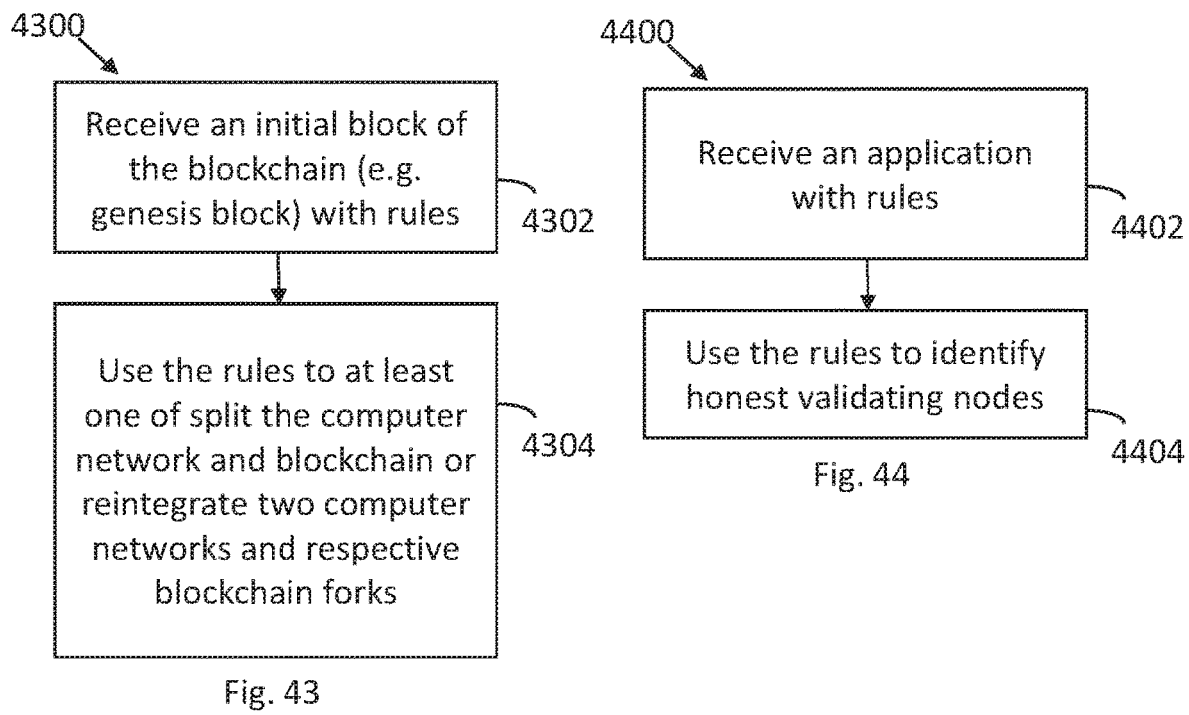
Fig. 43
Fig. 44
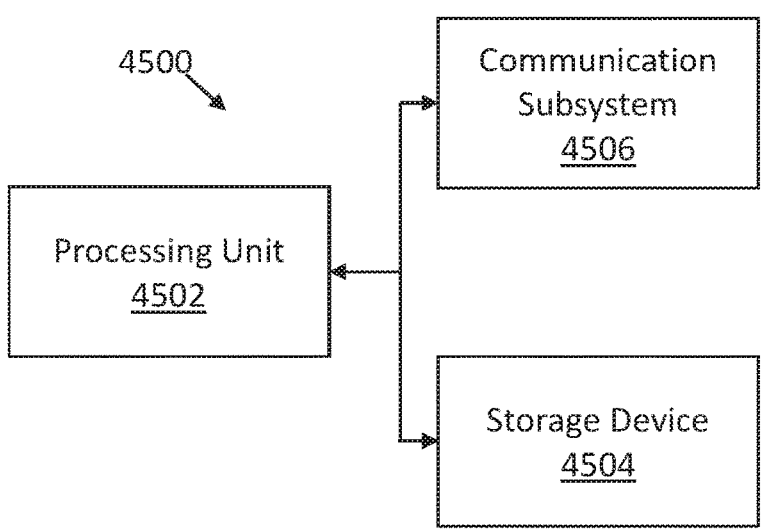
Fig. 45

BLOCKCHAIN METHODS, NODES, SYSTEMS AND PRODUCTS

CROSS-REFERENCE

This application claims, in respect of the United States, the domestic benefit of, and in respect of all other jurisdictions, priority to U.S. Provisional Application No. 62/618,264, filed Jan. 17, 2018, and entitled "Blockchain Methods, Nodes, Systems And Products", the entire contents of which is incorporated herein by reference where permitted.

FIELD

The present disclosure relates to computers and computing including computer networks and distributed databases, and more particularly to blockchain methods, nodes, systems and products.

BACKGROUND

Traditional databases are maintained on private servers by central authorities who control access, grant permission to alter, update and delete records, and who are ultimately responsible for the accuracy of the data. Trusting such data is equivalent to trusting in both the honesty and the security competence of these central authorities.

Blockchains (or chains) are append-only, distributed ledgers. No central authority owns or controls the data. Users send requests to write new records to a set of decentralized, often anonymous, nodes who must come to a consensus on their validity. Nodes are computers on a network that participate in validating transactions and writing blocks of transactions to the chain. Depending on the blockchain and approach to validation, nodes are called miners, stakeholders, delegates, or voters, among other things. Humans (who we call agents) own these computers and make them available to the network. An agent may be the owner of several nodes, or may simply be a user who makes transactions on the blockchain but does not provide validation services.

Once a record is written to a block and committed to the chain, it becomes both immutable and nonrefutable. The cryptographic signatures and recursive hashing of blocks make it impossible to delete, alter, or claim that one never agreed to the contents of a record. If a blockchain is public and transactions are written in cleartext (as they are in Bitcoin), records in the chain can be independently verified by any user who wishes. If copies of the chain are stored in many places, it becomes almost impossible to censor or prevent access to the data it contains.

Blockchains allow agents to cooperate without the need to trust in the honesty or good behavior of one another or any third party. For example, Bitcoin's transaction protocol ensures that a sender has enough tokens in his account to cover a transfer and, once the transfer is made, the receiver can be secure in the knowledge that it cannot be reversed. Ethereum's smart contracts permit even more sophisticated interactions between users without the need for mutual trust. (It should be noted, however, that the Ethereum smart contracts have also led to a number of significant security issues. For example, on Jun. 17, 2016, a coding error in the smart contract supporting the DAO resulted in a theft of 3.4M ETH worth $53M. More recently (Nov. 6, 2017), a coding error in the Ethereum smart contract supporting Parity's multi-signature cryptocurrency wallets locked up accounts holding over 500 k ETH worth $150M.)

Unfortunately, the promise that blockchain holds to create decentralized and trustless ways to share information and improve distributed business processes is limited by several factors. Some approaches (Bitcoin and Ethereum, for example) have high transactions fees that are a consequence of their security models. Others (such as Hyperledger fabric, and Iota's tangle protocol) have lower transactions costs, but offer lower levels of security, have central points of failure, or depend on some degree of trust in the validators. The ability to scale to large numbers of transactions per second, fix bugs, and upgrade to better and more flexible protocols are also limited on existing blockchain platforms.

GeegChain™ offers a new approach to blockchain based on game theory and economic mechanism design. (GEEQ and the family of GEEQ marks, including GeeqChain, GeeqCoin, GeeqCoins, GeeqToken, GeeqTokens as well as Catastrophic Dissent Mechanism, CDM, Good Behaviour Bond, GBB, Good Behaviour Bonds, GBBs, Governing Smart Contract, GSC, Governing Smart Contracts, GSCs, Strategically Provable Security, SPS, Proof of Due Diligence, PoD, Proof of Honesty, PoH, Proof of Integrity, PoI, Society of Things, SoT and others are trade-marks of Geek Corporation. All rights are reserved and no license or other right of use is given. Though the subject matter herein disclosed is with reference to certain trademarks for convenience, no limitation to the teachings herein is expressed or implied such as any requirement to use of any of the trademarks to infringe any claim). GeeqChain is secure, cheap, fast, and scalable. It can be implemented with fully anonymous verifying nodes, no centralized points of trust or failure, and with any level of encryption and privacy protection desired. The protocol allows the creation of an ecosystem of federated chains that can safely share GeegCoins™, but which can support very different types of internal business logic. This makes GeeqChain suitable for a wide variety of use cases, allows for upgrades and bug fixes without breaking protocol or instituting hard forks, and offers an alternative to Ethereum's ERC20 standard for startups wishing to create new platforms in order to take advantage of blockchain's potential.

SUMMARY

GeeqChain is a scalable, inexpensive, computationally light, approach to validating blockchains using a new protocol called the Catastrophic Dissent Mechanism (CDM). The CDM uses anonymous actors who are free to join and leave the system as they please. The mechanism gives all actors strong incentives to behave honestly, both as individuals, and as members of coalitions who might benefit from compromising the integrity of the blockchain. If there is at least one honest node, it will write an honest block to a valid chain. Users are able to discover honest chains and will always choose it for their transactions. Dishonest chains become orphaned. In other words, GeeqChains protect the integrity of blocks and transactions using Proof of Honesty rather than Proof of Work or Proof of State. If even one node is honest, no tokens can be stolen from rational users. As a result, GeeqChain is 99% Byzantine Fault Tolerant (BFT) and achieves consensus by checking for lack of dissent rather than affirmatively trying to establish unanimity.

We further develop a communications protocol and a system of self-enforcing audits that imply that honest behavior on the part of all nodes is the only coalition-proof equilibrium of the validation mechanism. That is, even if nodes are free to communicate, collude, and conspire to act in unison, any self-interested coalition will find that honest behavior gives its members the highest possible payoff. As a result, the CDM creates a blockchain with Strategically Provable Security.

The CDM is a flexible protocol which allows new instances of GeeqChains to be created and then specialized in a number of ways. In particular, it is easy to construct federated instances of GeeqChains such that tokens can move across them all. This brings three key advantages to GeeqChain First, it is possible to split a GeeqChain into two or more federated instances and partition the user accounts among them. As a result, GeeqChain is infinitely scalable. If the transactions load becomes too large for one chain to handle, new federated instances can be created until each handles an efficient number of transactions per second. Federated instances can also be merged if transactions volume drops off. Second, new instances of federated chains that use protocols that are different from the basic CDM outlined here, or which contain upgrades or bug fixes, can be created. Users and validators can choose to remain on the original chain or migrate to the new one. As a result, improvements, alterations, and fixes can be implemented without breaking protocol or creating hard forks. In addition, this does not require a complicated governance structure to implement. Anyone can offer an alternative federated chain, and users and validators can vote with their feet if they agree it would be better to use the new chain than continue to use the original one. Finally, federated instances of GeeqChain can also work with tokens besides GeeqCoin, using many different types of business logic. As a result, GeeqChain offers a flexible alternative to Ethereum's ERC20 standard to build new blockchain platforms.

Perhaps the most import aspect of GeeqChain is that it offers this level of security and flexibility at extremely low cost. It is not burdened by large networks doing proof of work or stake-holders that need to be compensated for posting large bonds. Validating networks of arbitrary size can be used, but each node can still be run on a standard home computer using existing broadband connections. The cost of validating transactions on a 100 node network is less than 0.06¢ and scales up linearly with the number of nodes. This creates large potential for revenue in every application or, alternatively, opportunities to provide services on a large scale for much lower costs.

In conclusion, the GeeqChain platform using the CDM protocol solves the most significant outstanding problems facing Blockchain today. GeeqChain can scale to handle arbitrary numbers of transactions per second. GeeqChain can be deployed as a system of federated chains that share a common token or which interact with heterogeneous tokens using different business logic. GeeqChains can be upgraded or altered without the use of hard forks or breaking the rule that code is law. GeeqChain can be implemented with enough anonymity and decentralization to protect user privacy and satisfy most cryptoanarchists, or to comply with KYC, AML and other regulatory requirements. Finally, GeeqChain offers an unprecedented level of transaction verification security at a lower cost than any existing platform.

Unless otherwise expressed herein explicitly, the various subject matter taught herein is independent and may be practiced alone or in various combinations with each other, with minor apparent modifications as may be necessary. For example, aspects of the CDM protocol may be practiced with other network topologies other than a hub and spoke topology. While a random hub and spoke topology is described to randomly share the burden of a hub and to provide security advantages, a non-random hub and spoke topology may be adopted. Various fee models may be adopted.

BRIEF DESCRIPTION OF THE DRAWINGS

The present inventive concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light. More than one inventive concept may be shown and described and each may stand-alone or be combined with one or more others unless stated otherwise.

FIG. 1 is an illustration of a network topology including a plurality of nodes in accordance with an example.

FIG. 2 is an illustration of a network topology including a plurality of nodes and three layers of hubs in accordance with an example.

FIG. 4 a processing of an HTB 302 by a PBSC 400 to produce a PTB 402 in accordance with an example.

FIG. 5 is an illustration of the major components of a header created by a Block Commitment Smart Contract (BCSC) in accordance with an example.

FIG. 11 is an illustration of the major components of a Stored Data Record (SDR) in accordance with an example.

FIG. 12 is an illustration of the major components of a Simple Unverified User Transaction (UUT) in accordance with an example.

FIG. 13 is an illustration of the major components of a General UUT in accordance with an example.

FIG. 14 is an illustration of the major components of a Token Chain Transfer UUT in accordance with an example.

FIG. 15 is an illustration of the major components of a Data UUT in accordance with an example.

FIG. 16 is an illustration of the major components of a Smart Contract Creation UUT in accordance with an example.

FIG. 17 is an illustration of the major components of a Smart Contract Call UUT in accordance with an example.

FIG. 18 is an illustration of the major components of a Unique Token Creation UUT in accordance with an example.

FIG. 24 is an illustration of the major components of an Active Node List UUT in accordance with an example.

FIG. 25 is an illustration of the major components of an Active UUT in accordance with an example.

FIG. 26 is an illustration of the major components of an Initial Token Generation Verified User Transaction (VUT) in accordance with an example.

FIG. 27 is an illustration of the major components of a Simple VUT in accordance with an example.

FIG. 28 is an illustration of the major components of an Outgoing Token Transfer VUT in accordance with an example.

FIG. 29 is an illustration of the major components of an Incoming Transfer Confirmation VUT in accordance with an example.

FIG. 30 is an illustration of the major components of a Simple Fee Payment VUT in accordance with an example.

FIG. 31 is an illustration of the major components of a Simple Fee Distribution VUT in accordance with an example.

FIG. 32 is an illustration of the major components of a Good Behavior Bond (GBB) Distribution VUT in accordance with an example.

FIG. 33 is an illustration of the major components of an Audit VUT in accordance with an example.

FIG. 34 is an illustration of the major components of an Audit Reward VUT in accordance with an example.

FIG. 38 is an illustration of the major components of a Full Verified Block (FVB) in accordance with an example.

FIG. 39 is an illustration of the major components of a Genesis Block (GBL) in accordance with an example.

FIG. 40 is an illustration of the major components of a Current Ledger State (CLS) in accordance with an example.

FIGS. 41-44 are flowcharts showing example operations.

FIG. 45 is a block diagram of a computing device.

DESCRIPTION

Figure 3A:
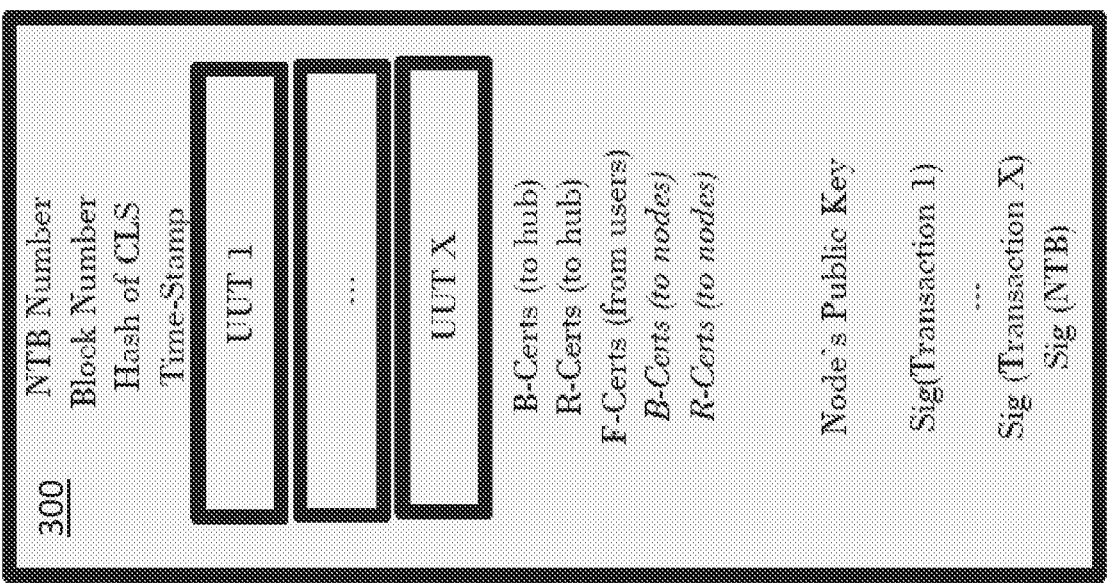
FIGS. 3A and 3B are an illustration of the major components of a Node Transactions Bundle (NTB) and a Hub Transactions Bundle (HTB) in accordance with an example.

The teachings herein provide at least the following:
Genesis Block:
1. Tight control of protocol makes federated chains possible with tokens moving over all instances of GeeqChain.
2. Putting the GSCs in the GB fixes the rules of the chain forever. This allows "code is law" to be checked by users and enforced.
3. Putting GSC into the CB also fixes the method of issuing tokens and protects users from inflation due to unexpected token creation.
4. Allows the encoding of GeeqCorp's business model with automatic payments and licensing fees coming to GeeqCorp by fixed GSCs.
5. Allows custom business logic for almost any purpose using native tokens, data items, and smart contracts to be coded into different GBs. This is a more flexible alternative to Ethereum's ERC-20 and ERC-23 approach to allowing applications to be built off of Blockchain platforms. GeeqChain applications are independent and do not refer to a central instance for validations. ERC-20 applications all ultimately must depend on the Ethereum's pool of miners for transactions validation.

Federated Chains:
6. All FCs have the ability to send and receive GeeqCoins directly to and from other instances without the use of a central clearinghouse chain (as they must do in Ethereum's "Polka-Dot" proposal).
7. Automatic splitting of GeeqChains with high transactions volume allows GeeqChain to scale up to arbitrary levels of transactions validation per second by splitting the load. As a result, GeeqChain is infinitely scalable.
8. Merging of GeeqChains can be done if the transaction load declines.
9. If forks of an instance of GeeqChain come into existence, the divergent blocks can be reconciled and the forks merged. This is unlike any other protocol since the rule is always that the longest fork is definitive and all divergent blocks in shorter forks are orphaned and the transactions they contain rendered null and void.
10. Instances of GeeqChain can set their own rules to allow or disallow native tokens and data items to move on to and off of other chains
11. All transactions fees for validation are paid with GeeqCoin which can move over all instances of GeeqChain. Native tokens can be used to pay for services or any other purpose on instances of GeeqChain.
12. Upgrades or changes of the rules governing a GeeqChain cannot be made directly. Code is always law. However, a new instance of genesis block with upgrades and changes can be created and users on the original chain offered a chance to voluntarily migrate. That is, users can vote with their feet. Those who wish to stay may not be allowed to interact with the new chain after a period of time for security or other reasons, however if they wish to continue under the old rules, nothing prevents them from doing so.
13. This makes GeeqChain "Quantum-Ready". If quantum computing renders PKK encryption insecure, new genesis blocks for existing applications but using quantum encryption techniques can be created. Users will be asked to move, but after a time, the migration route will be closed since the coin transactions on PPK based chains will no longer be secure.

Network:
14. The (NTSC) Network Topology Smart Contract creates a random hub and spoke network to validate each block. This may include many layers of hubs or may permit only a random subset of nodes to participate in each one. This is done automatically to maximize the network's efficiency and security.

15. The NTSC hub and spoke approach is also different from the conventional Peer-to-Peer gossip networks used by Bitcoin, Ethereum, and other blockchains. It is more efficient and also does not rely on any central DNS server or routing table. It runs in an entirely decentralized way.

16. The (NCSC) Network Communications Smart Contract is provided as compiled code and contains a private key use to sign messages. Nodes communicate only indirectly and are always mediated by the NSSC. Any messages sent directly or in any other way are not valid within the protocol and can be identified due to their lack of an NSCS signature.

17. The NCSC also uses a novel system of "Certs" that make it both verifiable and provable that messages were sent and received by actors on the network. This is part of what gives us SPS.

18. The (LCSC) Lost Contact Smart Contract is a novel approach to solving the problem of network unreliability. Groups of nodes can lose contact with one another and the LSCS encodes a protocol that allows subnets to continue to function honestly until they reestablish contact. This is what allows GeeqChain to escape the CAP Theorem, a fundamental result that tells us that if we insist that all nodes in a network communicate and agree on a ledger update, we cannot guarantee that consensus will be achieved in finite time.

19. The CDM uses the (ANSC) Active Node Smart Contract to build and maintain the set of validating nodes on a given chain. This is novel in at least two important ways. First, the ANSC writes an Active Node List (ANL) into each block that is verified. This is different from Bitcoin and Ethereum (and I think all other blockchains) where nodes are discovered by consulting webpages, IRC channels, doing Google searches, or by participating in s gossip network. Second, agents that wish to join the network do so through a transaction submitted to a node in the existing network. They can also leave the network and suspend or rejoin the network in the same way. This makes several things possible. It makes nodes easy to discover, and forks easy to identify. It allows audits that confiscate good behavior bonds from dishonest nodes to be executed. It keeps this information decentralized since it is kept separately and independently by each node. There is no central router, table, webpage, or IRC channel needed.

Verification:

20. Using economic mechanism design to get honest (SPS) validation of transactions. We do not use a Byzantine Fault Tolerant (BFT) approach, common to all other blockchains which postulate a fraction of honest nodes. The CDM does not assume any validating nodes are inherently honest or altruistic. Instead, it assumes that all nodes act in their narrow self-interest and creates a mechanism or game structure such that it is in the best interest of nodes to behave honestly at all times.

21. Implementing truth-telling by nodes in Coalition-Proof Equilibrium (CPE) on a blockchain. The CDM has only one equilibrium. Many blockchain systems have several, even an infinity. Under the CDM, the only equilibrium is truth-telling by all nodes. CPE is stronger than Nash or dominant strategy equilibria sometimes discussed in blockchain and other computer science contexts which refer only to a single agent's best response and ignores the possibility of manipulation by coalitions of agents. CPE means that even if all nodes could communicate and coordinate their actions, the most profitable action they could take collectively is to validate transactions and blocks honestly. (GeeqCorp calls this Strategically Provable Security (SPS)).

22. In some blockchain protocols, dishonest validation is detectable from the data in the chain. However, blockchain platforms do not specify what a user or node can do about it if enough of the nodes are dishonest. The CDM uses a (BASC) Blockchain Audit Smart Contract that permits uses, nodes, and independent agents who notice dishonest or out of protocol behavior submit audits. Dishonest nodes are tossed out of the ANL and the dishonest chains they created are orphaned 23. Although bundles of unverified transactions are sent out to all nodes by a hub, each node individually verifies the transactions and constructs the blocks. All nodes also get paid transactions fees each for each block. In all other protocols a SINGLE node writes a block which is transmitted over the network and accepted by other nodes. In PoW, the miner who finds the nonce first proposes the next block, and in PoS, a delegate typically proposes a block which might then be voted on and approved by other nodes. Often, only the block proposer is rewarded with transactions fees and block rewards. CDM a fundamentally alters the creation of incentives.

24. This means that smaller amounts of data are sent over the network. Instead of full blocks, only unverified transactions are sent. Fee transactions, smart contract results, audit results and so on are all calculated locally by each node and written to the local version of the blockchain. The full blocks are never transmitted over the network.

25. This also means that all nodes are truly equal. Each node generates its own view of the block and current ledger state. Collectives, such as mining pools that may be able to write most of the Bitcoin blocks, are not possible under the CDM Similarly, dishonest stake-holders cannot nominate one of their own to write a block or out vote honest stake-holders.

26. The CDM depends on unanimous agreement on the ledger state rather than majority voting or proof of work. Since the network will generally not make it possible to obtain a vote in a timely way from each and every node (see the CAP Theorem), this is implemented through a lack of dissent. "Unanimity through lack of dissent" is at the core of the CDM.

27. Proof of Honesty (PoH) makes this possible. If a dissenter (which may be a node, a user, or other agent) does not agree that a block or ledger state is correct or honest, that claim can be checked and proved. That is, nodes in the ANL can be called upon to prove their honesty through audit.

28. If a single honest node exists, there will also exist an honest fork of the chain. The CDM creates incentives that make it more profitable for a node to be honest than dishonest and for users to refuse to interact with dishonest forks. In other protocols, no valid and honest fork of a chain will exist if enough (even as little as a majority) of nodes are dishonest.

29. The (CRSC) Catastrophic Recovery Smart Contract allows the CDM to deal with the out of equilibrium event that ALL nodes are dishonest and NO honest fork exists. Users can invoke the CRSC to reestablish an honest fork. No other blockchain has such a recovery protocol.

Protocols:

30. Due diligence is an essential element to the CDM in several ways.
   a. Users are required to perform checks of the integrity of the blockchain they wish to use for transactions. They present a Proof of Due diligence (PoD) to the NCSC with any transaction. If the user has in fact done the due diligence required, then the message is sent to the validating node. Otherwise it is discarded.
   b. User clients execute due diligence actions as a background process by default. The level of effort can be adjusted up or down by users.
   c. If forks of a chain exist, users are responsible to choose between them. Users are responsible for determining which fork is honest and to send their transaction there. This is also fundamental and novel. In other protocols, the longest fork, honest or not, is considered definitive. In practice, nodes choose which fork to add a block.
31. The (SCSC) Sanity Check Smart Contract is invoked by nodes to check that incoming user transactions are credible before it sends them on to the network. PoD and the SCSC together limit spam on the validating network.
32. Node Clients are designed to run automatically without human intervention.
33. User Clients incorporating the GSC may be customized in any way to suit the business logic or user case of a given application built on GeeqChain.

I. GeeqChain

GeeqChain provides the Catastrophic Dissent Mechanism™ validation protocol (CDM™).

a) Security

All the advantages that blockchain offer depend on honest transaction verification and block-writing. Bitcoin and Ethereum use a network of "miners" and a Proof of Work (PoW) protocol to establish the integrity of their ledgers. In the case of Bitcoin, block-writing rewards and transactions fees create incentives for honest behavior. Provided that more than 50% of the miners are moved by these incentives, the chain is difficult to corrupt (more accurately, if miners controlling more than 50% of the network's hashing power are honest, then the chain is difficult to hijack). As a result, the Bitcoin protocol is said to have a Byzantine Fault Tolerance (BFT) of 50% (however, Eyal and Sirer (2014) describe a type of coordinated attack by miners holding only 25% of Bitcoin's hashing power that can compromise the blockchain, implying that Bitcoin is only 25% BFT). We discuss the value of BFT as a measure of security in more detail below.

Proof of Stake (PoS) is the other main approach to verification. Several banks, for example, might set up a private blockchain in which the members vote on whether a new block is correct and should be added to the chain More generally, users might become voting stakeholders by posting bonds, providing services to a platform, being nominated as a delegate by other users, and so on (there are also many hybrid approaches that use combinations of PoW and PoS or even more complicated means of choosing agents to verify transactions). Depending on the implementation, PoS approaches are both cheaper and more scalable than PoW. Unfortunately, PoS depends on the majority of stakeholders behaving honestly. The number of voting stakeholders (tens or hundreds) is typically much smaller than the number of validating nodes (tens of thousands) used by PoW blockchains. This makes collusion by validators much more likely and so it is not clear how much confidence 50% BTF should give us in this case. (If a fixed set of stakeholders validate a blockchain, then honest behavior depends on the incentive structure faced by these specific agents. For example, one might be confident that the reputational damage that dishonest behavior would do to Bank of America or Deutsche Bank is enough to make them behave correctly. When voting stakeholders can choose actions that affect their voting power, however, dishonest agents, who have the most to gain from subverting the blockchain, have the greatest incentive to expend the effort required. Thus, protocols that use escrowed tokens or Proof of Effort of some kind may end up systematically choosing dishonest validators. BFT loses its meaning as a measure of security in such cases.)

In PoW protocols, nodes are generally run by anonymous agents. The principle of one CPU, one vote, applies. Any agent or CPU who is willing to bear the computational cost of trying to mine a block can join the validation network anonymously and as an equal. The hope is that this cost prevents Sybil attacks in which many "fake" identities are created in order to gain majority control of the validation process. If votes must be paid for with work, then it should be too costly to mount such an attack.

In practice, many Bitcoin and Ethereum nodes are owned by the same real-world agent or are part of mining pools in which hardware may be owned by different agents but which coordinate their efforts and share rewards. Many pools have chosen to self-identify which makes them vulnerable to pressure from state-actors or others. Mining pools are so concentrated at this point that if no more than three were to collude, they could mount a successful 51% attack. In effect, Bitcoin is not validated by thousands of nodes but depends on the honesty of three or fewer agents. Put another way, if Bitcoin has 10,000 nodes, an attack by only three agents would be successful. In a real sense, this means that the BFT of Bitcoin is only 3/10,000 or 0.03%.

In PoS protocols, there are a variety of ways that agents can become validators. In many cases, the stake that is supposed to guarantee good behavior is the validators' real-world identity. For example, in a private blockchain created for a small group of banks, it is seen as unlikely that any of them would sacrifice their reputations in order to falsely verify transactions. It is seen as even more unlikely that 5 out of 8, or 26 out of 50, would simultaneously become dishonest. Of course, Proof of Stake begs the question of why a blockchain is needed at all. If a group of firms mutually trust one another, why is there a need to create an immutable record validated by a complicated PoS algorithm? There are two problems with this. First, as above, if the identity of the validators is known, they can be pressured by state-actors to break validation protocol in support of legal judgments or state policy. Second, it may very well happen that several banks merge or find they are in financial difficulty at the same time. Since all the participating banks are in the same sector, their economic fortunes are highly correlated. In a recession or financial crisis, all banks are likely to be under financial pressure, such as a threat of bankruptcy or the possibility of being taken over by the Federal Reserve (or equivalent). It would not be at all surprising if a financial crisis, such as the one that began in 2007, were to result in five out of eight banks in a PoS blockchain being placed under federal supervision or forced to merge. Bank officers might be willing to take desperate measures to survive. The threat of a lost reputation may not be much of a deterrent to a bank or any firm facing an existential crisis. It is not that hard to imagine the possibility of collusion by a majority of validators in such a case.

Even if stake-holders are anonymous and numerous, we still run into the same concentration problem as we see in PoW protocols. If the profit a validator gets from posting a bond is worth it, why not post the same stake under many identities? At worst, each identity makes enough profit to pay for the cost of posting the bond. Creating enough identities to gain the majority of the total voting stake makes it possible for a single real-world agent to take over the blockchain. It is only the threat of out-of-protocol actions that create a disincentive to make such an attempt (see footnote 8).

In most blockchain protocols including Bitcoin, Ethereum, and GeeqChain, network latency, failures, and attacks can create communications delays or even cut parts of the network off from one another. This can result in a "fork" in which two different blocks are built on top of the same initial chain by different sets of nodes in the network. That is, while all nodes may hold identical copies of the chain up to block number B, subsets of nodes may end up adding a B+1 block that contain differing sets of transactions. Having two conflicting versions of a blockchain ledger is untenable. Something has to be done to choose which one is definitive or else users might try to spend coins on each of the chains Since users' accounts exist on both forks, such double spending would not be detected as fraudulent.

The traditional solution used by Bitcoin and Ethereum requires that the next miner who completes a block adds it to the longest fork of the chain. If both forks are of equal size, the miner is allowed to choose either one. Eventually, one fork gets ahead, and the shorter fork is "orphaned". All the blocks that were added after the forks diverged are ignored along with the transactions they contain. The choice of which fork to use is ultimately up to miners who find new blocks, but protocol requires that they follow these rules.

GeeqChain uses the CDM which takes a completely different approach to validation using Proof of Honesty™ (PoH™) Each node validates transactions, builds blocks, and publishes them for users to inspect. These blocks contain enough data for users to independently verify that the chain is "honest" in the sense that it contains only valid transactions and that the chain as a whole follows protocol. If one or more forks exist, the user is able to inspect them and then decide which one he wishes to use for his transactions. In other words, nodes and the chains they build are provably honest or dishonest. The CDM places the responsibility for choosing between forks in the hands of users who hold tokens on the chain and who would therefore be harmed if false transactions were written into "verified" blocks. Thus, Bitcoin and Ethereum protocols for handling forks have an inherent conflict of interest built into their protocols since validating nodes who may benefit from writing false transactions choose which fork to add newly mined blocks to GeeqChain's CDM protocol, on the other hand, makes this choice incentive compatible by leaving it to users.

Without further elaboration, this simple idea gives the GeeqChain a BFT of 99%. That is, if even a single honest node exists, then users will discover it and choose to write their transactions to the chain it verifies. While this is far better than any other protocol, GeeqChain aims higher.

The CDM uses a kind unanimity game, but turns it on its head. Specifically, the CDM achieves consensus by checking for a lack of dissent rather than attempting to affirmatively establish unanimous agreement that a block is valid. If a user or node detects any dishonesty he can send an audit request to the network. If dishonesty is verified, misbehaving nodes are ejected from the validation network and Good Behavior Bonds™ (GBBs™), previously posted in order to join the network, are forfeited and used to pay rewards to the agents who called for the audit. These audits and rewards combine the certainty that dishonest behavior will be detected (due to the network protocol and the design of a set of Governing Smart Contracts™ (GSCs™) effectively blockchain constating documents), to create an incentive structure that makes it impossible for agents, even working in coordinated coalitions, to profit from dishonest behavior. As a result, truthful validation by all nodes is a coalition-proof equilibrium (in fact, the only one). In effect, GeeqChain is 100% BFT and offers users Strategically Provable Security™ (SPS™) for blockchain validation.

b) Cost

Consider a GeeqChain processing 40 transactions per second and writing blocks every 10 seconds. This is a higher transaction volume than either Bitcoin or Ethereum are capable of. Further suppose that these transactions are validated on a network consisting of 100 nodes. This is far fewer than the 32,000 or so nodes on the Ethereum network or the 10,000 or so Bitcoin nodes. On the other hand, it is greater than the 25 or so nodes that validate some implementations of the Hyperledger fabric protocol and other PoS consensus systems. Finally, suppose that an average transaction contains 0.5 kB of data, roughly in line with Ethereum and Bitcoin transactions.

Using high-side estimates of the amount of bandwidth, compute cycles, storage and of the costs of these resources, we find that the total cost validation on the network outlined above to be less than $0.0006 per transaction. As an example, a transaction of $0.1 could be validated, committed, and stored on this CDM blockchain for less than $0.0006. In contrast, Ethereum transactions cost on the scale of $0.15 or more and Bitcoin transactions fees can run to several dollars. (PoW is extremely resource-intensive. It is estimated that $400M or more is spent every year in electricity and computational effort to mine blocks and verify Bitcoin transactions. As a result, bitcoin users must pay several dollars in transactions fees to attract the attention of miners and must often wait for hours or days to have transactions finalized.) The cost per transaction scales linearly in the number of nodes. As a result a GeeqChain that uses N nodes in its validation network, can process a transaction for less than $6N×10$^{-6}$. We explore the implications of this fact in more detail below.

c) Scalability

One of the most serious limitations of existing blockchain protocols is scalability. Estimates are that the maximum number of transactions per second is 7 for Bitcoin, 15 for Ethereum, 60 for Dash, 30 for Monero, and 20 for lite coin. Average block completion time ranges from 10 seconds to 10 minutes. Even then, transactions are not considered finalized until they are buried several blocks deep in the chain (six or more for Bitcoin and 250 or so for Ethereum) (https://www.cypherium.io/index.php/2017/03/26/why-scalability-matters/). This means that even if user transactions are immediately picked up by a validating node and included in the next block, it still takes an hour more for the transaction to be considered final. Gou (2017) notes that "as of June 2017, there are more than a quarter million unconfirmed transactions within the Bitcoin network mempool. Executing a single Bitcoin transaction can take between a few hours to a few days, with transaction fees averaging several dollars and rising with the increasing demand of the block-size market."

The efficiency of GeeqChain's network allows it to handle a larger transactions load than either Bitcoin or Ethereum. Ultimately, the number of transactions per second is only limited by the upload bandwidth available to nodes. We calculate that the average US household has a fast enough internet connection to support a node on a network with 100 nodes validating 40 transactions per second (see below for further details). If more capacity is needed, new federated instances of GeeqChain can be created by dividing the set of nodes and accounts on the original chain in two. These instances would share the job of validating transactions, and tokens would be able to move freely between them. Since any number of instances can be created, GeeqChain can be scaled up to handle arbitrarily large transactions loads. See the section on forks and federated chains for more details.

II. The Catastrophic Dissent Mechanism for Blockchains

This section outlines the work flow of the CDM for the case of a cryptocurrency similar to Ethereum or Bitcoin. The objective is to describe a simple structure to make it easier to understand the full mechanism as we develop it in later sections. We begin by describing some of the basic components used to build GeeqChain.

a) Basics

GeeqChain is a flexible platform that is built around interoperable federated instances tailored to different use cases. Basic protocols and the custom business logic of GeeqChain instances is encoded in a series of Governing Smart Contracts (GSCs) which provide the components of the user and node computing devices (the software used to run and interact with GeeqChain). Computing devices comprise general purpose computers (processing units, storage devices/memory, input, output, I/O devices, communication (sub) systems, etc. Data including instructions may be stored to the storage devices (e.g. various types of memory, disks and other hardware configurations thereof) and configure execution of the processing unit. Some components may be in a single box or housing coupled via a bus or other architecture. Some may be coupled to communication component (e.g. on the bus) in the main housing via cables or wirelessly. Some features or functions may be provided by hardware circuits (e.g. ASICs, etc.) rather than a programmed processing unit (which may have more than one processor (CPU, GPU, etc.). For convenience, nodes may be server devices or similar hardware configurations and user devices may be configured from typical user form factors (laptops, desktops, smartphones, tablets, etc.) persons of skill in the art will appreciate that user device form factors may be configured as nodes with sufficient processing, storage and communication capabilities and vice versa for node form factors providing user device capabilities described herein. At least some of the nodes herein provide interfaces to receive or otherwise obtain transactions that may be generated by user devices. User devices may also obtain blockchain and node data such as via interfaces provided by nodes (or other devices communicating therewith). For example, a node validating transactions and writing a blockchain may provide a mirroring device having a copy of current data of the node. The user devices may interface with the mirroring device to obtain node data such as for determining account balances, etc. and verifying the node as described herein. These GSCs are included in genesis blocks that are the foundation of each instance. GeeqChain also takes a novel approach to network topology and communications. When these are combined with a type of unanimity game used to achieve consensus, the result is a new validation protocol that offers Strategically Provable Security (SPS) effectively, 100% BFT. This is outlined in greater detail in Section III.

Nodes are the validators of transactions submitted by users for inclusion in new blocks of the GeeqChain they construct. Real world agents (an individual or entity desiring to operate a node) download (or otherwise obtain) and install a copy of the GeeqChain node software on a computer which can be reached at some IP address. The agent then submits a request (e.g. invokes the node software to form a transaction) which includes both a public key account number and the IP address to an existing node asking to be added to the Active Node List (ANL). The ANL, in turn, is a list of public key and IP addresses of all nodes in the validating network. Each of these nodes accepts new transaction requests from users and participates in the writing of new blocks to the chain.

Each active node builds, keeps, and makes available to users, its own copy of the GeeqChain. Many of the elements that are written into blocks by nodes are created locally using the GSCs. This means that much of the data in blocks, such as transaction fee transactions, never needs to transit on the network between nodes, which in turn allows the GeeqChain protocol to make more efficient use of available bandwidth.

All instances of GeeqChain begin with a genesis block (block number 1). Blocks of validated transactions are created by nodes in the network and appended sequentially. Genesis blocks are created by an initiating blockchain entity (e.g. a commercial organization such as a corporation, LLC, etc., or a not for profit, institution, or other entity, etc.) at the request of other companies who wish to build applications (uses) of the blockchain. This tight control has several motivations.

- It prevents duplication of chain, token, and controlling authority names.
- It ensures that the chain adheres to the CDM protocol for transaction verification. SPS then makes it possible for federated GeeqChains to trust in the integrity of other ledgers and to accept tokens from other GeeqChains.
- It fixes the rules under which the chain will operate. This is done by including a copy of the GSCs in the genesis block. GeeqChains can be adapted to many purposes using different types of business logic for native tokens. While the rules for what makes a valid GeeqCoin transaction are universal to all federated chains, native tokens might be used to distribute votes, governing power, or profits, as rewards for users (as distinct from validating nodes), to tokenize real assets such as stocks, bonds and land titles, and so on. Users can verify that the rules are being followed by doing their own audits and verifications with the help of the GSCs written into the genesis block. Note that business logic these GSCs contain may also rely on data records written by users into the chain in addition to token transactions.
- The genesis block also contains pre-mined tokens and/or sets out the rules under which tokens can be created in the future. Users know going in exactly how the token economics will work as a result.
- An initiating blockchain entity may be paid GeeqCoins to account(s) of the entity in various ways as a component of a business model related to the initiation and operations of the GeeqChain for others. These may include periodic fixed license fees, transaction fees, or small fees to update the ledger states, for example. These payments are automatic and built into the GSCs with the agreement of a client who wishes to start an instance of GeeqChain.

This might seem to give Initiating blockchain entity a great deal of power which could lead to potential abuses. However, once a genesis block is created, neither Initiating blockchain entity nor anyone else can alter it or the operation of the chain that uses it as a foundation. There is simply no mechanism that will allow this to happen. In addition, each instance of GeeqChain can produce only the type of tokens listed in the genesis block, and no other instance can produce the same token type. An implication of this is that only the original GeeqChain will produce GeeqCoin, and since these will all be pre-mined, no additional GeeqCoins can ever be created.

b) Work Flow of the CDM Protocol on a Perfect Network with Honest Nodes

We will assume for now the ANL is fixed and known to all nodes, that all nodes behave honestly, and the network the nodes use to communicate works perfectly and without latency. Given this, the basic CDM protocol is the following.

A Simplified Version of the CDM Protocol:
1. Receiving Unverified User Transactions (UUT): Users send unverified transaction requests to one of the verifier nodes on the network.
2. Sanity checking: The receiving node checks to make sure the transaction is credible. For example, the node might check whether the user's account has enough tokens to its credit to make the requested transfer and to pay the expected transaction fees. If it does not, the request is discarded.
3. Waiting for commitment: Each node accumulates transactions until the block currently under construction is complete, verified, and committed to the existing blockchain. This process is described in the steps below. Note that each node constructs and keeps its own copy of the block chain, so "commitment" is a local phenomenon that takes place separately at each node.
4. Choosing a hub: Once a node commits a new block, it can calculate a new Current Ledger State (CLS), that is, the current state of all accounts and records given the previous ledger state updated by the block of new transactions just committed. The CDM uses a random hub and spoke network with a new hub chosen each time a block is committed. Blockchains are sometimes called state-transition machines. The transition data is what is written into each block. The CLS is the result of each transition applied to an object sequentially. The blockchain is and immutable record, but really all we care about is the CLS, which is implied by the blockchain. The CLS stands outside the blockchain itself and is a list of how many tokens are in each account (for example).
5. Sending Node Transactions Bundles (NTB) to the hub: Each node creates a bundle of credible but unverified transactions. Each transaction is signed individually, bundled together, signed collectively, and transmitted to the hub. The NTB also includes the block number it is intended for and a hash of the node's CLS.
6. Sending the Hub Transactions Bundle (HTB) to all nodes: The hub signs each new NTB as it arrives, puts them together into an HTB and signs this, and then sends the HTB out to each node in the ANL.
7. Building a Proposed Transactions Block (PTB): All nodes (including the hub) start with the same CLS and the same HTB. These are used in combination with the business logic of the chain to check the validity of each UUT in the HTB and also to write a number of other Verified User Transactions (VUT) locally such as fee payments for the validating nodes. The resulting set of VUTs is put together as a PTB.
8. Updating the CLS: Each node calculates the new CLS given the PTB it just created. The CLS is kept in a read-only public directory accessible to users and others who want to know the state of the chain and also check it for accuracy.
9. Committing the Full Verified Block (FVB): Each node creates a new block to be appended to the end of its copy of the chain. This involves creating a Committed Block Header (CBH) that includes the block number (that is, the "height" of the block being added), a hash of the previous block, and a hash of the CLS for the previous block. The PTB and HTB are added after the header to complete the FVB which is added to the local copy of the blockchain. (Including both the HTB and PTB is redundant since the PTB can be directly derived from the CLS and the HTB. The HTB must be included in the block because it includes all the raw transactions and signatures that allow for independent audits that expose misbehaving nodes. Including the PTB makes the blockchain easier for humans to understand even though it is not strictly necessary. Although including both does not increase the bandwidth cost of building the chain, it does increase the amount of storage needed. If storage is a constraint, omitting the PTB from the chain does not affect the functioning of the CDM in any way.)
10. Choosing a new hub: The process begins again with each node returning to step 4 and sending a NTB to the new hub that includes the transactions that have arrived while the current block was being created, verified, and committed to the chain.

The process outlined above does not specify how often blocks are written. Allowing the time interval to fluctuate like this permits the system to run as efficiently as hardware and network connections make possible. If the network has low latency, a small number of nodes, or a low transaction volume, this might result in blocks with a very small number of transactions being written to the chain quite frequently. Given that there is an overhead cost of committing even a small block, this might in itself be wasteful of resources. It might be desirable in such cases to require that nodes wait at least a minimum number of seconds before creating and transmitting NTBs. On the other hand, the CAP Theorem (which states that it is impossible for a distributed data store to simultaneously provide more than two out of the following three guarantees: Consistency. Availability. Partition tolerance.) tells us that if we insist that all nodes in a network communicate and agree on a ledger update, we cannot guarantee that consensus will be achieved in finite time. In other words, if a mechanism sets an upper bound on the time to achieve consensus on a ledger update, then it must be robust to the possibility that some nodes will either not communicate with the network or will have different or incomplete views of the ledger update. We discuss this further in the section on network architecture, below.

III. Network Architecture and Communications

In this section, we outline an approach to network communication that closes off attack surfaces that dishonest nodes might exploit, but leaves the CDM robust to even extreme network failure. This is built around three GSCs:

NTSC: Network Topology Smart Contract
NCSC: Network Communication Smart Contract
LCSC: Lost Contact Smart Contract a) Existing P2P Networks and their Limitations Bitcoin and Ethereum use P2P networks to distribute transactions over existing nodes and achieve consensus. There are many variations of how such a "gossip network" might be implemented, but there are two essential features.

First, new validators use some method to identify the IP addresses of a small subset of nodes on the network. Often this is by sending a message to a known node requesting a list of near-by peer addresses.

Second, once a node identifies eight or so peers, it uses them to communicate new transactions, completed blocks, and other information relevant to the blockchain. These peer nodes are in contact with other peers to which they forward messages. Thus, a message arriving at a node might be sent to eight peers, who forward it to a total of 64 peers, and so on. Once a node joins the network and broadcasts its IP address, it is randomly added as a peer to receive messages from other nodes in the network. In this way, messages are propagated throughout the entire network without the use of a central routing server or table.

There are several problems with this approach to network communications.

- There is a boot-strapping issue in that the IP address of at least one node must be known or discoverable before a new node can make a request for IP address of other network nodes. Posting IP addresses in a fixed location (such as Blockchain info), an IRC channel, or using a designated set of DNS servers, solves the boot-strapping problem, but introduces central points of failure.
- What incentive do nodes have to forward messages to peers? A node might wish to receive transactions from other nodes in order to build new blocks, but what does it gain from passing this information on?
- What prevents nodes from strategically ignoring transactions from certain unfavored users? This might be because the transactions fees offered are not high enough or because a group of nodes wishes to censor certain users or transaction types.
- It is difficult or impossible to tell whether communication failures are strategic or due to a faulty network. Even then, there is no way to reliably know or prove that a message was actually sent or received by nodes.

b) Network Topology

The CDM uses a unanimity rule for consensus and so knowing the state of the network and who did or did not send and receive messages is important. Communicating with each and every peer would use a great deal of bandwidth. If the CDM required this to function, it would also introduce a great many points of failure. Thus, the CDM uses a random hub and spoke approach which we outline in this subsection. The Network Topology Smart Contract (NTSC) chooses the form of the communications network that validates each block and specifies where each of the validating nodes in the ANL fits in.

We begin with the simplest case. Suppose that there are N active validating nodes which are known to each other and are unchanging. Also suppose that a single hub is chosen for each block. The remaining validators act as ordinary nodes. For example, in a nine node network, if node number 8 gets randomly chosen to serve as the hub for building block number B, the network 100 is represented by FIG. 1. After the block B is built and committed, each node invokes the NTSC to randomly determine the hub for block B+1. To be more precise, the NTSC uses a pseudo-random process that has the property that the same B+1 hub is chosen by each node. One way this might be accomplished is by basing hub choice on the hash of the CLS calculated by each node as it committed Block B.

Recall that the hash of the CLS (or anything else for that matter) is effectively a uniformly distributed random 256 bit binary number. Since the CLS is determined by random events such as what sort of transactions users submit, the time these UUTs arrive, the set of nodes currently validating transactions, and so on, it is impossible to control or predict what the CLS will contain, and therefore, what its hash will be. One way to map from the hash to the set of nodes is the following:

- Arrange the public keys of the active nodes is alphanumeric order and then number them consecutively.
- Interpret the hash of the CLS as a base 10 number denoted Z.
- Designate (Z modulo N) as the hub.

In the simple case of a network with a single hub, this is all that is needed. With a hub and spoke topology, however, the amount of data that a hub must upload to other nodes scales linearly with the number of nodes. Thus, if there are too many nodes, typical home broadband connections may not provide enough upload capacity.

One solution would be to structure the GeeqChain network with a layered system of random hubs. As long as the primary hub communicates with a relatively small number of secondary hubs or ordinary nodes, secondary hubs communicate with a relatively small number tertiary hubs or ordinary nodes, and so on, validation networks of arbitrary size would be feasible using only residential broadband connections.

The exact topology would be determined by the NTSC and might depend on the number of nodes in the ANL, the number of transactions being handled by the chain, and other factors. For example, if a large number of validators joined the ANL, the NTSC might move automatically from a single hub network to one with a primary hub and several secondary hubs, each with an equal share of the remaining nodes reporting to it. It might change the number of secondary nodes, add a tertiary layer of hubs, or move back to a single hub as conditions dictate. Which nodes were primary, secondary, and tertiary hubs, which superior hub they report to, and which sub-hub each ordinary node is attached to would also be determined by a pseudo-random mapping from the CLS hash to network positions.

An alternative solution would be to select a subset of the active nodes randomly from the ANL to participate in a single hub and spoke network of optimal size for each block. This could be combined with the multi-layered hub approach above if desired. Different instances of GeeqChain could even use different approaches.

Common among the GeeqChains are two things: First, whatever method is chosen to determine network topology, it is fixed in the NTSC when the chain is started. Second, the ANL must be open so that new validators can join and make sure that the chain is validated honestly. More formally, the NTSC determines the form of the next validating network in two separate stages:

First, the NTSC determines which of the nodes in the ANL will participate. By default, all nodes in the ANL would help to validate the next block. However, it might be that the ANL contains more validators than are needed and including them all would reduce the efficiency of the network. Since keeping the network honest requires that we not close membership to the ANL, it might be desirable to choose a random subset of optimal size from the ANL list.

The optimal size might be specified to depend on transactions load, the value of transactions, etc., and would be encoded into the NTSC. However, given this number, all nodes in the ANL should be have an equal chance of being chosen.

Second, the NTSC determines how many layers of hubs to have in the network. By default, a simple hub and spoke network with one node serving as hub, while the rest behave as ordinary nodes that report to the hub is used. If the number of nodes becomes too large, it becomes more difficult for hubs to upload the HTB to each one. This is also true if there are large numbers of transactions per bundle or if the transactions themselves are large. Uploading an HTB of 1 MB to 100 nodes in ten seconds is feasible with typical household broadband connections. Greater loads would require an alteration of the network.

More complex networks consists of L layers of hubs, with each layer $@\in\{1, \ldots L\}$ having $N_l$ sub-hubs. Thus, one node is designated $H^1$ as the central node. A total of $N_2$ of the remaining nodes are second layer hubs and have designations $\{H_{1,1}{}^2, \ldots, H_{1,n}{}^2, \ldots, H_{1,N_2}{}^2\}$ and this continues with $N_L$ nodes being named as $L^{th}$ level hubs with $\{H_{1,1}{}^{L-1}, \ldots, H_{m,n}{}^{L-1}, \ldots, H_{N_{L-1},N_L}{}^{L-1}\}$. The remaining $N_O$ nodes are ordinary nodes and are given designations $\{O_{1,1}, \ldots, O_{m,o}, \ldots, O_{N_L,N_O}\}$. These designations determine a node's place in the networks. Thus, if the NTSC designates a node $H_{m,n}{}^l$ then it is $n^{th}$ node on $l^{th}$ level of hubs and reports to the $m^{th}$ hub at the $(l-1)^{th}$ level. The ordinary node designated $O_{m,o}$ is the $o^{th}$ ordinary out of a total of $N_O$ ordinary nodes and reports to the $m^{th}$ hub at the $L^{th}$ level. FIG. 2 is a graphical example for a network topology 200 with three layers of hubs.

c) Network Communications Protocol

Honest nodes will use the official CDM client software to validate transactions and build the chain. Of course, nodes may instead choose to load their own software or otherwise attempt to manipulate the network. GSCs and client software may be open source to enhance transparency and foster trust in security. However, the network communications part of this software client will be provided only in the compiled form and will therefore be able to include a private key to sign messages. All valid messages must come through the Network Communications Smart Contract (NCSC) by protocol, and the contract's signature on messages and data objects allows users and nodes to both prove and verify this.

Users who wish to submit a transaction to the network are required to choose a node or nodes in the ANL to receive the UUT. They also specify details such as how much of which sort of token is to be moved between which accounts and provide the proper authorizing signatures. This is all passed to the NCSC which handles the next step.

On receiving the UUT, the sending NCSC signs it and then attempts to form an encrypted tunnel to the NCSC of the receiving node or nodes using backbone routers that serve as anonymizing remailers. The TOR network is an example of a protocol that does this, but a simpler, lighter weight solution may be found.

In addition to the ordinary TCP/IP and other handshakes needed to establish the connection, the receiving NCSC imposes one more. The sending NCSC must provide one of two things before messages can be exchanged.

If the transaction is of a type that comes from a user, then a Proof of Due Diligence™ (PoD™) is required. Users are required to check certain aspects of the blockchain to verify that it is honest and that protocols are being followed. This means that the sending NCSC invokes the Due Diligence Smart Contract (DDSC) to create the initial message to complete the handshake with the receiving NCSC.

PoD involves a modest amount of computational effort (non-trivial work) and serves two purposes. First, it makes it non-free to submit spam transactions to nodes. Potential spammers would have to do computational work each time or else the transaction would be immediately rejected. Second, it helps ensure the integrity of the blockchain. In effect, this crowd-sources continual audits to make sure a blockchain stays honest.

As an example, the user could be required to send a hash of the last 50 blocks, or of every $100^{th}$ CLS hash starting from the previous block. If this agrees with the hashes made by the receiving NCSC then it proves that the user is aware of the history of the blockchain and its ledger states. This example has two other advantages. First, it is easy to verify. While each user must download and create the hash before being allowed to communicate with a node, nodes already store this data and only need to calculate the hash once for each NTB they produce regardless of how many users send then UUTs. Second, the PoD changes with each block and so users must perform new due diligence each time they wish to send a transaction. For this strategy to be effective, the PoD should require new work for each transaction submitted and it should be computationally easy for the node receiving the transaction to verify that the work is correct. The details of the types of due diligence that might be required are outlined below in the Due Diligence Smart Contract (DDSC).

If the sending NCSC belongs to a node, then the node simply needs to send a signature to prove that it possesses a private key that corresponds to a public key in the ANL. The NCSC creates this directly and forwards it to the receiving NCSC.

Once the receiving NCSC verifies the PoD or node signature message, it allows additional messages to be sent through the encrypted tunnel. Otherwise, it simply closes the tunnel.

Assuming that the handshake was successful, the message is passed from the sender's NCSC to the receiver's NCSC in encrypted form but is not immediately released to a receiving node.

The success or failure of communications needs to be verifiable and provable. This is accomplished through a series of signed certificates that are issued by the NCSC at both ends of the communications link. Specifically:

- The sending NCSC provides the sending node an S-cert proving that the user attempted to send a UUT to a given node.
- If the sending NCSC is unable to establish contact with the receiving NCSC, the sending NCSC provides the sending node a B-cert proving that the message bounced.
- The receiving NCSC provides the sending node with an R-cert proving that the message arrived, however, it does not immediately release the encrypted message to the receiving node itself
- If the sending NCSC gets the R-cert from the receiving NCSC, it sends back an $R^2$-cert which proves that the sending node is aware that the message was transmitted successfully. When this arrives, the receiving NCSC decrypts and releases the message to the receiving node.
- If the receiving NCSC does not get the $R^2$-cert from the sending NCSC for some reason, it issues the receiving node an F-cert indicating a communications failure and does not release the message to the receiving node.

Communications among nodes and hubs are similar to those between users and nodes with one significant variation. Most messages or data objects that are communicated within the network of validating nodes must go to specific destinations under the CDM protocol. For example, NTBs go only from a node to the current hub, while HTBs go from the current hub to all the nodes in the ANL. As a result, the NCSC consults the ANL maintained by the node/hub sending the message and chooses the recipient or recipients automatically according to protocol.

This approach to network communication is intended to address two issues. First, it prevents dishonest nodes from filtering outgoing messages. Once a node generates a message and passes it to the NCSC, the NCSC makes it best effort to send it the proper recipients. It may fail in this, but then a trail of certificates exists to show where the failure occurred. Once a message is created, the sender may be able to prevent the NCSC from contacting the backbone router, but if the sending node does allow the connection to be made, the message goes out as it was created to the recipients that were chosen by the NCSC. Second, it prevents dishonest nodes from filtering incoming messages. All valid communications arrive through an encrypted link with a backbone router chosen by the NCSC. The receiving node does not see any headers, and so cannot determine the identity of the sending node. It also is not provided with the decrypted contents of any message received until an R-cert is sent and a $R^2$-cert is returned. This prevents a dishonest node from selectively preventing R-certs from being sent back for messages it would prefer to deny receiving, since the node cannot know who sent any given message, or what it might contain, until the R and $R^2$-certs are exchanged. In turn, the sending node will be in possession of the R-cert and so can prove that the receiving node got the message unless the receiving node can offer an F-cert proving otherwise. Putting this all together, a node can refuse to receive messages if it chooses, but this is equivalent to being offline. If it opens its gateway to allow messages to arrive at its NCSC, it has no choice but to accept everything that arrives and cannot deny that it saw any message that the NCSC provided to it in cleartext.

The following is an example of a NCSC Communications Protocol:
1. The sending node or user creates a message containing a properly formatted data object.
2. The sender submits the message to the NCSC.
   a. Users specify the IP address of the node they wish to receive the message.
   b. NTBs and UUTs generated by nodes are supposed to go to the currently designated hub. The NCSC checks the ANL in the sending node's CLS to find the correct IP address automatically.
   c. HTBs and PTBs generated by hubs are supposed to be broadcast by the hub to all of its active nodes, The NCSC checks the ANL in the sending node's CLS to find the correct IP addresses automatically.
   d. Other types of messages and more complicated network topologies are handled by the NCSC under protocols contained in the GSCs.
3. The sending NCSC provides the sending node an S-cert proving that the user attempted to send a UUT to a given node.
4. The NCSC generates credentials needed to form the encrypted tunnel or tunnels to the right destinations and attempts to complete the necessary handshakes.
   a. If the message comes from a user, then the sending NCSC invokes the DDSC to generate the required PoD and then transmits this to the receiving NCSC.
   b. If the message comes from a node or hub, the sending NCSC sends the node's signature to prove that it possesses a private key that corresponds to a public key in the ANL.
5. If the sending NCSC is unable to establish the tunnel with the receiving NCSC, the sending NCSC provides the sending node a B-cert proving that the message bounced.
6. If the sending NCSC succeeds in establishing the tunnel with the receiving NCSC, it transmits the message.
7. If receiving NCSC gets the message, it provides the sending NCSC with an R-cert proving that the message arrived
8. If the sending NCSC does not get an R-cert, it continues to try and send the message for a short time and provides a B-cert to the sender if it fails.
9. If the sending NCSC does get the R-cert from the receiving NCSC, it sends back an $R^2$-cert proving that the sending node is aware that the message was transmitted successfully.
10. If the receiving NCSC gets the $R^2$-cert, it decrypts and releases the message to the receiving node.
11. If the receiving NCSC does not get the $R^2$-cert from the sending NCSC for any reason, it issues the receiving node an F-cert indicating a communications failure and does not release the message to the receiving node.

Provided is a formal proof below that this approach to network communications prevents dishonest behavior and allows GeeqChain to provide SPS (Section VII, below).

d) Dealing with Network Failures

When a node finishes a block and commits it to its copy of the chain, its next step is to take the hash of the CLS in order to find the network topology for the next block. The node then sends its NTB to the hub (or waits to receive them from nodes if it happens to be hub for the next block). Communications could fail in a number of ways:
   A node finds itself disconnected from the network.
   A node that is connected to the network may find it is unable to contact the current hub, possibly because the hub has dropped off-line.
   Nodes may end up with different CLSs. This can result in several types of failures.
   A node may send its NTB to another node that does not believe it is the hub.
   A node that believes it is the hub may not receive NTBs from other nodes.
   A node that believes it is the hub based on its own CLS hash may receive NTBs with CLS hashes that differ from its own.

These problems are handled by the Lost Contact Smart Contract (LCSC) in concert with other governing smart contracts as follows.

If a node goes offline, what does it do when it reestablishes contact? The disconnected node should still be in the ANL of the chain and, in general, one would not expect the ANL to change a great deal if the connection outage is relatively brief. The node should be able to consult the ANL from the last block it participated in writing and use the IP addresses it contains to find an active node and a current copy of the blockchain. The first thing a reconnected node does is send a "suspend" ANL UUT to the node it contacts. The reconnected node is then required to do some due diligence, as specified by LCSC, to verify the blockchain being constructed by the nodes in the ANL of a node it contacted is correct. It downloads any blocks it is missing and verifies the blockchain such as by processing the transactions and then sends a "reactivate" ANL UUT. It then constructs an NTB from any UUTs it was unable to send due to its dropping offline, forwards it to the current hub, and resumes its role as a verifying node. Processing blocks is computationally light. The challenge generally is communication bandwidth. If blocks get written too quickly then it is at least theoretically possible that the stream of new data would exceed the bandwidth available to the node trying to catch up. In practice, especially due to splitting chains in volume gets too high (described below), this should not be a problem. A mirror (e.g. a device having a copy of the current blockchain) may provide the copy for others to download and thus off load communication requirements of active nodes.

If a node is unable to contact the current hub because the hub is offline, the NCSC will issue a B-cert using the NCSC communications protocol described. All other nodes should also get a B-cert. A possible exception would be if the hub dropped offline in the middle of its tenure, in which case, some nodes might get R-certs. This is handled in several steps.

Nodes keep trying to send the NTB for a specified amount of time. If contact is not reestablished because the hub remains offline, the hub will not have been able to send out HTBs and may not have received some or all of the NTBs sent by nodes.

After the time has elapsed, the LCSC uses a method similar to the NTSC to choose a new network. The hub of this new network broadcasts a message stating that it is the new hub and forwarding evidence in the form of B-certs that the original hub is off-line. If these can be verified as correct by nodes, then the block building continues from where it left off. The new hub writes an ANL UUT changing the status of the missing hub to "suspended".

If after a certain additional amount of time has passed and nodes have not received a message from a substitute hub, the LCSC is invoked again and a new potential hub is chosen. This continues until a node with an active network connection is chosen and sends out a message claiming the position.

Failure to make contact with some hubs may be due to the network becoming physically split. For example, European nodes might lose contact with North American nodes for a time due to fiber lines being cut. These two sub-nets would continue to choose hubs and validate transactions independently until they reestablished contact with one another. Network latencies might also result in different sub-nets getting out of sync and continuing to validate transactions independently. It might even be the case that a single node becomes completely isolated from other nodes although still in contact with the internet. In such cases, one or more forks of the chain may come into existence.

In existing protocols, one fork (usually the longest one) is declared to be definitive and all others are orphaned. This means that all the transactions the orphaned blocks contain, even completely valid ones, are rendered null and void. The CDM uses a different approach. When sub-nets working on forks reestablish contacts with one another, they invoke a Fork Reintegration Smart Contract (FRSC) which checks for the honesty of each fork and then reconciles the transactions in both forks on a block by block basis to make a new set of blocks building from the point at which the forks diverged. This is discussed in detail below.

Nodes should never end up with different CLSs if they are in communication with the network. All nodes receive the same HTB from the current hub and build off of the same B−1 CLS to find block B's CLS. If this somehow happens anyway, it is most probably due to dishonesty on the part of some node. Any node that receives a hash of the Block B CLS that is different from its own invokes the Blockchain Audit Smart Contract (BASC) to resolve the matter and punish dishonest nodes. This is described in more detail below. It is also possible that the CLS is different because a node (or nodes) has become separated from the rest of the network. In this case, the audit will reveal that the nodes behaved honestly and the FRSC will be invoked.

Finally, some communications failures result from nodes failing to follow network protocols. However, such misbehavior is provable using the set of signatures and certifications produced by the NCSC. In this event, nodes that are being ignored or censored can call for an audit using the BASC. If the evidence shows that some nodes are not following protocol, the contract writes an Audit UUT that punishes the dishonest nodes and rewards the nodes that reported the bad behavior. The dishonest nodes are ejected from the ANL, and the process of building the chain continues. This GSC is also discussed in detail below.

IV. Operations

The basic function of any blockchain is to convert Unverified User Transactions (UUTs) into verified transactions for inclusion in a block that is added to the chain We break this up into several GSCs. First, incoming transactions must pass a sanity check before they are forwarded to the network of validators. Second, UUTs are examined individually and collectively to see if they are valid and a set of Verified User Transactions (VUTs) are created. Some of these VUTs are actually generated locally by nodes under the business logic of the chain in question. All of these VUTs (including Active Node List VUTs produced by a separate GSC) are then built into a Proposed Transaction Block (PTB) by each node. This PTB is applied to the CLS from the previous block to obtain a new CLS. Finally, headers, hashes and other details are added to the PTB to form the FVB which is committed as the next block on the current chain. This is all built around the following GSCs:

TSSC: Transaction Sanity Smart Contract
ANSC: Active Node Smart Contract
TBSC: Transactions Bundle Smart Contract
PBSC: Proposed Block Smart Contract
BCSC: Block Commitment Smart Contract
LSSC: Ledger State Smart Contract
DDSC: Due Diligence Smart Contract
SCSC: Smart Contract Smart Contract a) Sanity Checking Receiving nodes check to make sure newly arriving UUTs are credible. What exactly this means depends on the type of transaction. If the transaction fails the check, it is discarded and is not forwarded to the hub. The motivation for sanity checks is to prevent the validator network from being spammed with invalid transactions. Once a transaction has passed through the NCSC, it goes to the Transaction Sanity Smart Contract (TSSC) before it is ready for inclusion in a node's NTB. We give a few examples of sanity checks below:

Simple UUT sanity check:
The UUT is well formed and follows the correct format.
User's public key exists in the CLS.

User's account contains enough GeeqCoin to cover the transaction request and the expected transactions fees.

General UUT sanity check:
The UUT is well formed and follows the correct format.
The public keys listed in the UUT exist in the CLS.
Each account contains enough tokens to cover the transaction request.
User's fee payment account contains enough GeeqCoin to cover the transaction requests in the UUT and the expected transactions fees needed for all the transactions in the UUT.

Unique Token Creation UUT sanity check:
The UUT is well formed and follows the correct format.
The signature of the token authority is correct.

Active Node List UUT sanity check:
The UUT is well formed and follows the correct format.
If this is a request to Leave, Suspend or Reactivate, the user's public key exists in the current ANL.
If this is a request to join, the agent's public key account holds enough GeeqCoin to fund the required Good Behavior Bond (GBB), if any. (Agents who wish to set up validating nodes on a given CDM network are required to post a GBB in the form of a certain amount of GeeqCoin. In some ways, this is a "stake" similar to what PoS validation protocols use. Three things make it different. First, the GBB funds audit rewards for agents and nodes who report dishonest behavior as well as serving as a way to punish dishonest nodes. Second, the combination of PoH and audits allows the GBB bond to be considerably lower than what would be needed to incentivize good behavior in a pure PoS block-chain Third, this structure also defeats the Sybiling problem mentioned in footnote 8, above. This will be out-lined in greater detail in Section VII, below.)

b) Maintaining the Active Node List

The list of validating nodes is kept in an Active Node List (ANL) which is part of every block and is updated through transactions submitted by agents and also as a result of audits finding bad behavior and actions of the LCSC. The Active Node Smart Contract (ANSC) integrates ANL UUTs coming directly from agents or nodes wishing to update their own ANL records with other sorts of transactions, generated by each node in response to audits and other protocol rules. This happens in two stages. The first deals only with external transactions and creates a set of provisional transactions. The second is invoked by the Proposed Block Smart Contract (PBSC), outlined below, to reconcile these provisional transactions with system generated ANL transactions.

Agents can request to be added to the ANL by submitting an ANL UUT to any existing node. This includes a public key, an IP address, and permission to transfer enough GeeqCoin from the public key address to the system account to cover the GBB. An agent currently in the ANL can also submit an ANL UUT asking to leave the ANL, in which case a provisional transaction transferring the GBB back to the node's public key account is produced and the node is removed. Finally, an existing node can ask to be suspended or reactivated.

If multiple valid ANL UUTs are received, possibility contained in different NTBs, they fail the collective validity test. This is like double spending. A node can only ask to change its status once per block and so all the node's ANL UUTs are discarded.

Note that this open approach to allowing agents to become validators does not leave the CDM open to Sybil attacks. Even if the required GBB was zero and thus it was free to create multiple identities, the creator does not achieve any advantage. The CDM requires unanimity for consensus by showing lack of dissent; creating multiple fake identities does not weaken the power of any other identities that also are included on the ANL. Thus, no matter how many Sybils an agent creates, the agent cannot force the type of unanimous consensus required for validation by the CDM.

Figure 3B:
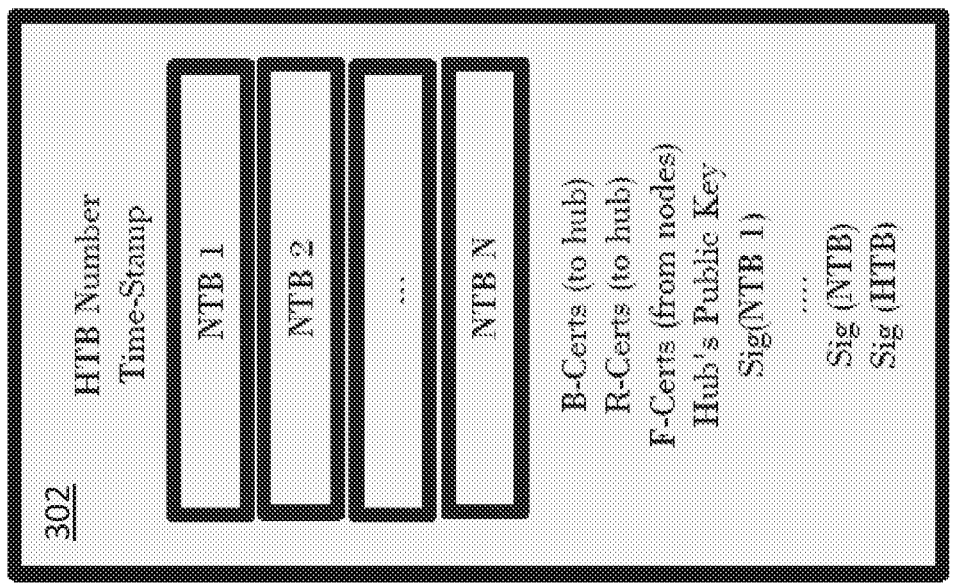

Validating nodes that fail an audit through the BASC are removed from the ANL and their GBB is forfeited to the system's account. Nodes that drop out of the network when they are supposed to be acting as hubs are then placed in "suspended" status by the LCSC. Agents attempting to join the ANL may not have enough in their public key account to fund the required GBB. These conflicts are resolved by the ANSC which then produces the ANL for the next block c) Building Node and Hub Transactions Bundles Nodes receive UUTs from users and create Node Transactions Bundles (NTBs) to be sent to the hub. Hubs, in turn, receive NTBs from nodes and create Hub Transactions Bundles (HTBs) to be sent back to nodes. Both of these operations are handled by the Transactions Bundle Smart Contract (TBSC). FIGS. 3A and 3B are illustrations of an NTB 300 and HTB 302 respectively. With reference to FIG. 3A, the NTB 300 has four major components:

Credible but unverified UUTs received from users. In general, this will include transactions for data object creation, smart contract creation and invocation, token chain transfer, and audits, in addition to more ordinary token transactions.

Unverified UUTs from other nodes or which are generated by the node itself. This may include transactions to change ANL status, incoming token transfer requests, requests from token authorities to create or destroy unique tokens, or to create or destroy certain accounting tokens if this is permitted under the business logic of the GeeqChain instance.

Communications certs received while acting as a node. These include B-certs proving that the node's NCSC was unable to contact the hub (maybe for several periods), R-certs proving that the hub received the last NTB sent by the node, and F-certs proving that a user's NTSC did not return an $R^2$-Cert and so a given UUT was never delivered to the node. Note that the B-certs and R-certs relate to communications attempts with the hub that coordinated the previous block. F-certs, on the other hand, relate to communications failure between users and the node for UUTs intended for the current block.

Communications certs received while acting as a hub. If the node happened to serve as hub for the previous block, it includes certs that allow it to prove that it followed communications protocols with nodes. These include B-certs proving that the hub's NCSC was unable to contact a node and R-certs proving that a node received the HTB sent by the hub.

With reference to FIG. 3B, an HTB 302 is primarily a collection of NTBs that hubs send to all nodes. The hub waits for NTBs to arrive from nodes and then invokes the TBSC to build the HTB by gathering these NTBs, signing them with the hub's key individually and collectively. Note that the hub also receives UUTs from users and creates certain UUTs on its own. Thus, the hub also contributes an NTB to the HTB. The HTB also includes F-certs in the event that some nodes send an NTB but the node's NCSC does not return an $R^2$-Cert (and so these NTB were never delivered to the hub in cleartext). If the hub happened to act as an ordinary node for the previous block, the HTB includes B-certs and R-certs proving that it followed communications protocols.

In addition, both the NTB and HTB contains various headers and signatures.

d) Building the Proposed Transaction Block

FIG. 4 shows a processing of an HTB 302 by a PBSC 400 to produce a PTB 402. The PBSC takes the HTB that the hub sends out to each of the nodes and constructs the PTB. This block has several elements and the GSC constructing it is by far the most complex. The PBSC is also where modules containing business logic for various applications built on GeeqChains are housed.

Both nodes and users are required to do due diligence of various types by the protocol. Nodes may detect a lack of unanimity in the CLS, violations of the network communications or topology rules, invalid signatures, invalid confirmation of UUTs, and other violations of protocol. In this event, nodes or users invoke the BASC and provide it with the evidence of dishonest behavior. If the BASC agrees, it creates an Audit UUT and the node adds this to the NTB it sends to the next hub which in turn adds it to the HTB it sends out to the nodes. Nodes independently check that the Audit UUT is valid by invoking the BASC locally. The result is a set of provisional token and ANL transactions that satisfy individual validity, but may or may not satisfy collective validity.

The user generated UUTs are also checked for individual validity. This involves checking signatures of the NCSC, nodes, hubs, and users on the UUT, NTB, and HTB. If the UUT passes these tests and the accounts contain enough tokens to cover the requested transactions, then provisional token transactions are created.

With PoW protocols, only the first miner who solves a cryptographic puzzle and finds the "nonce" is allowed to propose a new block and receive transaction fees and the block-writing reward. Thus, each transaction request results in three payments in general: the requested transaction, a fee payment transaction to the block-writer, and a change or UTXO transaction. In addition, a single block reward transaction is written. Miners who do not find the nonce get neither block rewards nor transactions fees.

All nodes who participate in building blocks are paid fees in the CDM protocol. The details of how these fees are set and their level is not essential to the mechanism itself. Fees could be fixed, change algorithmically depending on the system's need for nodes, set through some type of auction, and so on. The exact fee structure is part of the PBSC and is fixed in the genesis block of the chain.

In total, fees add a T+N transactions to each block, where T is the number VUTs, and N is the number of validating nodes. The first T are simple VUTs that move tokens to pay fees from sending users' accounts to a system account, while the second N move fees from this system account to the accounts of verifying nodes. In any of the implementations, an additional (e.g. single) transaction to pay licensing fees to an initiating entity may also be generated. Note that all of these fee VUTs are created locally by each node and never need to transit the network. Also note that the sender has not explicitly signed a transfer to pay the fee amount in this transaction to validators. However, the sender has requested the transfer referenced in this fee payment transaction and this makes the transactions valid under protocol. All of these fee transactions are provisional until they are tested for collective validity.

GeeqChain is able to run user generated smart contracts. These are handled by a GSC called the Smart Contract Smart Contract (SCSC). We will outline this in greater detail below. Users invoke smart contracts with a UUT that includes any inputs the contract needs. If these pass the sanity check, they end up in the HTB. Nodes then run the appropriate smart contract which may produce token UUTs, fee transactions, ANL UUTs, or data items. These are checked for individual validity. If they pass, they are added to the set of provisional transactions to be checked for collective validity.

The net result of all this is a set of individually valid provisional transactions involving GeeqCoins, data items, and native tokens.

Collective validity is checked by considering all provisional transactions that move tokens out of a given public key account as a group. If the sum of these outgoing transactions is less than the balance in the account, then they are collectively valid. A set of final VUTs moving tokens appropriately is created. If the collective test fails, then all the transactions from that account are considered invalid. This includes the execution of smart contracts and requests to join the ANL. All such UUTs are discarded. The user accounts may be charged a transaction fee in this case, but otherwise, the account is unchanged. Users are responsible to monitor their accounts to ensure transactions are completed and revise and resend as may be necessary.

GeeqChain also allows users to write data items into the chain. Provided that the user who creates the UUT can pay the required transaction fees, they are valid as far as the basic protocol is concerned. However, custom modules can be added to the PBSC that include arbitrary business logic appropriate to various use cases. These modules may use data items, smart contracts, and token UUTs in a variety of ways. This may impose extra conditions on the individual or collective validity of Data Item UUTs, and may also result in the creation of additional provisional transactions involving tokens, fees, or the ANL, which then will also need to pass a collective validity test.

As an example, a UUT could be submitted with a data object such as a hand-off in a logistic chain, a medical record that needs to be indexed with other records of the same patient, or a confirmation that some step in a distributed business process is complete. Logic could be written into a PBSC module such that the details of these data objects activate smart contracts, produce other data objects, or notify appropriate agents that their attention is needed. All of these actions would be initiated by the submission of an appropriate UUT which would be validated and converted into one or more VUTs as needs be. In all cases, transactions fees VUTs would be created.

Ultimately, the PBSC generates a set of VUTs that satisfy individual and collective validity. These are separated into the following categories which make up sub-blocks in the PTB: ANL VUTs; User Generated VUTs; Fee VUTs; Other VUTs; and Audit VUTs.

Within each category, VUTs are ordered in a systematic way. For example, this might be in alphanumeric order by transaction number or the public key address of the sending node.

e) Committing Blocks to the Chain

Blocks are committed to the chain using a GSC called the Block Commitment Smart Contract (BCSC). The BCSC creates a header which it attaches to the HTB sent by the hub and the PTB constructed by the PBSC to create a Full Verified Block (FVB). FIG. 5 is an illustration showing the components of a header 500. An element of the header is the hash of the previous block which creates the Merkle tree that confirms the linear integrity of the blockchain. The header also includes hashes of the HTB and PTB and a hash of the CLS of the previous block which allows users and others to confirm that nodes have a unanimous view of the ledger state back to the genesis block, and also that the new CLS state follows from the previous CLS and the PTB. Finally, the header includes a block number and timestamp.

The new block is then "attached" to the node's copy of the existing chain In practice, this means that it is saved to the same read-only public directory.

f) Updating the Ledger State

The Ledger State Smart Contract (LSSC) simply takes a CLS and updates it using the VUTs in a PTB. For the basic GeeqChain implementation, this is very straight-forward. Existing accounts have tokens added or deducted, new accounts are created, and empty accounts are deleted. The ANL is copied directly from the PTB since the PBSC takes care of this update. Data items, smart contracts and other elements are updated as well. Applications of GeeqChain may also have their own business logic for certain types of updates and these are included as modules in the LSSC.

Standard data items are simply written into the CLS and do not update or over-write any existing data items. This means that the CLS might get very large, containing a history of every item ever created. If the GeeqChain instance is meant to hold data such as medical records, logistic hand-offs, public records, IoT telemetry, and so on, this is exactly what we want. The blockchain itself then serves as a kind of "journal" that shows how the CLS evolved and permits auditing.

Of course, there are many other ways that data item updates could be handled. Data item updates could follow a variety of rules and can be customized to suit any number of applications. For example:

- The data item creator could be allowed to submit a UUT to delete the item.
- The data item could contain details outlining who is allowed to delete it. It might include several public keys and require some or all of the key holders to sign in order to delete or update a data record.
- A data item UUT could refer to an existing data item by number and then employ custom business logic to edit or modify it in some way. For example, a data item in the CLS might record the current state of an IoT sensor, a list of email addresses, or other information that changes over time.
- Data items might be related to one another (a student's transcript, a business process, or a medical record, for example) and so new data items might be indexed or stored in a way that makes this clear and facilitates discovery and use.
- Data items could expire and be automatically deleted from the CLS after a certain number of blocks have been built.

What this means is the plain version of the LSSC would simply add data item VUTs to the new CLS. In some instances, the GeeqChain intended for various purposes may have customized LSSCs that are included in the genesis block. Preferably, the original instance of GeeqChain where GeeqCoins are initially created (which GeeqCoins may be utilized on all related instances of GeeqChains as described further below), omits data items entirely and does not allow other types of tokens to be moved into its accounts. This is in the interest of keeping the original GeeqChain as fast and simple as possible.

g) Due Diligence

GeeqChains are constructed so that they contain enough information to allow independent verification that transactions are being honestly verified and that all protocols are being followed. The genesis block of each chain is signed by the initiating blockchain entity and includes all the GSCs that run the instance in question. Each transaction is signed by the user who submitted it, each NTB is signed by the node that transmitted it, each HTB is signed by the hub that coordinates the building of each block, and all messages and data objects are signed by the NCSC. This allows users, nodes, and anyone else both to check that each block was constructed in accordance with the rules encoded in the GSCs, and to identify which agent is responsible for any deviation from these rules.

The CDM is unique among blockchain validation protocols in that users are ultimately responsible for determining a chain's integrity. If a coalition of dishonest nodes creates a dishonest fork of a chain, users are able to identify it and send their transactions to nodes validating an honest fork. If no honest fork exists, the CDM provides a mechanism for users to create one. A dishonest block is determinable instantly or practically instantly. As soon as the dishonest block is published, it is detectable by the user client.

Users have an obligation to do due diligence to make sure the chain they are using for their transactions is honest under the CDM protocol. The Due Diligence Smart Contract (DDSC) is built into both the user and the node clients to take care of these obligations automatically. Users thus to commit some computational resources to this effort, but are otherwise unburdened. Fortunately, users have an interest in writing transactions only to honest chains and so this obligation is incentive compatible.

Due diligence could be required at several different levels. For example

- User clients might run as low level background processes doing continuous integrity checks.
- Users wishing to submit UUTs are required to present some sort of Proof of Due diligence (PoD) order to get a node's NCSC to pass it on to the node.
- Users planning to make large transactions could do extra due diligence voluntarily to make sure they are using an honest chain.
- Users expecting to be on the receiving end of a transaction could do due diligence and suggest or demand that the sender use a node of his choosing.
- User clients could also watch as new blocks are constructed to make sure that transactions they sent or expected to receive were executed correctly.
- Any agent could run audits of a chain in hopes of finding dishonest behavior and receive an audit reward. The Audit Reward VUT is discusser further below.
- Nodes who pass on false transactions or ignore provably dishonest behavior by others in the network are also considered dishonest and are subject to audit and expulsion from the ANL. Nodes therefore have an interest in doing due diligence to make sure they are not somehow fooled by dishonest nodes.

Due diligence could also take many forms. For example:

- Random checks of various aspects of the blockchain to verify honesty. That is, applying the GSCs to the data in the blocks to re-derive and confirm the work done by nodes.

Searching for other instances of chains using the same genesis block and either reconnecting the forks, or checking to make sure that the fork a user chooses is an honest one.

User clients storing the set of recursive block hashes from a chain that the user has decided is honest can compare these to the hashes of the chain hosted by some set of newly discovered nodes.

User clients storing recent CLS hashes or hashes starting from a checkpoint (which would reduce the memory requirements).

Checking the set of nodes in the ANL to make sure they all have the same CLS.

h) Smart Contracts

Smart contracts can require significant resources from the validation network. To begin with, the smart contract itself might be a large data object and so take up significant amounts of storage. Smart contracts might also require large computational effort on the part of nodes to execute. Poorly written or malicious smart contracts might never terminate or attempt to harm the network, the blockchain, or others.

In any of the implementations, to protect the network and blockchain, interactions with smart contracts may be restricted to the production of ordinary UUTs. Any other products of a smart contract may be external to the chain Safeguards may also be put in place to prevent any external products of a smart contract such as messages and email from causing harm and to limit the amount of computational effort they require from nodes.

Although there is no abstract reason to restrict the set of languages used by smart contracts, in practice, nodes can only be expected to be ready to deal with a limited set. However, different instances of GeeqChain could allow different smart contract languages and functions.

A fee structure to compensate nodes for the extra, and possibly variable, load that smart contracts create may be developed. This could differ across instances of GeeqChain as well.

V. Forks and Federated Chains

As set out, GeeqChain is designed as a system of interoperable federated chains facilitated by two GSCs: CSSC: Chain Splitting Smart Contract; and FRSC: Fork Reintegration Smart Contract.

a) Moving Tokens Across Chains

GeeqCoins are able to move across all instances of GeeqChain because this is the only token that can be used to pay transactions fees or stake GBBs. Since GeekCoins are all pre-mined in the original instance of GeeqChain, they must be moved to new instances to pay such fees. On the other hand, new instances may have native tokens created in their genesis blocks or through other protocols. For example, IBM might buy a genesis block containing one million accounting tokens, each of which is the legal equivalent of one share of IBM stock. These native tokens could move between accounts on the original IBM chain, but it may be desirable to allow them to move to other chains. For example, a brokerage house or financial services company might consolidate all of a client's tokenized stock certificates on its own instance of GeeqChain.

Data items might also be moved or even replicated on different chains. A university might issue signed copies of the degrees it awarded and place them as data items on an instance of GeeqChain. The university might allow these data items to be replicated on other chains, possibly for a fee, or only with the signed permission of the degree holder.

A good way to think about moving tokens between chains is that tokens representing assets can be "teleported" from chain to chain. The token disappears on one chain and reappears on another. Protocols are designed to prevent "teleporter accidents" where the token is duplicated elsewhere while not being destroyed on the originating chain, is sent to more than one receiving chain, or is somehow held in a pattern buffer and then recreated later on the originating chain. It is also very desirable to prevent accidents in which tokens fail to materialize on the destination chain, but the consequences of this are far less damaging than duplication. (Recall the consequences of having two Will Rikers in Star Trek: The Next Generation, season 6, episode 24 (Second Chances). Unauthorized replication of tokens would completely undermine both the token economics and user confidence in the underlying blockchain. The loss of a star fleet officer or token, on the other hand, is unfortunate, but the risk is more at the level of an individual misfortune than an existential threat to the system.) Many types of data items, on the other hand, could be "replicated" locally on several different chains without harm. The owners or creators of these replicated items might be paid fees for allowing this.

Sending GeeqCoins from chain to chain without a central authority takes a number of steps. This begins with a user creating a Token Chain Transfer UUT and submitting it to a node on the chain that will send the tokens. The user identifies which node on the receiving chain to send the transaction to as well. The node passes this on to the current hub which creates a token destruction UUT. Both transactions are passed on to the nodes in the HTB. If the nodes find that both UUTs are valid, they write two corresponding VUTs into the current block. The token destruction VUT results in tokens being transferred to the system tomb account.

The hub building the next block notices the Token Chain Transfer VUT in the previous block and creates an Outgoing Token Transfer UUT which is sent out with the HTB to the nodes for validation and inclusion in the block. The user who originates the UUT is also responsible for choosing a node on the receiving chain to handle the transaction (which is part of the data of the UUT). Otherwise, the sending chain would have to resort to a time-consuming and possibly fruitless search to find a receptive node. As the NCSC sends the HTB to nodes, it also extracts this Outgoing Token Transfer UUT and sends it to the node on the receiving chain identified by the user.

Transfers from other chains require extra due diligence. This is executed by the node that received the Outgoing Token Transfer UUT as an additional sanity check before passing the transaction on to the hub. The exact details of what is involved are encoded in the GeeqChain GSC. If the transfer request does not pass, the receiving node sends back a notice of the failure to the sending node/hub. Doing such due diligence may take extra time and so the receiving node is not obliged to pass on the transaction until the sanity check is complete. Fees to processing such transactions may be correspondingly higher. If the Outgoing Token Transfer UUT does pass, the node converts it to an Incoming Token Transfer UUT by giving it a new transaction number, signing the new transaction, and then sending it on to the current hub, which in turn passes it on to the rest of the verifying nodes. The protocol may impose a delay of some number of blocks to allow nodes to do their own due diligence. If nodes are satisfied, they create an Incoming Token Confirmation VUT independently to be written to the block created X periods in the future. For example, it might be that nodes must write their conclusion about the validity of the Incoming Token Transfer UUT 10 blocks after the UUT was added to the receiving chain.

Protocol for Moving Tokens Between Chains:
1. A user sends a Token Chain Transfer UUT to a node on a sending chain
2. The receiving node adds the Token Chain Transfer UUT to its NTB and sends it to the hub.
3. The hub creates a Token Destruction UUT and sends this and the Token Chain Transfer UUT to all nodes in its HTB.
4. If the transactions are validated by nodes, two corresponding VUTs are added to the current block.
5. The hub coordinating the next block notes these VUTs and creates an Outgoing Token Transfer UUT and adds this to its HTB.
6. The NCSC sends the HTB to all nodes but also extracts the Outgoing Token Transfer UUT and sends it to the specified node on the receiving chain. If this fails, it continues the attempt for a specified time.
7. The Outgoing Token Transfer UUT is converted to a VUT on the sending chain and adds it to the current block. This ends the sending chain's part of the transfer.
8. The node on the receiving chain gets the Outgoing Token Transfer UUT and does a multi-period sanity check. If the UUT fails the sanity check, it sends a notice back to the sending chain which is included as a data record in the next block.
9. If the Outgoing Token Transfer UUT passes the sanity check, the node converts it into an Incoming Token Transfer UUT and includes it in an NTB sent to the current hub.
10. The hub on the receiving chain adds the Incoming Token Transfer UUT to its HTB and the NCSC sends it to all nodes on the receiving chain
11. Nodes are given a certain number of periods to check the ledger on the sending chain after which they must make a judgment about the validity of the Incoming Token Transfer UUT.
12. If a node decides it is invalid, it discards the UUT.
13. If a node decides it is valid, it converts it into an Incoming Token Transfer VUT and writes it to the current block. The proper account is credited with the incoming tokens in the next CLS update.

Note the process of transferring tokens across chains carries some risk for the sending agent. For example, the receiving chain may have a policy of not taking incoming token transfers, or the node chosen to receive the request may be offline for some reason and the Outgoing Token Transfer UUT may never be received. The protocol requires that multiple attempts be made to confirm it was not received, but if this does not resolve matters, the destruction of tokens on the sending chain is irreversible.

Most native tokens and data items follow the same procedure as above. Data items that can be replicated could follow a much simpler procedure.

b) Updating Protocols without Violating Protocol

Blockchain protocols are inflexible by design. Allowing trustless interactions between anonymous agents requires that the rules be well understood and unchanging (Code is Law). The downside of this is that useful upgrades and fixes can only be made through hard forks or complicated governance systems. (For example, on Nov. 9, 2017, bitcoin decided against a soft fork adding SegWit technology that would improve performance by moving some inessential data off the underlying blockchain. On the other hand, bitcoin cash is a hard fork using a different approach which increases block size and allows its blockchain to handle eight times as much data as the original bitcoin. Bitcoin's decision resulted in a steep decline in bitcoin price and an increase in value of the bitcoin cash token. Clearly, there is demand for a mechanism to upgrade and change blockchain protocols, but the current necessity of using forks to do so makes it costly, contentious, and difficult.)

The system of federated chains that the CDM permits provides an elegant solution to this problem. If an instance of a GeeqChain is found to have bugs, has become obsolete, or is not taking advantage of new technologies or user demands, a new instance could be created with the intention that it replace the existing instance. The new chain would have a genesis block with a new set of validators, GSCs, but no tokens. Users and validators on the old chain could choose to move to the new chain where the rules are different or stay where they are. If they choose to move their tokens, their actions are voluntary and within protocol. If they choose to stay, they can continue to live under the old rules. If enough users and nodes support the continued existence of the original chain, they can trade tokens under the original rules indefinitely.

It will not be too long before 256 bit (or greater) encryption can be broken by quantum computers. This will undermine the security models of all existing blockchains and almost most everything else in the cloud. Fortunately, quantum computational approaches to breaking encryption will come with new quantum-proof approaches to encrypting data. GeeqChain's federated architecture allows the creation of new quantum-ready instances of existing chains and applications for users to migrate to as quantum technology matures. This makes GeeqChain more future-proof than any existing blockchain platform.

c) Splitting Chains

GeeqChain can easily scale to handle 40 transactions per second using a network of 100 validating nodes on home broadband connections. While this is more than Bitcoin or Ethereum typically handle, it is conceivable that some applications might require even higher transactions volume. The main limiting factor is the upload bandwidth available to hubs. This might be solved by creating nodes on virtual machines hosted by a cloud service provider that offers as much bandwidth as required on an as needed basis. A downside of this approach is that nodes using ordinary consumer level broadband would not be able to participate in such networks. In addition, virtual nodes might be controlled, censored, or hacked by service providers, possibly due to government directives. Cloud-based nodes lose a degree of both their autonomy and anonymity.

Since GeeqChain is designed as a system of interoperable, federated chains, chains with excessively high transaction loads could be split into multiple, parallel instances. The Chain Splitting Smart Contract (CSSC) controls this.

Whether splitting is allowed at all, and under what circumstances, is written into the CSSC when a chain's genesis block is created. The CSSC would be invoked by the NTSC (of each node) to test if these conditions were met, and if so, would initiate the splitting operation. Effectively, a split is a sanctioned fork.

Nodes would be ordered by their public keys alphanumerically and the first half would go to chain A and the second half to chain B. User accounts would be split with half going to each of the new chains. Data items and smart contracts would be divided similarly. Both new chains would use the same genesis block and share the same blocks up to the point that they split. The block where the split takes place would contain a set of special transactions.

Note that a split does not require very much bandwidth to accomplish. The chain splitting transactions sent out by the two hubs contain ranges of nodes, accounts, and data items to be deleted. If these transactions are seen as valid by nodes, the nodes on each chain write a small block containing the special transactions, and the LSSC uses this to do a rather significant update to the CLS. This all happens locally at the node level, and so no bandwidth is required.

Once the split is complete, each fork continues to accept and validate UUTs as before. Each CLS acknowledges the split by including the following data: "Instance X of Geeq-ChainName created at block number B."

In this case, X would be either A or B, and if subsequent splits happened, those instances would be called AA, AB, BA, and BB (and if these splitting continued, we might end up with an instance called ABBA . . . ). This is to allow users to check whether they believe the split was sanctioned and correctly carried out, and also to allow users to discover on which instance of the chain their accounts have landed.

The CSSC is a protocol that permits GeeqChain to scale up to handle an arbitrarily large number of transactions per second. If an instance of a GeeqChain finds that the transaction load is too high, it can simply split to bring it down to a more reasonable level. New instances using the same genesis block can be spawned as needed to maximize the efficiency of transactions validation.

d) Reintegrating Forks

Forks created by the CSSC are sanctioned. Forks can also happen if the network of nodes becomes fractured or out-of-sync, possibly due to network failures or excessive latency. Provided that the nodes validating each fork are acting in good faith and following protocol, it would be wasteful and unfair to discard transactions on either fork. The Fork Reintegration Smart Contract (FRSC) is designed to reconcile honest forks and reintegrate them back into a single chain. It may also be desirable to reintegrate forks created by the CSSC if transactions volume drops to a point that the split is no longer needed.

Part of the CDM protocol requires chains to look for other instances built from the same genesis block periodically and to invoke the FRSC if any are discovered. Also recall that after nodes commit a block, they immediately send an NTB to the new hub, which includes a hash of the node's new CLS. If the hub finds that these are not identical, it invokes the FRSC to try to resolve the problem. The process works as follows.

Chain Reintegrating Protocol:
1. If chains building on the same genesis block discover each other and find that their chains are out-of-sync, the current hubs send each other a notice and block building is suspended. Each hub sends the other one the last one hundred CLS hashes of its own chain.
2. It is likely that the hashes will agree at some block number in this history. If not, additional history may be sent. Alternatively, a rule may be used that one or the other is the correct chain, perhaps depending on the average number of transactions per block, the number of validators, the current block number, etc. While this is not as desirable, if the hubs have been out-of-sync for too long, it may be impractical to reintegrate them. Recall, however, that our system requires users to be responsible to do due diligence. If they find two forks, they should notify each to initiate reintegration. If this fails, users are able to check which of the two would end up taking precedence by protocol and can choose to send their transactions to stronger fork.
3. Suppose that block B is the last one the two forks have in common. The FRSC designates one of the current hubs of the forks to be the metahub, and the other hub transmits all the divergent blocks from B+1 up to the current block.
4. The metahub puts the HTBs contained in all of these divergent blocks into a kind of meta-HTB and sends it to all the nodes in the ANLs of each of the forks.
5. From there, the process is similar to the normal process of validation. The difference is that the FRSC is used instead of the PBSC. The FRSC starts with the B+1 HTBs of each fork and determines the correct aggregate PTB for B+1. It builds the FVB, and commits this to its own copy of the chain in place of the original B+1 block. Note that this is rewriting history, but only according to protocol.
6. The FRSC continues this way block by block until it reaches the last set of divergent blocks.
7. The ANL and CLS will be different after the FRSC finishes its work, and so each node runs the NTSC to find the new network topology and continues to build new blocks. The only difference is that the next hub will not attempt to reintegrate forks even if they are discovered. It will simply build the next block from the accumulated transactions. This is to prevent the CDM from falling into a loop of endless reintegrations with no new transactions ever being validated. After the next block is committed, subsequent hubs will again check for the existence of lost forks.

VI. Audit and Recovery

GeeqChain is constructed so that any dishonest behavior will be evident on inspection. This is true to a great extent in other blockchain protocols as well. What makes Geeq-Chain different is that it provides tools that allow these problems to be identified, addressed, corrected, and documented. Two GSCs are fundamental to this process: BASC: Blockchain Audit Smart Contract; and CRSC: Catastrophic Recovery Smart Contract.

a) Audits

Users, nodes, and anyone else who wishes to can inspect a GeeqChain for dishonest validation or violations of protocol. If such behavior is discovered, an Audit UUT is submitted, and if nodes verify it, the agent calling for the audit is rewarded with tokens. Dishonest nodes are also written out of the ANL.

One might wonder why dishonest nodes would validate audits proving their own bad behavior. It may very well be that they don't. However, this simply means that the version of the chain they create will contain another verifiably false element. If there is at least one honest node, the correct Audit UUT will be verified, added to an honest chain, and a reward paid to the agent who called for the audit. Transactions written to dishonest chains are per se invalid under CDM protocol. That is, if a chain is honest up to block B contains a transaction or something else that does not follow protocol which, all transactions in block B and all blocks appended afterward are considered invalid. Users therefore have a strong incentive to find and use only honest chains for their transactions. Thus, it does not matter whether a dishonest node validates the audit or not under the CDM. No matter what the node does, the chain it creates will be ignored by users and it will ultimately be orphaned.

There are many ways a chain may violate some aspect of CDM protocol. For example:
Transactions within a block may be invalid because they spend more tokens than were in an account, do not follow other aspects of the business logic of the chain, or have false user signatures.
Fees may not be correctly calculated.

Incorrect hubs or network topologies may be used.

User generated smart contracts may be executed incorrectly.

Signatures of nodes, hubs, or the NCSC on or in UUTs, NTBs, HTBs, or FVBs may be incorrect.

Sanity checks by nodes might be incorrectly constructed.

The ANL may be incorrectly constructed.

The CLS may be incorrectly calculated.

Chains may have split without the correct sanctioning from the CSSC.

Forks may be reintegrated in a way that does not follow the FRSC.

The common thread is that they are all violations of the GSCs of the chain. An audit transaction therefore can be created containing the inconsistent elements and identifying the GSC that proves it. For example, if a transaction is invalid, the Audit UUT might contain the block with the bad transaction from the dishonest nodes and a copy of the same block from an honest node. Nodes would be able to run the correct GSC over the HTB the blocks contain to prove that a node behaved dishonestly.

Another kind of problem is failure to follow communications protocol. For example:

Nodes may ignore UUTs of various kinds submitted by users.

Hubs may ignore NTBs sent by nodes.

Nodes may ignore HTBs sent by hubs.

Nodes or hubs of forks may ignore messages attempting to reconnect them.

The common thread in all these cases is that messages sent though the NCSC are being ignored. The various certificates issued by the NCSC make this provable. For example, if a user gets an R-cert proving that a node received a UUT but this UUT was not included in the NTB sent out by the node, the user can submit an Audit UUT to another node containing the UUT and the R-cert. The UUT would be checked to see if it should have passed the sanity test, and if it did, the NTB of the node would be checked to see if it contained an F-cert for that transaction. If the F-cert is found in the NTB, it proves the $R^2$-cert was not received from the user's NCSC and that the node, therefore, never actually saw the UUT. If the F-cert is not in the NTB, it proves the node intentionally ignored the incoming UUT and the node would be removed from the ANL. The user sending the Audit UUT might be required to pay a stake that is confiscated if the audit fails.

Yet another kind of problem involves attempts to alter history. For example:

The recursive hashes of blocks that guarantee the linearity of the block chain (the Merkle tree) are inconsistent at some point.

The genesis block might not be correctly signed.

A node might not make available a complete copy the blockchain or the CLS.

These types of problems would have to be addressed with an Audit that directly accesses the node's IP address to see what is there.

b) Recovery

Suppose all nodes were dishonest and no node calls for an audit when a false transaction is written. The conspiring nodes could produce a single chain that is unanimously "verified", but which contains provably false information. (We call a collusive agreement by all nodes to unanimously validate false transactions, blocks, or chains a "conspiracy" from here on.) Since there is no honest fork of the chain, users would have to decide to trade on the dishonest chain or abandon their tokens. Any user or agent who notices a conspiracy can invoke the Catastrophic Recovery Smart Contract (CRSC).

Catastrophic Recovery Protocol:

1. An agent creates a Catastrophic Recovery UUT and submits it to the CRSC running on the agent's own client. That is, the UUT would not be submitted to any node, but instead would run locally.
2. The Catastrophic Recovery UUT contains a list of all the active nodes the user was able to discover along with standard audit evidence showing that they are dishonest. It might be that all dishonest nodes are "validating" the same instance of the chain, or that several groups of dishonest nodes exist "validating" different chains. These would be grouped together.
3. The CRSC first would engage in node discovery in an attempt to find additional versions of the chain. If it did, it would return the information to the user invoking the CRSC asking him to check these instances for honesty.
4. If no other instances were discovered, the CRSC would use the GSCs to test whether all the instances identified by the user were indeed dishonest.
5. If all instances were dishonest as claimed, the CRSC would create a Catastrophic Recovery VUT which would be provided to the user. This would include an ANL transaction that removes all nodes found to be part of any dishonest chain
6. The CRSC would identify the last honest block available in any of the dishonest chains. More specifically, the user would have pointed out at least one dishonest block in the chain or chains he identified in the audit, and the block immediately previous to this with the greatest height would be the block on which the new chain would be built.
7. The user would then be authorized to add the Catastrophic Recovery VUT as the next block. The user might be the only validator in this case.
8. Transaction validation and chain building continue from this block as normal on this new chain.

There are four additional points to make here. First, the user might have intentionally or unintentionally failed to identify the earliest dishonest block. In this case, the new chain would also be invalid and some other user would call for a Catastrophic Recovery Audit. Second, many users might notice that no honest chain exists at the same time. In this case, the FRSC would be called to reintegrate all the new chains Third, the CRSC is very disruptive and bringing together recovery forks could be time-consuming and messy. Avoiding it only requires that one honest node exist. The CDM makes universal (or even individual) dishonesty contrary to the interests of nodes. Thus, the only way the CRSC would ever be invoked is if all nodes were willing to suffer these consequences simply to watch the world burn. Fourth, a very simple way to guard against this catastrophic eventuality is make sure that each chain includes one or more "trusted agents" as nodes. For example, the initiating blockchain entity, that builds an application on a GeeqChain genesis block, a reputable accounting firm, or even the Federal Reserve Bank, might add itself to the ANL of a chain. Such agents are "trusted" in the sense that it is highly unlikely that they would conspire with dishonest nodes to bring on a blockchain Apocalypse. Note, however, that such trusted agents are in no way special under the CDM protocol. They have no greater power than any other anonymous node in the ANL. Their value is that their presence increases the likelihood that at least one node will behave honestly on any given chain and so the CRSC will never have to be invoked.

VII. The CDM and SPS

In this section, we put together the elements developed in the previous sections to describe the complete CDM protocol and prove that it provides SPS.

a) The CDM on a Faulty Network with Strategic Validators

In Subsection III(a), we outlined the CDM workflow under the assumption that all nodes are honest, are successful at communicating with one another, and that do not strategically censor or ignore communications to and from other nodes. In practice, networks can experience latency, nodes can become cut off from the internet due to equipment failure, hostile actors may launch DoS attacks, and so on. We refer to these and other events outside the control of the two nodes who are trying to communicate collectively as "natural network failures." It may also be that nodes choose to intentionally prevent their NCSC from making contact with the backbone router temporarily or intermittently. We refer to this as "strategic network failure". As we noted in the previous section, the structure of the network makes it impossible for any node to selectively reject incoming or filter outgoing messages. In this section we show how the CDM, using a network implemented by the NCSC, both prevents manipulation of the blockchain by dishonest nodes, and leaves the system robust to genuine network failures. We begin by modifying the basic work flow outline in the previous section.

The following describes the CDM Protocol according to an example.

1. Receiving Unverified User Transactions (UUT): Users send unverified transaction requests to one of the verifier nodes on the network. More specifically, a transaction is created with a user client that produces a well formed UUT and also does a certain amount of due diligence to verify that the chain being built by the node is honest. The user may also choose to invoke the DDSC to perform additional checks if he believes it is warranted. The user client invokes the NCSC and provides it with the UUT and the required PoD. The user's NCSC then attempts to contact the node's NCSC. If the PoD checks out and R and $R^2$-certs are successfully exchanged, the node's NCSC releases a cleartext copy of the UUT to the node. If the PoD does not check out, the UUT is discarded. If an $R^2$-cert is not received from the user's NCSC, the node's NCSC provides the node with an F-cert.

2. Sanity checking: If the UUT makes it to the node, the node invokes the TSSC to make sure it is credible. If the UUT fails, it is discarded. Otherwise it is saved. F-certs are also saved.

3. Waiting for commitment: Each node accumulates transactions and F-certs until it finishes building, verifying and committing the block currently under construction. Note that each node constructs and keeps its own copy of the blockchain, so "commitment" is a local phenomenon that takes place separately at each node.

4. Choosing a network: Each node invokes the NTSC and provides it with a hash of the CLS. This determines the topology of the network that will be used to build the next block in the chain. In particular, it tells each node where it fits in the network, which node it reports to, and which nodes report to it. In the simplest case, the NTSC designates one node as the hub and all other nodes as ordinary validators that report to it.

5. Searching for and reintegrating honest forks: The first thing the new hub does is broadcast a hash of the CLS to the entire ANL. If any node receives this and finds that it has a different hash, the FRSC is invoked in order to reintegrate the forks. One of the current hubs on these forks is randomly designated the metahub and manages the process. If the FRSC finds that a fork contains a block that is dishonest in any way, the reintegration stops at the previous (honest) block and any nodes who committed the dishonest block are removed from the ANL. Once the reintegration is complete, the NTSC is invoked using the new CLS hash, and a new hub (and associated network) is chosen. Step S is skipped and the process picks up at step 6. Even if forks still exist, they are ignored for the present and an ordinary block of transactions is constructed and committed to the chain Thus, only one reintegration is allowed between the building of fresh blocks. This is to prevent the CDM from falling into a loop of endless reintegrations with no new transactions ever being validated.

6. Checking for a sanctioned chain split: If a given instance of a GeeqChain allows for automatic chain splitting under certain conditions, the hub invokes the CSSC to see if they are satisfied. If so, the split is carried out. This supersedes the building of a new block. When the split is complete, each new chain starts again at step 4, finds the network topology given the new CLS hash, and continues to build blocks.

7. Sending Node Transactions Bundles (NTB) to the hub: Each node invokes the Transactions Bundle Smart Contract (TBSC) to create a bundle of credible but unverified transactions and communications certs that have arrived while the last block was being committed. Each transaction and cert in the resulting NTB is signed individually, bundled together, signed collectively, and transmitted to the hub. The NTB also includes the block number it is intended for and a hash of the node's CLS. The node then invokes the NCSC to send the NTB to the current hub. It may happen that a node is not able to get messages to the hub due to natural or strategic network failure or dishonest actions by the hub. If the node receives a B-cert proving that the node's NCSC was unable to connect with the hub's NCSC, it uses this to invoke the LCSC. This contract either connects the node to the existing hub, or designates a new potential hub. Eventually, a connection is made. The node sends a "suspend" ANL UUT, uploads any blocks that have been written while it was disconnected, checks them for honesty, sends a "reactivate" ANL UUT, and continues to validate transactions and build the chain as before.

8. Sending the Hub Transactions Bundle (HTB) to all nodes: The hub waits for NTBs to arrive from nodes. If none do, either the hub is disconnected from the network, or the "hub" has made an error involving the NTSC and so is not the true current hub. The hub invokes the LCSC in this case and the procedure is similar the step 7. If the hub does receive NTBs from nodes, it invokes the TBSC. The resulting HTB includes a copy of each NTB signed by the hub and a collective signature. Note that the hub also receives UUTs from users and creates certain UUTs on its own. Thus, the hub also contributes an NTB to the HTB. The hub then sends the HTB out to each node in the ANL using the NCSC. Some of these attempts at contact may fail. In this case, the hub will receive a B-cert from the NCSC proving it. The hub will include this with the NTB it sends to the hub responsible for building the next block.
9. Building a Proposed Transactions Block (PTB): All nodes (including the hub) start with the same CLS and the same HTB (assuming the HTB arrived at the node). These are used in combination with the business logic of the chain to check the validity of each UUT in the HTB and also to write a number of other Verified User Transactions (VUT) locally, such as fee payments for the validating nodes. This is done by invoking the PBSC which in turn invokes the ANSC to deal with ANL UUTs, SCSC to deal with Smart Contract Call UUTs, and the BASC to deal with Audit UUTs. The resulting set of VUTs is put together by the PBSC as a PTB. On the other hand, if the HTB does not arrive from the hub after some interval of time, the node invokes the LCSC. The LCSC is also invoked if the hub's NCSC provides it with an F-cert proving that the hub never returned the $R^2$-cert and so the Node's NCSC never released HTB to the node. The node includes the F-cert in the next NTB it sends to a hub.
10. Committing the Full Verified Block (FVB): Each node invokes the BCSC and provides it with the HTB from the hub, and the PTB it just created. The BCSC creates a Committed Block Header (CBH) that includes the block number (that is, the "height" of the block being added), a hash of the previous block, and a hash of the CLS for the previous block. The PTB and HTB are added after the header to complete the FVB which is added to the local copy of the blockchain
11. Updating the CLS: Each node invokes the LSSC and provides it with the CLS and PTB created in step 9. The LSSC uses this to calculate an updated CLS which the node makes publicly available.
12. Choosing a new network: The process begins again with each node returning to step 4, invoking the NTSC using the new CLS hash to find the new network topology.

b) A Formal Proof that the CDM has Strategically Provable Security

The objective in this subsection is to show that the CDM on a faulty network with strategic validators provides SPS for transactions. In particular, we show that given the network and mechanism, agents have access to enough data to allow them to initiate successful audits if nodes behave dishonestly. As a result, no attempt by dishonest agents to subvert a CDM based blockchain would ever be successful. We build this proof through a series of statements (e.g. a proof claim).

Statement 1: Unless the network is completely down, users are able to submit UUTs and receive R-certs.

Proof for Statement 1: Each node publishes its version of the CLS which includes the ANL containing the IP addresses of all active nodes. Unless the network is completely down, the user will be able to view the current ANL and choose a node. If this node happens to be offline due to natural or strategic network failure, the user's NCSC will provide a B-cert. By trying other nodes in the ANL, the user's NCSC will eventually find a node it is able to connect with unless the network is completely down. Since all incoming messages look the same to receiving NCSCs, once a UUT is sent to the node, the NCSC returns an R-cert, waits for an $R^2$-cert to come back, and then releases the UUT to the node. Thus, any user that can contact at least one node can get an R-cert for his UUT.

Statement 2: If a node omits a UUT received from a user from its next NTB, then either the node never contributes an NTB to help build a block again or it will fail an audit.

Proof for Statement 2: UUTs include Time-Stamps from the receiving node's NCSC. Suppose that a node received a UUT and did not include it in the next NTB it sent to the hub. If the hub includes this flawed NTB in the HTB it sends out to nodes in step 8, the flawed NTB will be visible in any block that gets written. Therefore, the flawed NTB signed by the misbehaving node is publicly available, and by Statement 1, the user has an R-cert with a Time-Stamp showing the missing UUT was received before other UUTs were included in the flawed NTB. (The misbehaving node could send one last partial NTB that included all UUTs with Times-Stamps before the UUT it was trying to censor, but if it sends another, the logic just outlined applies.) This is enough data to run a successful audit through the BASC. The only two ways to prevent this evidence from coming to light are for the node not to send the flawed NTBs to the hub or for any hub that receives an NTB in the future from the misbehaving node to omit them from the HTB it produces. In either case, the node will never contribute an NTB to help build a block again. @

Statement 3: Unless the network is completely down, users are able to submit UUTs that will be included in a block (possibly after some delay) or else at least one node will fail an audit.

Proof for Statement 3: After sending a UUT to a node, the user's client monitors the blockchain to make sure it gets included in a block. If it does not, one of the following cases holds:
  (a) The receiving node omitted the UUT from the NTB it sent the hub. Then by Statement 2, the misbehaving node will fail an audit.
  (b) The node is no longer sending NTBs to the hub. The user client is able to see the HTBs in the new blocks and so the absence of the NTB in question is easy to detect. In this case, the user follows the same strategy as in Statement 1 of submitting the UUT to each node in succession. Eventually all the nodes that are online will have received the UUT. At this point, any NTB a hub includes in the HTB that gets written into a block must either include the UUT or omit it and leave the sending node subject to an audit as described in Statement 2.
  (c) Hubs are writing false NTBs to the HTBs. That is, the UUT is omitted from the HTB because the hub changed the NTB that included it before building the HTB. The altered NTB could not be properly signed by the "sending" node. Since the false NTB is publicly visible in the block it contributes to, it can be submitted to the BASC for a signature verification audit.
  (d) Hubs selectively ignore NTBs from nodes containing a specific UUT. In this case, the node will have an R-cert from the hub (since the hub cannot stop the work of the NCSC if it is online) and will not have an F-cert proving that it never got the NTB. This is enough for the node to launch a successful audit of the hub for not following communications protocol.
  (e) All nodes stop sending NTBs to the hubs, all hubs stop accepting NTBs from all nodes, or all hubs stop creating and sending HTBs. That is, the network is completely down for natural or strategic reasons.

Statement 4: If a node sends an NTB to the hub and the hub is online, the hub must include it in the HTB it produces and distributes or it will fail an audit.

Proof for Statement 4: If a hub is online, it cannot discriminate over or filter incoming or outgoing messages.

Thus, if an NTB arrives from a given node while the hub is online, an R-cert goes to the node and an $R^2$-cert is received from the node which releases the NTB to the hub. If the hub chooses not to include the NTB in the HTB it produces, the node would have an R-cert proving that the hub received the NTB. The relevant block would include a copy of the HTB signed and published by the hub that omitted it. This is proof that the hub is dishonest which an audit using the BASC will confirm. @

Statement 5: If an honest node sends an NTB to the hub and the hub is offline, then the transactions it contains will eventually get to a future hub for inclusion in a block on an honest chain.

Proof for Statement 5: Faulty or intermittent networks may result in the hub only receiving NTBs from a fraction of the active nodes. The fault may lie on the node's side, the hub's side, or somewhere in between. Regardless, if the hub receives any NTBs, it follows protocol and builds a block. Nodes that tried but failed to make contact with the current hub follow protocol and invoke the LCSC. The LCSC attempts to reestablish contact and, failing that, designates new hubs to reestablish the validation network. Eventually, contact with an online hub will be made and the NTB will be forwarded to the hub. If a node is completely isolated from the rest of the network for some reason, the LCSC will ultimately designate the node itself as the hub in a degenerate network containing only itself. In any event, the NTB will either be added to a block or the node will get an R-cert from an online, but misbehaving hub. In the latter case, Statement 4 applies and an audit will prove that the hub is dishonest. Finally if no online hub is found to be honest, the ANL used by the node will include only the hub itself (the degenerate network) and the node will write the NTB to a block itself. Thus, regardless of the network quality, any valid transaction that makes it to an honest node will eventually be included in a block on an honest chain.

Statement 6: If any block does not follow communications, block construction, or transactions validity protocols, both users and nodes have enough evidence to initiate an audit.

Proof for Statement 6: There are many ways that protocols might be violated. We show below that evidence will be available in the blockchain to run a successful audit using the BASC.

(a) The HTB contains bad signatures: This means that some items do not bear valid signatures of the users, the originating node, the hub, or the NCSC. Submitting the HTB to the BASC for an audit will show that the signatures are invalid and identify the responsible nodes.

(b) The PTB contains bad transactions: UUTs could be user, fee, audit, or other transactions. Thus, the PTB may include user transactions that should have failed the credibility check or do not satisfy the business logic of the chain. It may also contain fee or audit reward transactions that pay too much or too little to validating nodes, or audit transactions that are not supported or do not follow the logic of the GSCs. Submitting the HTB, PTB and the CLS from the previous block to the BASC will show that the transactions in question were bad and identify the responsible nodes.

(c) The ANL is incorrect: Joining and leaving the ANL is done through the ANSC according to specific rules. Requests to join are in the form of special UUTs that are transmitted, validated and committed just like other transactions. To remove a node from the list, a UUT requesting removal and signed by the node or evidence and conclusions from an audit that show that the node behaved dishonestly are required. If both of these are missing, then the node should still be in the ANL. If this is not the case, submitting the ANL from the previous block as well as the PTB and the ANL from the current block to the BASC will show that the ANL was not constructed correctly and identify the responsible nodes.

(d) The next hub is chosen incorrectly: The NTSC uses the CLS of the current block to choose the next hub in a pseudo-random way. The only exceptions to this rule are covered by the LCSC and an audit transaction would have to appear in the previous PTB that contained enough evidence to justify deviating from the NTSC. In either case, submitting the PTB and CLS to the BASC will generate an audit transaction proving misbehavior.

(e) Forking or merging transactions are incorrect: Forking can take place if nodes lose contact with one another. This is governed by the LCSC. As above, an audit will also determine if the fork was correctly authorized and executed. Forks may also occur as a result of excessive transactions load under the CSSC. Again, evidence justifying the split are recorded in the block where the sanctioned fork occurred. Forks attempt to merge, and if two honest forks find each other, go through a block by block comparison of transactions starting for the last common point using the FRSC. If the merge was not authorized or done in a way that violates the FRSC, the evidence will appear in the meta-HTB and can be proven with an audit.

(f) The CLS is incorrect: Submitting the PTB and CLS from the previous and current blocks to the BASC for an audit that uses the logic of the LSSC will show that the PTB did not support the transition between the previous and current ledger states and identify the responsible nodes.

(g) The genesis block is not correctly signed or has an inconsistent hash: This is trivial to verify.

(h) The Merkle tree hashes in blocks are inconsistent at some point in the chain. This is trivial to verify.

(i) Transactions are incorrectly formed or are of a type not allowed on the chain given the GSCs in the genesis block: This is trivial to verify.

Thus, any deviation from the rules laid out in the GSCs are detectable and so misbehaving nodes that participate in "validating" any dishonest action are subject to audit and exclusion from the ANL of honest chains.

Statement 7: Assuming the network has not completely broken down and that nodes and agents always choose to launch audits when they will be successful:

All valid UUTs will find their way into a block committed to the honest chain. This includes fee, audit, smart contract, data objects and other transactions.

No invalid transactions will find their way into a block committed to a chain without this fact being provable from data the chain itself must include. Thus, users are able to distinguish honest from dishonest chains (or forks of chains).

Any violation of the GSCs including unauthorized or incorrect forks, and merges, inconsistent CLSs and Merkle hashes, and manipulations of the ANL will be provable from data included in the chain.

Proof for Statement 1: Follows directly from Statements 1 through 6.

Statement 8: Blockchains validated by the CDM offer users 100% BFT:

Proof for Statement 8: Statement 7 shows that if an honest node exists, then an honest chain will exist and users will have a place to send UUTs for validation. In addition, all dishonest forks and chains are detectable through audits. Thus, if there is an honest node or nodes online, then the transactions validated through the resulting (possibly trivial) network get written to blocks that are themselves valid under the CDM protocol. If several honest forks exist, then the FRSC will eventually merge them and any honest transactions will be included in the reunified honest chain. If no honest node exists, then any user can invoke the CRSC and start an honest chain on his own. Thus, users will always be able to find or create an honest chain for their transactions regardless of what percentage of the nodes are dishonest. As a result, the CDM offers 100% BFT for users who do due diligence and refuse to send UUTs to dishonest chains.

A 100% BFT is still not quite as good as SPS. Suppose the following:

All nodes are dishonest.

All nodes are able to communicate and coordinate, and trust one another not to deviate from agreements to be dishonest and thus share the resulting profits.

Many of the nodes are Sybils run by the same agent.

Is it possible that a coalition of all the nodes on a network could profit from dishonesty? Given that their dishonest behavior would be detected by users immediately, any transactions they wrote stealing tokens would quickly live only on an orphaned fork. Thus, the only possible way to profit is to somehow move the tokens off the chain before this happens. Of course, this is literally impossible, so in practice, dishonest nodes would need to find a way to move the value of the tokens off-chain.

Moving value off-chain would require that some gullible agent agree to give something to the dishonest agents who are running the nodes in the real world. For example, a gullible agent might agree to "buy" tokens and transfer dollars to bank accounts of dishonest agents, or transfer the title of a car to dishonest agents in exchange for tokens written to the gullible agent's account.

This is rather farfetched, of course. The gullible agent would have to transfer something to dishonest agents quickly (given the 10 second or so block writing time) and irrevocably. Moreover, many gullible agents would need to be lined up at the same time for the dishonest coalition to make a significant off-line profit. Alternatively, a few gullible agents willing to make large real-world transfers to the dishonest agents but who for some reason were not willing to perform due diligence to make sure the chain the tokens were written to was honest would be needed.

Suppose all of these things somehow came together. What would it take to prevent dishonest nodes from profiting? If one or more of their numbers defected from the conspiracy and refused to validate the dishonest transactions, then an honest fork would exist, and the dishonest fork would be orphaned. Convincing a node to defect requires the audit reward the node receives to be larger than its share of whatever the conspiracy can steal.

Thus, suppose the following:

V—the total value that dishonest nodes think they can move off-chain.

N—number of validating nodes

A—number of independent agents running validating nodes.

H—the number of node who decide to honestly report the bad behavior

D—The number of nodes who decide to follow the conspiracy and behave dishonesty (N−H=D).

G—amount held in the GBB of each node.

R—The audit reward where R=GD/H.

Statement 9: Suppose that all the nodes join a conspiracy to steal and move off-chain the maximum value they can. Then if $G>V/N(A-1)$, at least one agent running a node will be better off reporting the conspiracy than following through on his commitment to be dishonest.

Proof for Statement 9: If there are A independent agents, then the average payoff colluding agents receive is V/A. If any agent gets more than this, another must get less. Suppose first that all agents run the same number of nodes (N/A). Then if one agent defects from the conspiracy, he collects the GBBs from all other nodes. (If one agent defects from a conspiracy, it does not matter whether one, some, or all of the nodes he runs call for the audit. To see this, suppose only one of his nodes calls for an audit. The agents collects the GBB from the "dishonest" nodes he runs, but this is his own money. The agent could have kept these tokens by simply writing a "Leave" ANL UUT. The net audit reward is therefore the GBB's of the nodes of the other agents if they decide to behave dishonestly.) Since N/A of these are nodes are owned by the defecting agent, the value of the GBBs collected from the nodes belonging to other agents is $GN(A-1)/A$. Thus, if $GN(A-1)/A<V/A$, the agent is better off defecting. This is true if and only if $G>V/N(A-1)$.

Now suppose that agents run different numbers of nodes. Then some agent must run fewer than N/A nodes. If such an agent defects, therefore, he collects GBBs from more than $N(A-1)/A$ nodes. In other words, the total reward to defecting is even greater for agents running smaller numbers of nodes and so the agent with the smallest number of nodes will certainly defect if $G>V/N(A-1)$.

Suppose that the conspiracy tried to head this off by giving such nodes a proportionally greater share of V. In particular, if agent i runs $N_i$ nodes a $\Sigma_i N_i = N$), then agent i gets an audit payoff of $G(N-N_i)$. Suppose that the conspiracy tries to give each agent this payoff for participating. In total, these payoffs would equal $\Sigma_i G(N-N_i) = G(AN-\Sigma_i) = G(A-1)N$. Thus, if $V>G(A-1)N$, the conspiracy is able to share V in a way that makes all agents better if they do not defect. Unfortunately, this would require that $V/N(A-1)>G$ which contradicts the hypothesis of the Statement. Thus, regardless of the pattern of node ownership and the sharing of the proceeds of the theft, there is at least one agent who would better off reporting the conspiracy if $G>V/N(A-1)$.

This leads us to our final statement:

Statement 10: If $G>V/N(A-1)$ then a blockchain validated by the CDM offers SPS.

Proof for Statement 10: Statement 9 demonstrated that at least one agent will initiate a successful audit if $G>V/N(A-1)$. In doing so, he must prove to the BASC that the block he is writing is correct and honest. Once this block is committed, an honest fork will exist. Therefore, the CRSC will never need to be invoked.

Dishonest nodes will end up holding tokens and GBBs on dishonest forks that no user will ever choose for transactions. The dishonest fork will therefore be orphaned. Collectively, the dishonest nodes lose GBBs worth DG as a result. It is possible that DG<V and so the dishonest nodes may in fact profit. This would require that the gullible agent or agents make the real-world transfer without waiting for their user clients to confirm that it went through on an honest chain (or the gullible agents perhaps ignored their user clients). While this does mean the gullible agents are robbed, it is a real-world robbery, not a theft of tokens. Moreover, had the gullible agents taken precautions that the CDM protocol requires, even this would not have been possible.

We conclude that the CDM guarantees that an honest chain will always exist and, given the audit rewards, that the CRSC will never need to be invoked. All nodes know that any dishonest behavior will be reported by at least one other node to the BASC, which will result in the confiscation of their GBBs. This means that there is no possibility of holding on to tokens stolen as a result of any type of conspiracy. Assuming it is not possible to move enough value offline and retain it, the best response of all nodes is to behave honestly. Thus, honest validation is a coalition-proof equilibrium. Moving sufficient value offline requires that users do not follow protocol and behave contrary to their own interests. Therefore, the CDM offers users SPS.

VIII. Clients/Nodes a) User Clients

Each new instance of GeeqChain is built from a genesis block that contains the GSC. The user client incorporates these as well as some additional code to weave them together and provide a GUI that makes it easy for users to interact with the chain.

This GUI may be customized depending on the use for which a given chain is deployed. For example, if a chain is intended only to transfer GeeqCoins from account to account, the main GUI should focus on making it easy for users to create well-formed token transactions. If a chain includes smart contacts, data items, or native tokens, interfaces to facilitate their use would also be needed Chains with more complicated business logic such as Content Management Systems or two-sided markets could have even more elaborate GUIs. GUIs, and the code weaving together the GSCs, are not integral to the operations of the chain. Users or service providers are free to write different versions as they see fit and to update and modify existing versions.

In addition to allowing users to easily interact and use applications built on GeeqChain, well-written user clients must do a number of things in the background and automatically:

Node discovery: The user client needs to know how to contact nodes in the blockchain. To facilitate this, the clients include the genesis block with the initial set of active nodes. The client should be programmed to contact the network periodically and download and store certain data. This includes the ANLs from recent blocks. Unless there is enormous churn in the set of active nodes, the client should be able to pick up the network starting with a slightly out-of-date ANL, find the current ANL, and proceed. Failing this, other methods of finding the current ANL such as the use of search engines or fixed webpages could be used. Forks should be discoverable by searching the chain for the appropriate transactions and then following the ANLs to find the nodes that diverged or lost contact.

Due diligence: Which node on which fork of a chain to send a UUT to is ultimately the choice of the users. Fortunately, users have an interest in writing transactions only to honest chains. Finding honest chains requires work and due diligence on the part of users. Clients running as background processes do small amounts of due diligence continuously. If the client finds any dishonesty, it creates an Audit UUT by default. Users are allowed to calibrate this to choose what level of effort they wish to allow their client to expend. It might very well be that many users will allow their clients to expend considerable computational effort when the computers they are installed on are not otherwise in use. Users would benefit from the high level of confidence this would give them that the chains they use for transactions are honest. Proof of Due diligence at some level is also required to submit a UUT, and this must also be handled automatically by the user client.

Checking for commitment: Once a UUT is submitted, the client watches the blockchain to make sure that it is properly written to the next block. If it is not, the client resubmits it to another node and/or initiates an audit if required. Clients can also be set to watch for incoming transactions being written to chains and to notify the user when they are committed, or to notify the user if any outgoing transactions occur from the user's accounts.

Catastrophes: If a user client is unable to find a fork of a chain that it thinks is honest, then the CRSC could be invoked. A user could choose to instruct his client to do this automatically or simply notify him that things have gone very wrong.

b) Nodes

If an agent wishes to act as a validating node on a GeeqChain, his first step is to download and install the official node client on his computer. He makes the client available at some IP address and then submits an ANL UUT to an existing node.

The node client is in many ways simpler than the user client. It includes software to weave together the GSCs so that they implement the CDM protocol as outlined in section VII, but is intended to run automatically without any input from the agent who installs the node. A very minimal GUI is provided to allow agents to submit ANL UUTs, but otherwise, a node client just follows protocol.

Agents might choose to build their own node client from scratch or to modify the official user client. Since the client and all the GSC are open-source (except the NCSC), the latter would be easy to do. Doing this might be entirely innocent. An agent might be interested in seeing statistics about the transactions he validates, the state of the network, or integrating user node functions into a single client, for example. Provided that the result is a client that follows the CMD protocols and the GSC written into the genesis block of the chain, this is perfectly fine. On the other hand, an agent might try to rewrite the node client in an effort to manipulate the chain or collude with other validators. Any such effort that leads to violations of the protocol or GSC is detectable and so it is highly unlikely any agent would attempt to do this.

IX. Applications

In this section, we outline a number of possible applications that could be built on GeeqChain genesis blocks.

a) Micropayment Platform

The low cost and high transactions volume of GeeqChain make it ideally suited for use as a micropayments platform. This might be implemented as part of a smart city system to allow citizens to pay for parking, bridge tolls, subway fares, items in vending machines, or minor city services. Consumers could use an instance of GeeqChain to buy entertainment, gaming, and other content on the internet from providers. IoT devices could make micropayments via GeeqChain to buy and sell services (CPU cycles, shared storage, or electricity produced by solar panels, for example).

As an example of the revenue potential of GeeqChain, consider a micropayment platform using the following fee structure (only one of many possible fee structures):

Fixed fee to the node receiving the transaction: 0.1¢
Percentage fee paid and divided over nodes: 0.25%
Percentage fee paid to Initiating blockchain entity: 0.25%
Maximum fee for any transaction: 10.1¢

Assume the following level of use:
  Transactions per second: 10
  Average transaction amount: 25¢
  No transactions over $20

If there are 10 transactions per second, there would be a total of approximately 300M per year with a total value of about $80M. If there were 100 validating nodes, each node would receive about 3M transactions per year and be paid $3 k in fixed fees. The nodes collectively, and Initiating blockchain entity individually, each get a fee of 0.25% of the total transactions value, or $200 k. This gives each node a revenue of $5 k and a net profit of $3.2 k. Initiating blockchain entity gets a pure profit of $200 k.

b) General Payment Platform

Suppose instead that an instance of GeeqChain was deployed as a general payment platform such as PayPal or Visa/MC. Using the same very low fee structure, suppose that there were 100 validating nodes, 10 transactions per second, but that all were over $20. This gives an annual transaction volume of over $60B. Given that Bitcoin volume in 2017 is more than $300B as of November 15, this is not an unreasonably high estimate. In this example, nodes get a revenue of $150 k per year while Initiating blockchain entity gets a net profit of $15M c) University Student ID Card Cashless Payments Thousands of universities, hospitals, and corporations with large campuses use third parties to enable cashless payment systems using ID cards. These cards may be restricted to meal plans and internal fees, extend to dollar transactions at bookstores and local businesses, and may even incorporate credit and debit card functions. CBORD is one of the major providers of such services and charges fees to participating merchants of up to 6%. Additional fees are charged for ATM use, debit card transactions, and even for recharging prepaid versions of such cards. Hong Kong has long used the "Octopus Card" for bus and subway fares and now has an extensive network of merchants who accept this prepaid card for various goods and services. Other cards of this type are linked directly to the VISA or MC payment networks and have standard credit card fees.

A university or corporate environment offers two significant advantages that make it ideal for GeeqChain payment systems. First, all the users are known to the system and pre-vetted. This means that KYC and AML compliance is comparatively easy. Second, the university or corporation stands as the guarantor of the tokenized dollars that move over the network. (Of course a university or business could default on these obligations, but then there would be legal recourse available against an established entity with a physical presence. Universities and corporations also have a strong reputational incentive not to default if they wish to maintain good relations with students, alumni, employees, suppliers, and customers. In contract, Tether (https://tether.to/) is a blockchain platform offering tokenized dollars that it claims are backed 100% by dollars on deposit in banks in Shanghai and Taipei. More than $1.3B worth of Tether tokens exist as of the end of 2017. Although there is no technical reason this should not be an excellent way to provide a stable-coin on a blockchain, several problems have arisen. AML and KYC has proven to be difficult and the international banking system as all but cut off relations with Tether. In addition, Tether has not been completely transparent in allowing audits that show that all the needed dollars are in fact on deposit and there is no real legal guarantee that they will stay on deposit in any event.) Students pay dollars into student accounts, and the university creates a corresponding number of tokens in the student's GeeqChain account. Merchants and others who accept these tokens from students though GeeqChain can request that they be transferred by the university to their own bank accounts via a free ACH transaction. The tokens would then be removed from the chain.

Closed payment systems such as this would require little if any technical expertise on the part of the token authority and the transactions costs of keeping accounts on the chain would be extremely small. The only potentially significant cost would be establishing a reliable Point of Sale authentication system to allow the cards to be used. Cellphone apps with multifactor identification is one possible approach to solving to this problem.

d) Tokenized Trading of Assets

Assets such as stocks, bonds, real estate, and commodities such as gold, can be represented by tokens on a blockchain. This might be through a simple system of accounts, or a system in which each individual share is considered a separate, unique object to be traded. In the latter case, the business logic of the host GeeqChain would need to be changed to require that each unique token exist in one and only one account to be considered valid. We also might prefer a mixed approach where stocks issued by a given company are represented as homogeneous tokens and use the standard Bitcoin-type accounting logic. Stocks issued by different companies, or different types of stock issued by the same company (preferred or common, for example), would use different tokens that could not be added together. Thus, an agent might have 50 shares of IBM and 75 shares of Microsoft. IBM shares would be represented by homogeneous tokens but of a type that could not be added together with similarly homogeneous Microsoft tokens.

Tokenized exchanges would be built on federated instances of GeeqChain and transactions fees paid to validating nodes in GeeqCoin. Since all of these instances have Strategically Provable Security for validation, they can safely move both asset tokens and GeeqCoin transactions fees between accounts of different types on different chains A company that wished to make a stock issue would obtain a genesis block signed by Initiating blockchain entity containing colored tokens to represent the asset. The genesis block would contain no GeeqCoins and so paying transactions fees would require that they be moved onto the new chain from another federated GeeqChain. The signed genesis block and other signed elements of the new chain would guarantee that no new GeeqCoins are created. From then on, the new chain would be able to interact with the rest of the GeeqChain ecosystem.

It might be convenient to maintain each asset/token type on a separate chain (for example, all IBM stock might trade on its own instance of GeeqChain). Alternatively, brokerage houses might set up separate instances of a GeeqChain for their clients, each of which holds many different types of tokens. These in-house chains might include logic to write balances to accounts with encrypted information available only to the brokerage house to allow it to identify the clients behind the public key address. This would facilitate KYC and AML efforts, reporting information to the proper tax authorities, and allow the brokerage house to create aggregated reports for their clients. All of these functions are possible using federated chains, and all could be done without the brokerage house assuming actual control of a client's assets. Provided the private key remained with the user, only the user would be able to write a valid transaction. As a result, embezzling from clients becomes impossible while client privacy is protected to the extent that the law allows.

A similar approach would work for registering cars or property titles. Since each object is unique, it would be represented by a uniquely identified GeeqToken. Federated chains holding such tokens would include logic that allows a state department of motor vehicles or county clerk to create signed tokens attesting to the car's existence or the validity of the deed.

Initiating blockchain entity would charge fees for issuing genesis blocks, licensing fees for use of the IP, and could also include business logic on the new chains that give Initiating blockchain entity a fee for various transactions or executions of protocols.

e) Validation of Records and IoT Data

Public records, transaction audit trails, the activities of medical devices, and telemetry for sensors and alarms, are all examples of cases where there are large volumes of data that need to be publicly available, auditable, shareable, and/or provable, but where each data item individually has low value. The fact that GeeqChain provides SPS quality validation and time stamp services at a marginal cost of $0.0006 per item (or even less) makes it economically practical to place such data on blockchains. Revenue models might be as simple as charging a multiple of the marginal cost per item, or licensing the use of an instance of GeeqChain to a municipality, hospital chain, or IoT manufacturer. Logistics chains, two-sided markets using blockchain, and cases with more valuable data, could use similar revenue models.

f) Generalized Platform for Other Blockchain Startups

Ethereum has created an ecosystem of blockchain startups through its ERC20 token standard. Startups can create their own tokens in a fairly flexible way and then use an Ethereum smart contract to validate transactions. ERC20 contracts contain a mapping of public key addresses to balances of tokens (the ledger state of the ERC20 token) and rules from moving tokens between accounts. The ledger state in the contract is updated as users make transactions and, as a result, new tokens can take advantage of Ethereum's mining network for validation.

This all comes at a cost. Updating the ledger-state in the ERC20 contract requires paying the Ethereum Virtual Machine (EVM) to run the contract each time. If the business logic used by the startup's contract requires using off-chain data from oracles, users, or other smart contracts, EVM usage becomes more intense. Even for very simple transactions, average Ethereum fees are around $0.15. Keeping the ledger state current in more complex ERC20 contracts could turn out to be quite expensive.

One solution is to keep transactions, data, and the ledger state in a private side-chain created by the startup. Hashes of the ledger state could be written to the Ethereum chain periodically to provide PoW validated checkpoints that could be used to verify the continuity of the history of the side-chain. It is usually impractical to have the side-chain itself validated by PoW since this requires establishing and paying a large network of dedicated miners. As a result, PoS is used in most cases. We have already discussed the security problems with PoS, and these multiply when the set of stake-holders is small or poorly compensated as they usually are on new side-chains. Thus, side-chains offer limited security for users and are difficult and potentially expensive to setup.

An alternative is to keep data needed to support the business logic of a platform (and maybe even transactions waiting to be written to the ERC20 contract) in a private database. For example, a logistics chain might keep signed receipts handing off cargoes between truckers, warehousemen, shippers, and other users in a database and give access only to those who have a need to know. Reputational data regarding agents, escrowed tokens, or bids and asks in two-sided markets might similarly be kept off-chain in databases. Given how expensive it would be to record all this information in a verified Ethereum block, this might seem reasonable. The problem is that this requires users to trust the platform that holds the data. What if the platform's servers are not secure? What prevents authorized agents or even the trusted platform keeping the data from writing false entries? In any event, if users can trust the platform, why is there a need for a blockchain to execute and record ERC20 token or any other type of payment? After all, if the underlying data is corrupted, then the payments will be wrong, and if the data is correct, then users may as well trust the platform to credit accounts honestly.

GeeqChain provides an alternative to ERC20. New instances of federated chains can be created through the issue of a signed genesis block from Initiating blockchain entity. As we mention above, this block would not contain any GeeqCoin, but could contain tokens generated by new companies. The GeeqCoins needed to pay nodes to validate transactions on the new chain would be written to local accounts of the validators. These transactions would follow standard GeeqCoin protocol. However, the native tokens could follow their own business logic as needed by the application. Smart contracts would be run on the new chain itself and would not depend on any central chain for validation. The main advantages of such an approach are that it is cheaper, faster, and also more secure. Transactions would only cost fractions of a cent instead of fractions of a dollar. Transactions would also be finalized as blocks were written and transactions would be picked up as they were submitted. Finally, all data relevant to the business logic of the application would be written immutably into the platform's local blockchain and verified by a protocol offering SPS.

X. Additional Information—Costs and Resource Estimates of the CDM

In this sub-section, we estimate the bandwidth, storage, and computational costs of running a node and serving as a hub on a CDM blockchain.

As an example, consider a CDM blockchain processing 40 transactions per second and writing blocks every 10 seconds. By way of comparison, the Ethereum blockchain writes blocks about every 12 seconds and currently processes between 4 and 7 transactions per second (with an estimated maximum rate of 15 per second). Bitcoin writes blocks every 10 minutes and processes 2 to 4 transactions per second (with an estimated maximum rate of 7 per second).

Ethereum transactions are about 0.5 kB on average although there is no fixed size. Ethereum transactions are often more complicated than simple token exchanges (interacting with smart contracts or placing documents in the blockchain, for example). Bitcoin transactions seem to be about 6 kB on average but may include several individual payments as well as UTXOs. Nevertheless, for the purposes of this example we will assume that a single CDM transaction is 0.5 kB on average.

We begin by considering a CDM network consisting of 100 validating nodes. This is far lower than the 32,000 or so nodes on the Ethereum network or the 10,000 or so Bitcoin nodes. On the other hand, it is larger than the 25 or so nodes that validate some implementations of the Hyperledger fabric protocol and other PoS consensus systems.

The three major costs of running nodes and hubs are bandwidth, compute cycles, and storage. We estimate each in turn below.

Bandwidth: A total of 40 UUTs per second enter the system and are collected by 100 nodes for ten seconds. This means that the average NTB sent by nodes to the hub contains four UUT. The hub collects the NTBs and produces an HTB containing all of these transactions and then sends it to each of the nodes. This implies that the bandwidth costs of building one block are the following (We will ignore audit transactions (which might be very large) since the CDM gives agents strong incentives to behave honestly and these should be rare. We also ignore splitting and merging operations which also take more storage, computation, and bandwidth. Merging might require transmitting the last 10 or more blocks, however, the number of transactions in each block should be lower since transactions would have been split between the honest forks that are merging. Splitting can be done locally at each individual node since the CSSC tells each node which of the forks it will join as a verifier and which accounts go to each of the forks. Splitting and merging also should be rare events. Finally, we ignore the headers that are written into each block because they are small and do not change with the number of nodes or transactions.):

Nodes send an NTB to the hub: 2 kB (times 99)
Hub sends the HTBs to each node: 200 kB (times 99)
Total bandwidth per block:
Nodes: 2 kB sent; 200 kB received (times 99)
Hub: 20 MB sent; 200 kB received To transmit 20 MB in 10 seconds, the hub would need to upload data at a rate of 2 MB/s or 16 Mb/s. According to http://www.speedtest.net/, the average upload speed for US residential broadband customers in 2017 is 22.79 Mb/s. This means that the average US household has a fast enough internet connection to run a hub on the network just described. Also note that the job of being hub switches between nodes randomly with each block and so a node only needs to use this level of upload capacity 1% of the time. For the other 99% of the time, verifiers act as ordinary nodes and receive only 200 kB (0.0002 GB) per 10 seconds requiring 0.16 Mb/s of download speed. (Recall that 1 GB=1000 MB=1,000,000 kB. Thus, 200 kB=0.2 MB=0.0002 GB. Broadband speeds are specified in megabits per second (Mb/s). Since 1 Byte (B) equals 8 bits (b), 200 kB=1.6 Mb which in turns requires a connection speed of 0.16 Mb/s to be transmitted in 10 seconds.)

The cost of bandwidth to an average US consumer varies widely by location and depends on the sort of broadband plan a customer chooses. Some plans are unlimited implying the marginal cost of bandwidth is zero. Other plans offer 1 TB of traffic for about $50 per month. Overages are often charged at the rate of $10 per 50 GB. Thus, bandwidth costs between $0 and $0.2 per GB. We will use $0.1 per GB for our example Since we are interested in the per transaction cost, we divide the cost of building a block by the number of transactions it contains (400 in this case). (Since these are estimates, we will ignore the costs of elements that are not of the first order of magnitude in order to keep the calculations simple. For example, a node sends 0.5 kB and receives 200 kB to build a block. But 0.5 kB is more than two orders of magnitude smaller (more than 100 times smaller) than 200 kB. Thus, we ignore it and take the bandwidth needed to be 200 kB.)

Total bandwidth cost per transaction:
Node: 200 kB/400→$5\times10^{-7}$ GB×$0.1=$5\times10^{-8}$ (times 99)
Hub: 20 MB/400→$5\times10^{-5}$ GB×$0.1=$5\times10^{-6}$
Total: $1\times10^{-5}$ Note that 40 transactions per second implies about 100M transactions per month. For 1% of these, a node will be acting as the hub and will require $5\times10^{-5}$ GB per transaction. For the other 99%, the node will only need $5\times10^{-7}$ GB per transaction. In total, this implies that about 100 GB of data would be used per month by a CDM node/hub. For most agents running nodes, this will probably be within their broadband plan's data limits which suggests that the subjective bandwidth cost to nodes is 0.

Computational Costs:
Each transaction:
Sanity check for UUT as it arrives
Check balance and signatures the UUT in the HTB
Process the UUT with the PBSC, possibly creating more than one VUT.
For each block:
Compose and send NTB to hub
Create and write the new FVB to the chain
Calculate the new CLS (Add the PTB with 400 transactions using the LSSC)
Calculate the new hub identity using the NTSC
In addition for the hub:
Compose and send HTB to 99 nodes All in all, this is a trivial amount of computational effort, especially given that nodes and hubs have 10 seconds to complete the block. Home computers and even smartphones should not be stressed by this level of effort. The process outlined above is not very much different from what is needed to process a bitcoin transaction which involves similar signature verifications, creating multiple VUTs (UTXO and fee transactions, for example), writing transactions to blocks hashing operations, and so on. Gaven Andresen estimates that the cost of validating one bitcoin transaction is $1.6\times10^{-6}$ based on the cost of buying compute time on cloud services (https://gist.github.com/gavinandresen/5044482). For nodes running the CDM as a background process on a personal computer, the average cost of compute is probably smaller than what cloud providers charge. In fact, to the agents running nodes, the marginal cost of compute might even be seen as zero since the node uses CPU cycles on a computer the agent already owns which would otherwise have gone to waste. In any event, we double Andresen's cost estimate to be conservative:

Total compute cost per transaction:
Node: $3.2\times10^{-6}$ (times 99 nodes)
Hub: $3.2\times10^{-6}$
Total: $3.2\times10^{-4}$ Storage:
Each transaction is stored on 100 nodes forever, at least in principle. Each UUT might generates three VUTs in the form of fee and other transactions and also some overhead in the form of headers, hashes, the CLS, and so on. This means each UUT might generate 1.5 kBs in transactions, and perhaps another 0.5 kBs in overhead, a total of 2 kBs. Online storage costs between $0.05 and $0.25 per GB per year while a hard drive costs about $0.03 per GB and might last two to five years. Note also that storage costs drop by close to half each year. Thus, suppose that storage costs $1 per GB for 20 years. Then storing 2 kB for 20 years costs each node $0.000002. Since this is done by each of the 100 nodes on the network, the total cost is $0.0002 per UUT. Note that hubs and nodes are the same when it comes to storing copies of the blockchain.

Total storage cost per transaction:
Nodes/Hub: $2 \times 10^{-6}$ (times 100 nodes)
Total: $2 \times 10^{-4}$ This is probably a significant over-estimate of storage costs. Again most nodes will run on computers already owned by agents and will use hard drive space that was empty anyway (suggesting a marginal cost of zero). Nevertheless taking this estimate at face value and rounding up bandwidth costs, the total per transaction cost on the CDM chain is: $6 \times 10^{-4}$.

In other words, a CDM network with 100 nodes, running faster than Ethereum, can validate, commit, and store a transaction at a cost of less than 0.06¢. In contrast, Ethereum transactions cost on the scale of 15¢ or more and Bitcoin transactions fees can run to several dollars. This means that a transaction of 1¢ could be executed on a CDM blockchain with a 6% transactions fee even using extremely high resource cost estimates. The cost per transaction scales linearly in the number of nodes. As a result a GeeqChain that uses N nodes in its validation network, can process a transaction for less than: $6N \times 10^{-6}$.

Note that this estimate uses quite generous numbers for both level of resources needed per transactions and the costs of those resources. In addition, if a node is run by an agent on a computer that has unused CPU cycles and extra hard drive space on a broadband connection with 100 GB of monthly data to spare, the opportunity cost per transaction is actually zero.

XI. Additional Information—Data Objects

The GeeqChain protocol is based on a set of GSCs that use and manipulate a set of data objects which we define in this section.

a) Tokens and Basic Data

The fundamental building blocks of transactions and more complex data objects are defined in this section.

Tokens: GeeqChains can hold tokens of different types natively. In addition, the GeeqChain architecture allows for a system of federated chains having different business logic and using different tokens that can migrate across different instances of GeeqChain Tokens come in two basic forms: those that follow accounting logic, and those that have a unique identity.

Accounting tokens: (A) Accounting tokens are used to represent stocks, bonds, or other assets, utility or exchange tokens from other instances of GeeqChain supporting various applications, and the GeeqCoin itself. Accounting tokens of a given type can be added and subtracted, as units and in fractions. The total number of each type of token in an account is all that is relevant.

Unique tokens: (U) Unique tokens might represent items such as a title to a car or house. Such tokens are added to a user's account as individual items with identifying numbers and do not follow accounting logic. They cannot be added together or divided into fractions.

Token Name: Accounting tokens of different types need to be distinguished from one another. GeeqChain does this by giving each token type a unique name. To create a new token type, a genesis block signed by Initiating blockchain entity is deployed which includes the name of the token (or tokens) and the name of the new instance of GeeqChain.

Token Authority: Unique tokens are issued at will by authorized token authorities. For example, when a new car is registered at a local DMV, the relevant token authority is allowed to create a new token to identify it. Authorization to do this and the rules governing transfer are part of the genesis block. For example, a valid transaction moving a token from account to account might require the signature of the authority, the current token owner, or both, and tokens might or might not be allowed to move to other chains. At a minimum, each unique token needs a unique ID number assigned by the authority. To be more useful, the token authority should also create a signed data record that includes a description of the real asset that the ID number represents. This could be encrypted or keep offline if needs be, but this also might reduce confidence in the value of the token.

General Data Fields: We describe below some of data fields commonly used by data objects on GeeqChain.

Token Type: This is the pairing of the form and name of a token. For example:

A—GeeqCoin
A—AnyTokenName
U—AnyTokenAuthority where "AnyTokenName" is a string such as "IBM-preferred" or "ACME-gold" which is used to label the balance numbers in users' accounts, "AnyTokenAuthority" is a string serving the same purpose as above denoting an entity that is entitled to issue and enforce ownership of real assets that are tokenized.

GeeqChain ID: Each instance of GeeqChain is given a unique ID number and name in its genesis block. The ID numbers are consecutive with the original GeeqChain being number 1. The name is only to make the genesis block more human readable.

Transaction Number: This is created by the user or node in order that generates a transaction or data object. Its primary purpose is to distinguish transactions and other data objects from one another and to allow them to be unambiguously referenced. One important reason for this is that users may submit the same transaction to different nodes at the same time in some cases. The transaction number allows the system to distinguish between a situation with duplicate submissions of the same transaction which a user intends to be executed only once, and one in which a user wishes to have two identical transactions executed (pay account X five tokens, and then pay account X five tokens again). Format to be determined.

Smart Contract ID: Unique ID number that allows the contract to be called. This is similar to a transaction number. Format to be determined NTB Number: Format to be determined HTB Number: Format to be determined Block Number: As in most blockchains, each block is numbered successively. The genesis block is block number 1, the first block added the chain is block number 2, and so on.

Time-Stamp: This could be UNIX time or a standard date and time format. If needed, this could be taken from a NIST internet time server and verified in some way, or simply taken from a user's or node's internal clock.

System Tomb Account: Each instance of GeeqChain has a designated tomb account. Tokens to be removed from circulation are credited to this account and protocol does not allow them to be moved to any other account once they arrive.

Signature: This is follows the standard format. Some or all of the data in a transaction or data object is hashed and then encrypted with the private key of an agent. The public key/encrypted hash pair is a digital signature of the data object by the agent.

b) Certificates, Communications, and Records

The NCSC is the GSC that controls communications among users and nodes. The NCSC uses a set of certificates that it issues to agents that make it possible to prove and verify the sending and receiving of messages over the network The current state of a ledger is comprised of a series of account and other records that are updated as users and others send transactions to the network.

Figure 6:
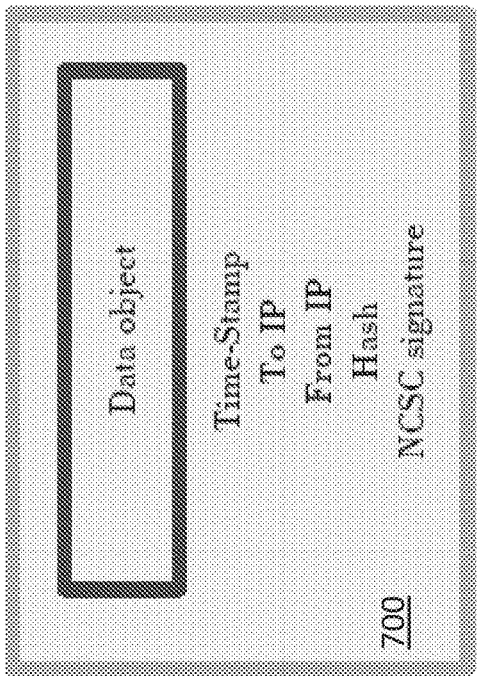
FIG. 6 is an illustration of the major components of a certificate in accordance with an example.

Certificates: With reference to FIG. 6 there is shown an illustration of an X-Cert 600 having the following:
- NTB/HTB/Transaction Number: All data-objects have a unique identifying number.
- Time-Stamp: When the message was sent by a client's NCSC.
- Hash of NTB/HTB/Transaction: Hash of the data object.
- To IP: The IP address that the NCSC sent the data object to.
- From IP: The IP address that of the NCSC that originated the data object that was sent.
- Hash of X-Cert: The Hash of the certificate
- NCSC signature: Signature (The hash of the X-Cert encrypted with the NCSC private key).

S-cert: A certificate provided to a sending agent by the sending NCSC to prove that the agent submitted a message to be sent to a target NCSC.

B-cert: A certificate provided to a sending agent by the sending NCSC to prove that the sending NCSC was unable to establish contact with the target NCSC and so a message bounced.

R-cert: A certificate provided to a sending agent by the receiving NCSC to prove a message was received.

$R^2$-cert: A certificate provided to a receiving NCSC by the sending NCSC to prove that an R-cert was received by the sending NCSC.

F-cert: A certificate provided to a receiving agent by the receiving NCSC to prove that it failed to receive an $R^2$-cert from the sending NCSC and therefore discarded the message instead of providing a decrypted copy to the receiving agent.

Figure 7:
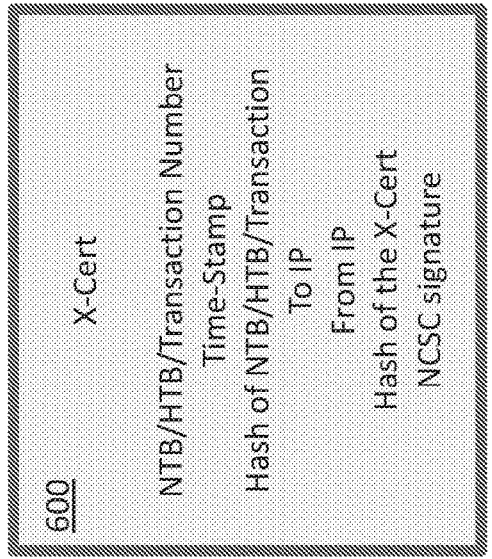
FIG. 7 is an illustration of the major components of a Network Communication Smart Contract (NCSC) signature in accordance with an example.

NCSC Signature: FIG. 7 illustrates an NCSC 700. The NCSC signs all data objects moving through the network and includes certain transmission data. This forms a kind of wrapper around the data object or message being transmitted. For a generic data object, the format is as follows:

These NCSC wrappers are preserved when the data objects are passed on. In addition, when objects are bundled, the bundle is also wrapped in an NCSC signature. We will make this clearer below.

Figure 8:
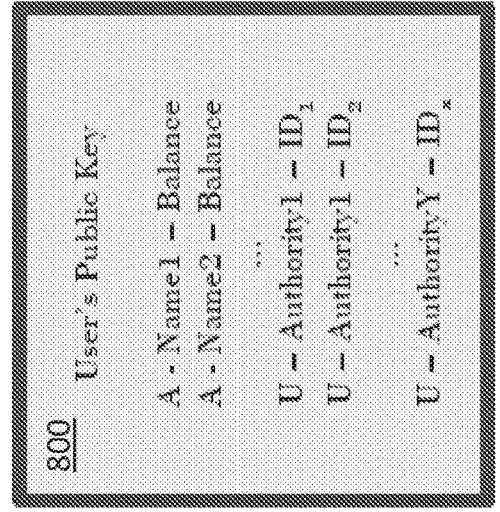
FIG. 8 is an illustration of the major components of a Token Account Record (TAR) in accordance with an example.
Figure 9:
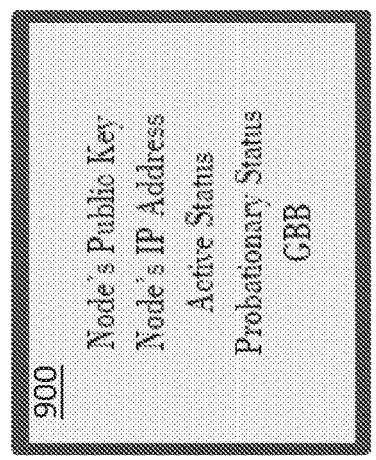
FIG. 9 is an illustration of the major components of an Active Node Record (ANR) in accordance with an example.

ALL UUTs and a few other data objects are signed and by the NCSC, specifically:
- Simple UUT
- General UUT
- Token Chain Transfer UUT
- Data UUT
- Smart Contract Creation UUT
- Smart Contract Call UUT
- Unique Token Creation UUT
- Unique Token Destruction UUT
- Accounting Token Creation UUT
- Accounting Token Destruction UUT
- Outgoing Token Transfer UUT
- Active Node List UUT
- Audit UUT
- NTB: Node Transactions Bundles
- HTB: Node Transactions Bundles On the other hand all VUTs and some data bundles are created locally at the node level are never sent over the network. NCSC certs have NCSC signatures internally. As a result, the following do not get NCSC wrappers:
- Simple VUT
- General VUT
- Token Chain Transfer VUT
- Data VUT
- Smart Contract Creation VUT
- Smart Contract Call VUT
- Unique Token Creation VUT
- Unique Token Destruction VUT
- Accounting Token Creation VUT
- Accounting Token Destruction VUT
- Outgoing Token Transfer VUT
- Active Node List VUT
- Audit UUT
- Initial Token Generation VUT
- Simple Fee payment VUT
- Simple Fee distribution VUT
- GBB Distribution VUT
- Audit Reward VUT
- Incoming Transfer Confirmation VUT
- X-certs
- PTB: Proposed Transactions Block
- FVB: Fully Verified Block
- GBL: Genesis Block
- CLS: Current Ledger State
- TAR: Token Account Record (800 with reference to FIG. 8): An account is simply a public key that can be credited with tokens of various types. Each account entry has three elements: form, name/authority, and balance. An account record could contain any number of token types. Each A-type token with a positive balance is listed once. Each U-type token is listed as a separate entry with its own unique identity number. TARs are part of the CLS.
- ANR: Active Node Record (900 with reference to FIG. 9): ANR has:
  - Node's Public Key: The account to which transactions fees will be deposited.
  - Node's IP Address: The IP address where the node proposes to keep his copy of the blockchain and where users send transactions requests.
  - Active Status: Active or suspended.
  - GBB: The amount of GeeqCoin held in escrow to assure a node's good behavior Nodes can change their active status using Active Node List (ANL) transactions. If a node is caught being dishonest through an audit, then, the ANR is deleted from the ANL. Nodes which plan to go off-line but return in the future send as "Suspend" ANL transaction and are dropped from the validating network until they send a "Reactivate" ANL transaction. In the meantime, the GBB is keep in escrow awaiting their return.

Figure 10:
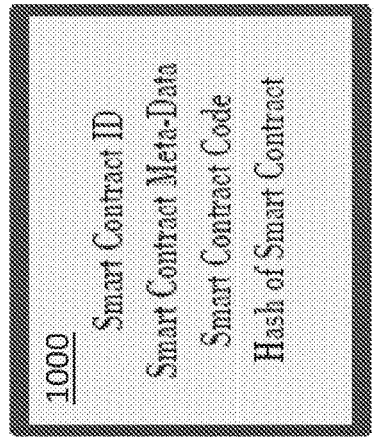
FIG. 10 is an illustration of the major components of a Smart Contract Record (SCR) in accordance with an example.

SCR: Smart Contract Record (1000 with reference to FIG. 10): SCR has:
- Smart Contract ID: Unique ID number that allows the contract to be called.
- Smart Contract Metadata: Optional cleartext fields with human readable identification, description, required inputs, programing language, or other relevant details about the contract.
- Smart Contract Code: The compiled or uncompiled code of the contract itself.

Although there is no abstract reason to restrict the set of languages used by smart contracts, in practice, nodes can only be expected to be ready to deal with a limited set. However, different instances of GeeqChain could allow different smart contract languages and functions. Compiled code saves space and maintains secrecy, but is otherwise not required.

SDR: Stored Data Record (1100 with reference to FIG. 11): SDR has:
- Ledger ID and Data Type are two of several possible metadata fields that might be specified separately, or simply included in "Data" with appropriate markups.
- Data could be cleartext or be encrypted in various ways. It might contain only a URL/URI that points to a larger data object whose hash is recorded as "Data" in the transaction. "Data" could also include signed records of delivery and receipt hand-offs for logistics chains, or labeled meta-data for a complicated multi-party business process. Finally, "Data" could contain the identity and/or public key of the creator to make the signature easy to check, or these details could be kept private.

Public records and IoT telemetry are examples of data that needs to be recorded, signed, and Time-Stamped in a distributed immutable ledger. In general, such records would not travel across instances of federated chains. However, the structured data that they contain might be used as part of a non-token based business logic that would determine the validity of the record and what actions it triggered within an application.

A more complicated type of data record in which updates are possible could also be supported. Logic to define exactly how a transaction would be formatted to change the state of such data records and who was authorized to do so would need to be specified. We leave this for a future version of the yellow paper.

c) UUT Unverified User Transactions

Users send transaction to nodes that need to checked for individual and collective validity. Nodes and hubs also create unverified transactions that must be checked by the rest of the verifying network of nodes. Since they are functionally equivalent to unverified transactions created by users, we will not distinguish between them.

Simple UUT (1200 with reference to FIG. 12) has:
- Transaction Number: This is created by the user client in order to make each UUT unique. Users may submit the same transaction to different nodes in some cases.
- Time-Stamp: This could be UNIX time or a standard date and time format. If needed, this could be taken from a NIST internet time server and verified in some way, or simply taken from the user's internal clock.
- IP Address of Validator: Transactions originating from users are submitted to the NCSC of the user's client. The user is responsible for choosing a validating node on relevant instance of the GeeqChain to receive the transaction and pass it on to the hub for validation.
- From and To Public Keys and Amount: These are self-explanatory.
- Transaction Hash: This is the hash of the six fields above.
- Signature of Sender: This is the transaction hash encrypted with the sender's public key.

Simple UUTs are used to transfer GeeqCoin from one account to another on the same chain.

General UUT (1300 with reference to FIG. 13): General UUTs can include several transactions at once involving different token types. Each transaction request must specify the same details needed for the simple UUT and also include the token type to be transferred and the amount or ID number (in the case of unique tokens). Since all transactions fees are paid in GeeqCoin, an account with a sufficient balance to cover these costs must also be specified.

Token Chain Transfer UUT (with reference to FIG. 14) has:
- To Chain Name: The name of the instance of GeeqChain that the user wishes to move token to.
- To Node IP Address: The IP address of the node on the receiving chain that the sender wishes to process the UUT.

Sending GeeqCoins from chain to chain without a central authority takes a number of steps. This begins with a user creating a Token Chain Transfer UUT and submitting it to a node on the chain that will send the tokens. The node passes this on to the current hub which creates token destruction UUT. Both transactions are passed on to the nodes in the HTB. If the nodes find that both UUTs are valid, they write two corresponding VUTs into the current block. The token destruction VUT results in tokens being transferred to the system tomb account.

Data UUT (1500 with reference to FIG. 15) has public records and IoT telemetry are examples of data that need to be recorded, signed, and time-stamped in a distributed immutable ledger. In general, such records would not travel across instances of federated chains. However, the structured data that they contain might be used as part of a non-token based business logic that would determine the validity of the record and what actions it triggered within an application.

Smart Contract Creation UUT (1600 with reference to FIG. 16) has:
- Smart Contract Metadata: This is an optional field, but it might contain a description of the function of the smart contract as well the inputs that the contract requires.
- Smart Contract Code: A smart contract is just a computer program that is run by nodes when it is invoked. The complete code in either compiled or uncomplicated form is kept in the SCR.

Smart Contract Call UUT (1700 with reference to FIG. 17) has:
- Smart Contract Inputs: This field holds whatever inputs are needed to run the smart contact.

All the UUTs that follow are created by hubs or nodes rather than users.

Unique Token Creation UUT (1800 with reference to FIG. 18) has:
- Descriptive Data: Optional information to describe the real asset represented by the token.
- To Public Key: The account of the initial owner token which might be the token authority itself.

Token authorities are able to issue new tokens at will. However, nodes must verify that the creation follows protocol and fees much be paid for this service.

Figure 19:
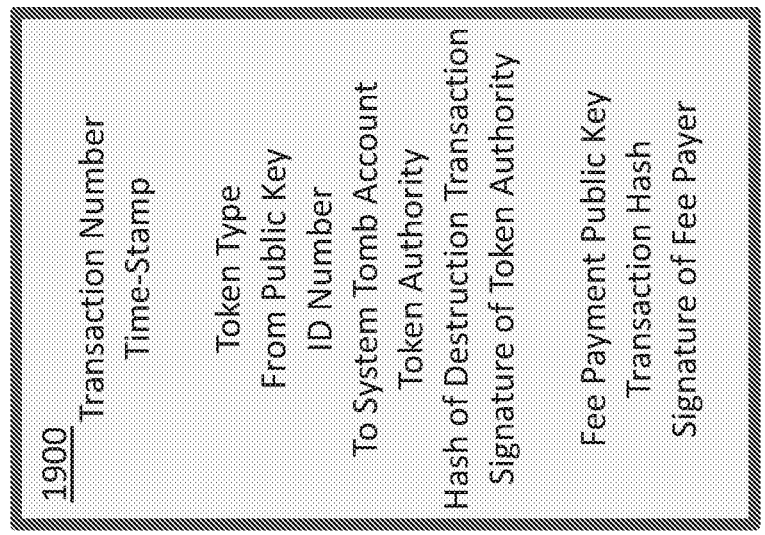
FIG. 19 is an illustration of the major components of a Unique Token Destruction UUT in accordance with an example.

Unique Token Destruction UUT (1900 with reference to FIG. 19) has To System Tomb Account. Each instance of GeeqChain has a designated tomb account. Tokens to be removed from circulation are credited to this account and protocol does not allow them to be moved to any other account they arrive.

Token authorities also allowed to destroy tokens. For example if a car is scraped, the title should cease to exist. Plots of land might be merged, divided, or given new legal descriptions. In such cases, the original token would be destroyed and new tokens issued to reflect this. The business logic of the chain might be set up to require that the current owner or other agents also sign the token destruction transaction. In this case, additional data fields for appropriate signature are added. However, since the legal connection between the token and ownership of the real asset ultimately depends on the token authority in most cases (a county registrar of deeds, for example) this may not be appropriate. In any event, the flexibility to accommodate different legal and technical structures for transfer of tokens exists.

Figure 20:
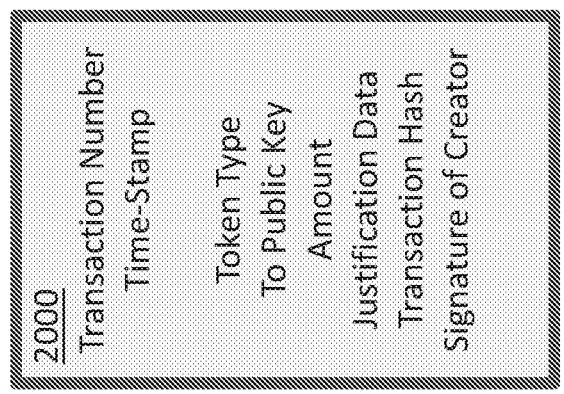
FIG. 20 is an illustration of the major components of an Accounting Token Creation UUT in accordance with an example.

Accounting Token Creation UUT (2000 with reference to FIG. 20):
  Justification Data: Certain instance of GeeqChain may allow new native tokens to be created. For example, users or nodes might be rewarded for undertaking certain actions with new tokens. The validity criteria for new token creation is encoded in the GSCs that control the business logic of the chain. This field contains any information needed to independently verification that this logic is satisfied.
  Signature of Creator: This is the signature of the agent or node trying to create the new tokens. It may be that these privileges are restricted to active nodes or some other class of registered agents. Note that these new tokens could be credited to the any account, not just the account of the creator.

The process of token creation, if any, is fixed by the data included in the genesis block and cannot be altered once a chain is established. Given this, buyers and users of the tokens are fully informed about the possibly of token dilution. Since the rules cannot be altered, they are also protected from the possibility of dishonest actions by a platform's creators on GeeqChain.

Figure 21:
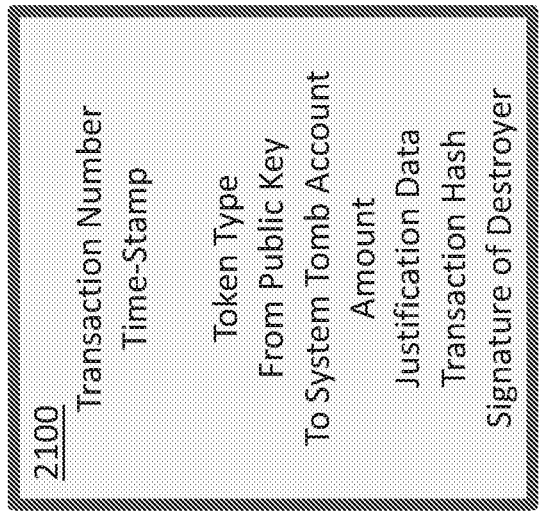
FIG. 21 is an illustration of the major components of an Accounting Token Destruction UUT in accordance with an example.

Accounting Token Destruction UUT (2100 with reference to FIG. 21): Some applications may find it useful to destroy or burn tokens. The validity of such transaction is also encoded into the business logic of chains GSCs.

Figure 22:
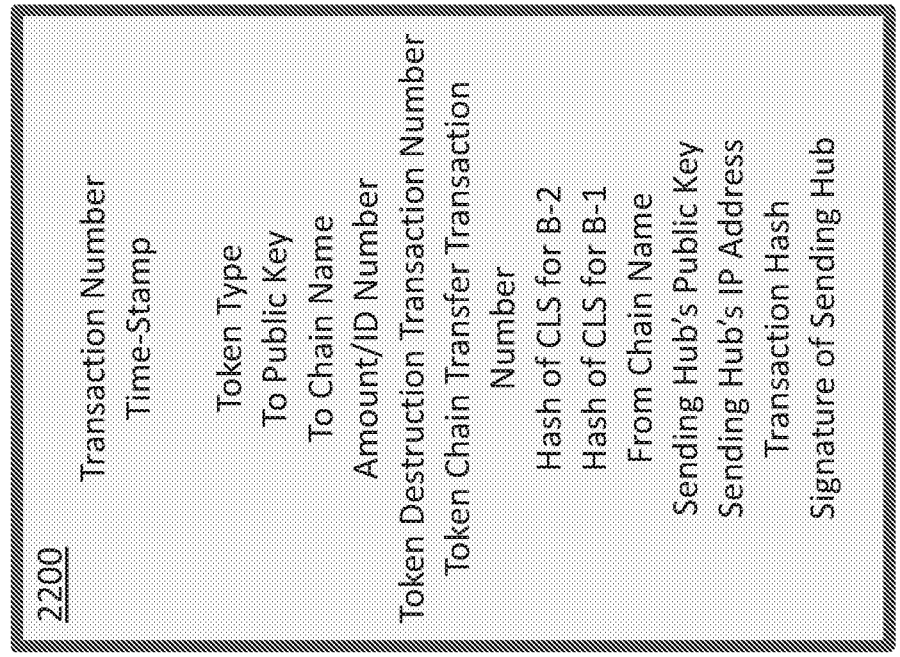
FIG. 22 is an illustration of the major components of an Outgoing Token Transfer UUT in accordance with an example.

Outgoing Token Transfer UUT (2200 with reference to FIG. 22) has:
  Token Destruction Transaction Number and Token Chain Transfer Transaction Number: These are included to bind together a specific pair of transfer and destruction transactions that justify the Outgoing Token Transfer UUT.
  Amount/ID Number: Both accounting and unique tokens can be transferred across chains.
  Hash of CLS for B−2: This is the hash of the Current Ledger State (defined below) for the block written two periods before when the tokens would still have been credited to the sending users account.
  Hash of CLS for B−1: This is the hash of the CLS for the block written one period before which should show that the tokens are no longer in the sending user's account as well as Token Destruction Transaction and their addition to the system tomb account.
  From Chain Name: The name of the sending chain
  Sending Hub's Public Key and IP address: This is included to make it easy to verify that the sending hub is in the ANL of the sending chain and is the current hub. It also allows the receiving chain to inspect the sending chain for honesty.
  Signature of Sending Hub: This UUT is created when a hub notes that presence of a Token Chain Transfer VUT in the previous block. Thus, the hub is the originator and signs the UUT.

Before tokens can be created on the receiving chain, they must be destroyed on the sending chain. The token destruction transaction is created by the hub that receives the Token Chain Transfer UUT on the sending chain Both transactions are sent by the hub to the nodes at the same time for verification and inclusion in the current block.

The hub building the next block notices the Token Chain Transfer VUT in the previous block and creates an Outgoing Token Transfer UUT which is sent out with the HTB to the nodes for validation and inclusion the block. The user who originates the UUT is also responsible for choosing a node on the receiving chain to handle the transaction (which is part of the data of the UUT). Otherwise, the sending chain would have to resort to a time-consuming and possibly fruitless search to find a receptive node. As the NCSC sends the HTB to nodes, it also extracts this Outgoing Token Transfer UUT and sends it to the node on the receiving chain identified by the user.

Figure 23:
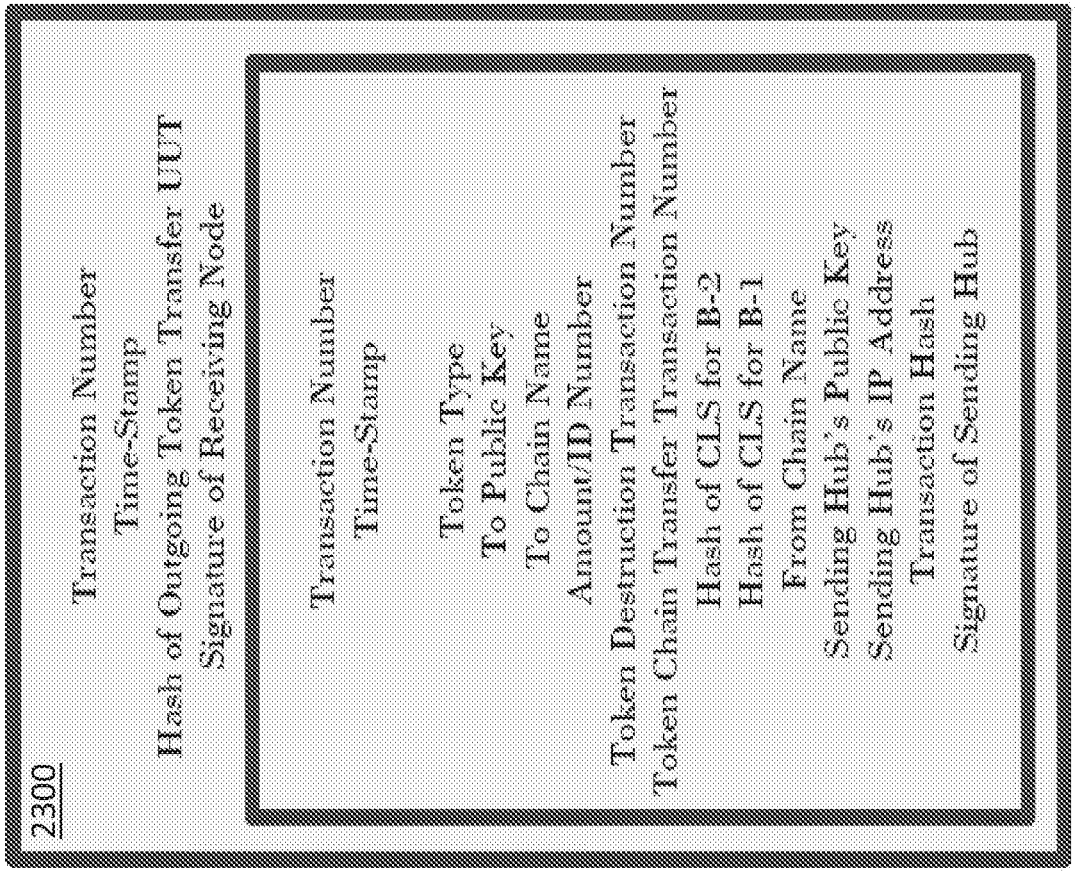
FIG. 23 is an illustration of the major components of an Incoming Token Transfer UUT in accordance with an example.

Incoming Token Transfer UUT (2300 with reference to FIG. 23) has Signature of Receiving Node: This UUT is created by a node on the receiving chain once it has completed its due diligence sanity check. Thus, the node is the originator and signs the UUT.

Transfers from other chains require extra due diligence. This is executed by the node that received the Outgoing Token Transfer UUT as an additional sanity check before passing the transaction on the hub. The exact details of what this involves are encoded in the GeeqChain GSC. If the transfer request does not pass, the receiving node sends back a notice of the failure to the sending node/hub. We discussed what happens in this event in the main body of the paper. Doing such due diligence may take extra time and so the receiving node is not obliged to pass on the transaction until the sanity check is complete. Fees are correspondingly higher to processing such transactions. If the Outgoing Token Transfer UUT does pass, the node coverts it to an Incoming Token Transfer UUT by giving it a new transaction number, signing the new transaction and then sending it on the current hub, which the passes it on to the rest of the verifying nodes.

Active Node List UUT (2400 with reference to FIG. 24): has Action: Join, or Leave, Suspend or Reactivate. The Active Node Smart Contact governs the set of active nodes that serve as validators of transactions. Agents join of leave the set of validators by submitting a transaction to an existing validating node. Agents can also suspend their active participation in validating transaction for a time and reactivate later.

Audit UUT (2500 with reference to FIG. 25) has:
  Audit Type: there are many ways that nodes night behave dishonestly. There is different type of audit to prove each one.
  Audit Data: This is raw information from the blockchain and other sources that allow an audit's conclusions to be independence verified anyone who wishes to. This might also include a list of the transaction that result from the audit to make the outcome easier for humans to understand although they will also be appear in the validated transaction section of the block.

If nodes detect dishonest behavior, they can run one of several types of audits through a smart contact. This is submitted as a transaction for inclusion in the next block. This audit transaction may result in additional transactions being generated both to pay rewards for successful audits, to confiscate good behavior bonds by nodes caught being dishonest, and also to remove dishonest nodes from the active nodes list.

d) VUT: Verified User Transactions

Nodes verify that UUTs of all types satisfy the business logic of the chain in question. This converts a UUT into a VUT which can then be recorded in a block and which can be used to update the CLS.

Many of the VUTs outlined below are created by each node locally to be included in the next block as a response to UUTs sent out to all nodes by a hub. For example, fees are paid to nodes for their validation services do not originate from a user. In other words, the sender has not explicitly signed a transfer to pay the fee "Amount" in this transaction to validators. However, the sender has requested the transfer referenced in the fee payment VUT, and this makes the transactions valid under protocol. Such transaction never appear in unverified form and it might more accurate to call them "Verified System Transactions". However, they are functionally the same as VUTs and as so we will not complicate matters.

Initial Token Generation VUT (2600 with reference to FIG. 26): Accounting tokens of all types, including Geeq-Coin, are created in the genesis block. Since several types of tokens could be created in the genesis block and so the tokens' types must be specified. Unique tokens are created by token authorities and so do not need and initial generation transaction such as this.

Simple VUT (2700 with reference to FIG. 27): The Time-Stamp is taken from the original UUT and so the UUT and VUT are identical. This is also the case for:
  General VUT
  Token Chain Transfer VUT
  Unique Token Creation VUT
  Unique Token Destruction VUT
  Accounting Token Creation VUT
  Accounting Token Destruction VUT
  Data VUT
  ANL VUT
  Smart Contract Creation VUT
  Smart Contract Call VUT
  Audit VUT Note, however, ANL, Smart Contract Call, and Audit VUTs may also generate addition VUTs to be recorded in the block.

Outgoing Token Transfer VUT (2800 with reference to FIG. 28): If a Token Chain Transfer UUT is valid, the receiving hub creates an Outgoing Token Transfer UUT and a Token Destruction UUT and sends it out to nodes in its HTB. Nodes verify that the two transactions are individually valid and also collectively valid. For example, the user asking for the transfer might also have submitted a Simple UUT attempting to move the token about to be destroyed to another account. This is a form of double spending. If joint validity is satisfied, however, the Token Transfer UUT is converted to a Token Transfer VUT containing the same data.

Incoming Transfer Confirmation VUT (2900 with reference to FIG. 29):

After a certain number of periods have passed, nodes must choose to confirm or reject a transfer request on the basis of their due diligence. If they reject it, the Incoming Token Transfer UUT is discarded and no tokens are transferred to the receiving user's account. If they accept it, tokens are added to the proper account and this is reflected in the next update of the CLS.

Simple Fee Payment VUT (3000 with reference to FIG. 30) has:
  Transaction Number: This is the same as the number from the original UUT but with an "F" added to the end to denote it is a fee payment.
  To System Public Key: This is a system account to which fees are temporarily moved for distribution to validators.
  Original Transaction Hash/Signature: These are copied from the original transaction for which fees are being paid.

In total, fees add a T+N transactions to each block, where T is the number VUTs, and N is the number of validating nodes. The first T are simple VUTs that move tokens to pay fees from sending users' accounts to a system account, while the second N move fees from this system account to the accounts of verifying nodes. A single additional transaction to pay licensing fees to Initiating blockchain entity may also be generated. Note that all of these fee VUTs are created locally by each node and never need to transit the network. Also note that the sender has not explicitly signed a transfer to pay the fee amount in this transaction to validators. However, the sender has requested the transfer referenced in this fee payment transaction and this makes the transactions valid under protocol. All of these fee transactions are provisional until they are tested for collective validity.

Simple Fee Distribution VUT (3100 with reference to FIG. 31) has:
  Transaction Number: This is a new transaction number. It might include a reference to the block number have a designation such as D at the end to make it easier for a human to read and understand the block.
  From Public Key: This is the system account from which fees are paid.
  To Public Key: This is the account of the node being paid for validation services.

GBB Distribution VUT (3200 with reference to FIG. 32) has:
  When a node submits an ANL UUT requesting to leave the ANL, the GBB is paid to the node out of the system account. The ANL transaction number is included to make it possible to verify the reason for this transaction.

Audit VUT (3300 with reference to FIG. 33) has:
  Transaction Number: This is a new transaction number.
  UUT Transaction Hashes: This is a list of hashes of identical Audit UUTs from honest nodes. Note that these hashes are not identical since the UUTs contain signatures and other details from each node that ran the audit.
  Auditing Nodes' Public Keys: The public keys of nodes to be rewarded
  Failed Nodes' Public Keys: The public keys of nodes that failed this audit and are to be removed from the ANL All honest nodes should notice dishonest behavior and have an incentive to report it. Thus, many identical audit UUT should arrive from honest nodes reporting the bad behavior of dishonest ones. To these are converted to one VUT which contains the collective list of nodes to be rewarded and punished.

The only punishment available is to confiscate of the escrowed GBB and for the offending nodes and remove them from the ANL. Along with this audit VUT, ANL VUTs removing nodes, and Audit Reward VUTs are created by protocol.

Audit Reward VUT (3400 with reference to FIG. 34):
  From Public Key: System account public key.
  To Public Key: Public key of node to be rewarded for auditing
  Amount: Net audit reward this node is paid for audits included in the current block.

Nodes that agent that initiate a successful audit share the GBB of the node or nodes that failed. This is complicated by two things. First, a dishonest node may fail several audits at the same time but the GBB can be confiscated only once. Second, honest nodes may call for identical sets of audits. This might a result of network latency, limitations on computational power, or choice. Since we want all bad behavior reported, we want to incentivized full reporting. There are many ways that this might be done. For example. If a dishonest node failed three separate audits at the same time, the GBB would be apportioned equally to reward each the nodes who participated in each. Thus, if a node participated in one of these audits with four others, and another with nine others, but did not participated in the last one, the node would get 20% of one third of the GBB plus another 10% of one third of the GBB. Other structures are possible, but whatever the case, the amount to be paid is written in one audit reward transaction paid out of the system account.

e) Bundles and Blocks

Figure 35:
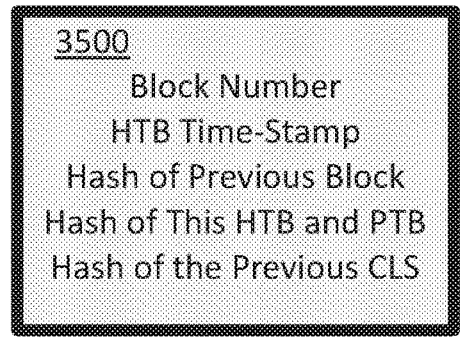
FIG. 35 is an illustration of the major components of a Committed Block Header (CBH) in accordance with an example.

CBH: Committed Block Header (3500 with reference to FIG. 35) has:

Block Number: As in most blockchains, each block is numbered successively. The genesis block is block number 1, the first block added the chain is block number 2, and so on.

HTB Time-Stamp: Each proposed block is built on basis of each nodes analysis of the Hub Transaction Bundle (defined below) sent to nodes by the hub. The hub gives the HTB a Time-Stamp, and this is taken as the Time-Stamp for the block that eventually results.

Hash of Last Block: Including the hash of the previous block creates the standard Merkle tree that is key to making blockchains immutable.

Hash of This Block: This allows users and nodes to check that the block has not been altered. The "block" referred to here is the Proposed Transactions Block, defined below, exuding this hash (which would be recursive).

Hash of the CLS: The Current Ledger State, defined below, is a list of records reflecting the current balances in accounts on the chain and other details. The CLS for block number B is a function of the PTB and the CLS for block number B−1. Including the hash of the CLS in the block header makes it easy to check that all nodes have the same view of chain both currently, and historically.

Figure 36:
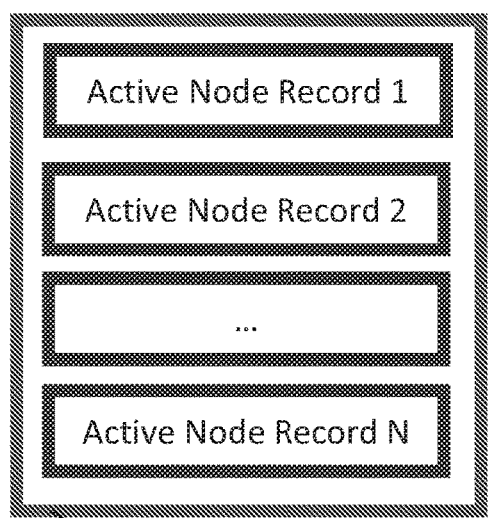
FIG. 36 is an illustration of the major components of an Active Node List (ANL) in accordance with an example.

ANL: Active Node List (3600 with reference to FIG. 36): The active nodes are listed in alphanumeric order by public key address. Note that this list also includes nodes that are in voluntary "suspended" status.

NTB: Node Transactions Bundles (300 with reference to FIG. 3A) has:

B-Certs (to hub): B-certs proving that the node's NCSC was unable to contact the hub (maybe for several periods). Note that these all relate to previous block. Since the node was out of communication with the hub, it was unable to transmit its NTB. Thus, it accumulates both UUTs and B-certs and add then to its NTB until it eventually manages to get a hub to acknowledge receipt.

R-Certs (to hub): R-certs proving that the hub received the last NTB sent by the node. As above, the R-cert from block B's NTB is included in the NTB for block B+1.

F-Certs (from users): F-certs proving that a user's NTSC did not return an $R^2$-Cert and so a given UUT was never delivered to the node. These certs relate to the current block and included in place of the UUT that was never released to the node.

B-Certs (to nodes): If the node happened to act as hub building the previous, it must include certs proving it followed communications protocols in the NTB it produced for the next block when it acts as an ordinary hub again. B-certs in this case, prove that the hub's NCSC was unable to contact a given node to send the HTB. (If the node was not the hub in the previous period, these are omitted.)

R-Certs (to nodes): R-certs proving that a node received the HTB sent by the hub, Sig(X): A pair consisting of the hash of X and the hash of X encrypted with the nodes private key.

Users submit transactions of various types to the node of their choice. Nodes collect these for a period of time and then bundle them together and send them to a central hub for inclusion in the block being built. Nodes sign each transaction and then sign the collected bundle of transactions.

Figure 37:
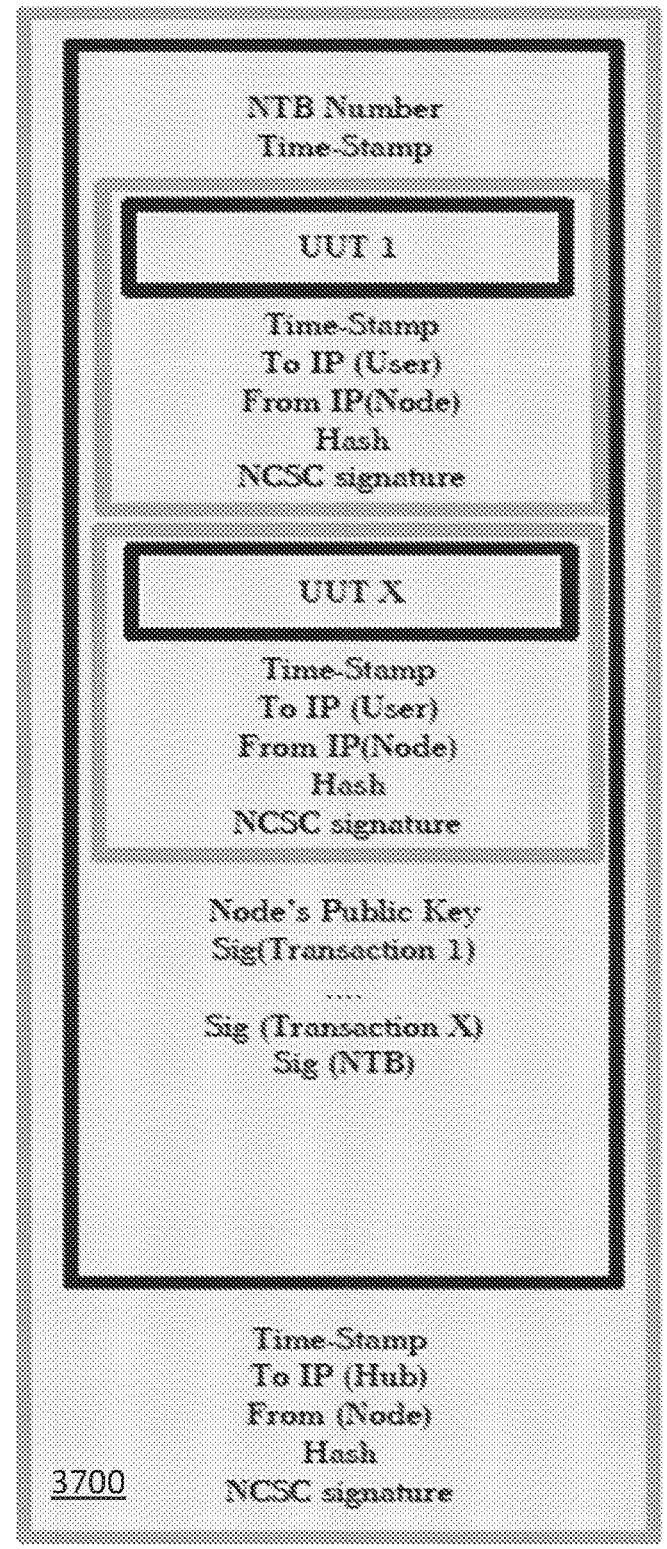
FIG. 37 is an illustration of the major components of a NTB with NCSC signature wrappers in accordance with an example.

Note that the simple representation does not show the NCSC signature wrappers. If we included these we would get the representation 3700 shown in FIG. 37.

HTB: Hub Transactions Bundle (302 with reference to FIG. 3B) has:

The current hub's job is to collect NTBs from active nodes and bundle them together in an HTB. The HTB includes an NTB produced by the hub as well. This bundle is then sent out to each node and serves as a common basis for building the next block. Each node uses the GSCs of the chain independently to do this.

The communications certs included here are B-certs and R-certs from the previous block when the hub was acting as an ordinary node, and F-Certs proving that a node's NTSC did not return an $R^2$-Cert and so a given NTB was never delivered to the hub. This is included in place of the spoke node's "missing" NTB in the HTB.

Note that there will also be an NCSC signature wrapper around the HTB since this is sent from the hub to the nodes.

PTB: Proposed Transactions Block (400 with reference to FIG. 4): The PBSC determines a unique order for the various types of VUTs that result from verification of the UUTs in the HTB. As a result, each node starts with the same HTB ends up with the same PTB. The HTB will have an NCSC wrapper, and also layered wrappers within. However, these wrappers are stripped from the VUT recorded in the PTB.

FVB: Full Verified Block (3800 with reference to FIG. 38): has CBH, PTB and HTB.

GBL: Genesis Block (3900 with reference to FIG. 39) has:

Block Number: Since this is the genesis block, its number is 1.

Hash of the CLS: The initial CLS is calculated from the Token generation VUTs.

Hash of GSCs: The smart contracts that govern any given instance of a GeeqChain are created at its inception. The hash of each one is included in the genesis so that users and others wishing to audit can both verify and prove they are using the right code.

Name of Chain: This is the unique identifier of the GeeqChain instance.

Name of Token/Authority: Must be unique to identify token types form one another. Several types of account tokens could be created at once, however.

Token Form: Accounting or Unique

Chain Metadata: Optional. May include human readable rules, descriptions of functions or anything else. However, the actual operation of the chain (for example, whether it can accept tokens from other chains, transfer tokens off chain, the transactions fee structure, whether it will include data records or smart contacts) are determined by the GSCs that are hashed in the genesis block Full GSC Code: Including these serves as a guarantee that the contracts were easily available to users wishing to audit or to become a validating node.

Initiating blockchain entity Signature: Only Initiating blockchain entity can create a valid genesis block.

Token Generation VUT: This creates the set of initial tokens and determines who they belong to.

Genesis blocks are created by Initiating blockchain entity at the request of other companies wishing to build applications. This tight control has several motivations.

All instances of GeeqChain begin with a genesis block (block number 1). Blocks of validated transactions are created by nodes in the network and appended sequentially. Genesis blocks are created by Initiating blockchain entity at the request of other companies who wish to build applications. This tight control has several motivations.

It prevents duplication of chain, token, and controlling authority names.

It ensures that the chain adheres to the CDM protocol for transaction verification. SPS then makes it possible for federated GeeqChains to trust in the integrity of other ledgers and to accept tokens from other GeeqChains It fixes the rules under which the chain will operate. This is done by including copies of the GSCs in the genesis block. GeeqChains can be adapted to many purposes using different sorts of business logic for native tokens. While the rules for what makes a valid GeeqCoin transaction are universal to all federated chains, native tokens might be used to distribute votes, governing power, or profits, as rewards for users (as distinct from validating nodes), to tokenize real assets such as stocks, bonds and land titles, and so on. Users can verify that the rules are being followed by doing their own audits and verifications with the help of the GSCs written into the genesis block. Note that the business logic these contracts contain may also rely on data records written by uses into the chain in addition to token transactions.

The genesis block also contains pre-mined tokens and/or sets out the rules under which tokens can be created in the future. Users know going in exactly how the token economics will work as a result.

The business model of Initiating blockchain entity involves payment of GeeqCoins to Initiating blockchain entity accounts in various ways. These may include periodic fixed license fees, transaction fees, or small fees to update the ledger states, for example. These payments are automatic and built into the GSCs with the agreement of a client who wishes to start an instance of GeeqChain.

This might seem to give Initiating blockchain entity a great deal of power which could lead to potential abuses. However, once a genesis block is created, neither Initiating blockchain entity nor anyone else can alter it or the operation of the chain that uses it as a foundation. There is simply no mechanism that will allow this to happen. In addition, each instance of GeeqChain can produce only the type of tokens listed in the genesis block, and no other instance can produce the same token type. An implication of this is that only the original GeeqChain will produce GeeqCoin, and since these will all be pre-mined, no additional GeeqCoins can ever be created.

CLS: Current Ledger State (4000 with reference to FIG. 40) has:

Hash of Current Block and Hash of the Last CLS: The CLS is a function of the PTB and the CLS of the prevision block. Including the hashes allows the provenance and correctness the new CLS to be verified.

Current Hub: this is the public key of the hub that was responsible for coordinating this block.

XII. System and Method Features

Figures 41, 42:
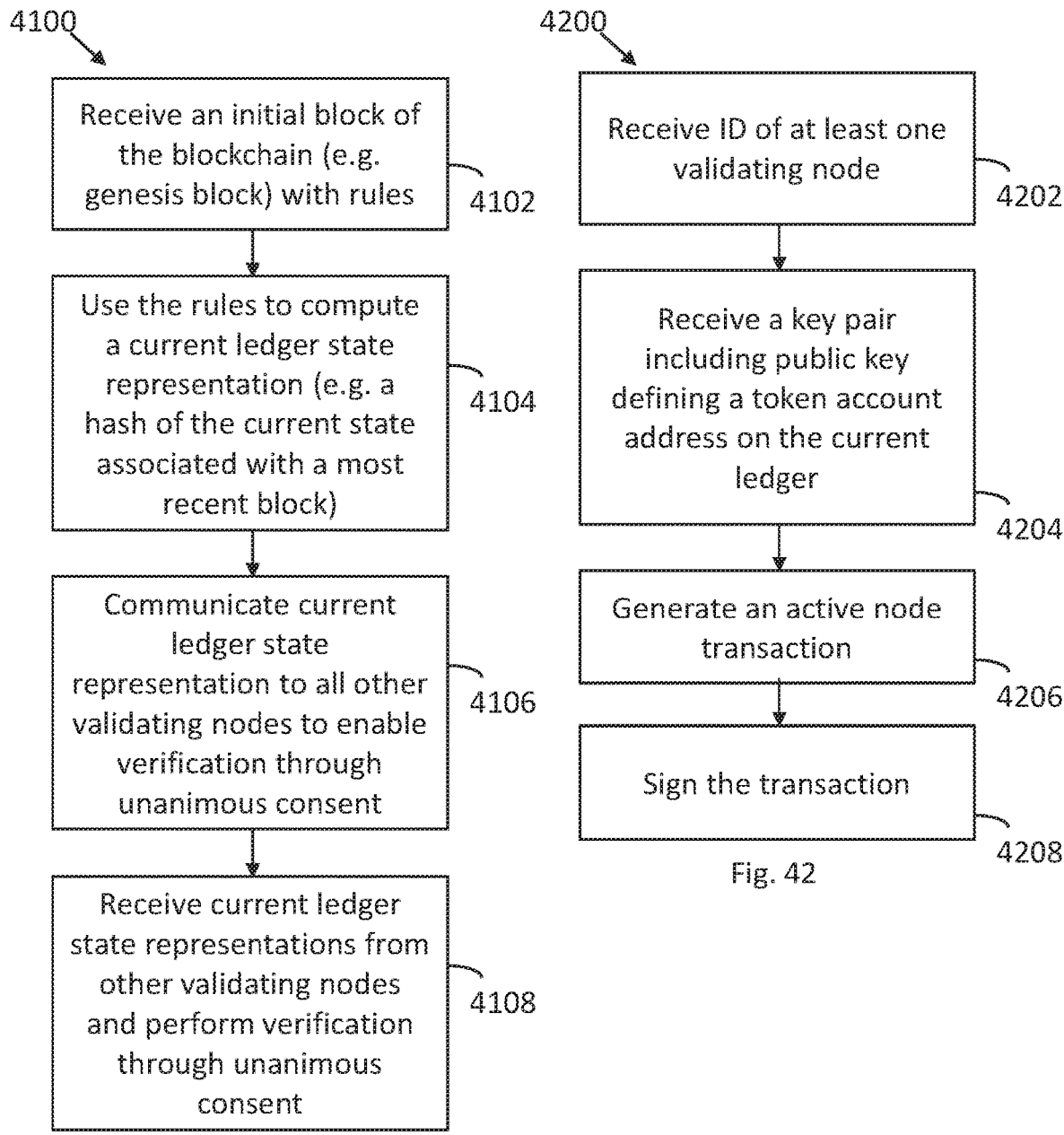

There is thus described a number of systems and methods with various features herein. For example, FIG. 41 illustrates a flowchart of operations 4100 showing a method to provide provable security within a computer network. The network comprises a plurality of validating nodes to validate transactions. The validating nodes include a first node (e.g. an arbitrary one of the validating nodes) and such nodes comprise computing devices. The computer network provides a database storing a blockchain comprising data stored in successive blocks and a current ledger derivable from the blockchain Operations of the method relate to the first node. At 4102, the first node receives an initial block of the blockchain (e.g. a genesis block). The initial block defines a plurality of rules (e.g. in the smart contracts as described herein) including: rules to establish and maintain an identification of the validating nodes; rules to communicate between the validating nodes; rules to process transactions by the validating nodes; and rules responsive to results of processing the transactions to: update respective instances of the current ledger maintained by each of the validating nodes; and define respective blocks to add to respective instances of the blockchain maintained by each of the validating nodes.

The plurality of rules provide that each of the validating nodes (including the first node) computes a respective current ledger state representation representing a state of the current ledger (e.g. a hash of the current ledger state) associated with a respective most recent block of the blockchain (which may be performed as operation 4104). The rules also provide that the respective current ledger state representations are communicated to each of the validating nodes to verify unanimous consent among all of the validating nodes that the state of the current ledger and the respective most recent block added by each of the validating nodes are the same at each of the validating nodes (which may be performed by the first node as operations 4106 and 4108).

It is noted that the current ledger state representation may be received in a bundle such as including transactions for processing. Thus operations 4104 in more detail (not shown) may comprise using the plurality of rules to: receive, in an aggregated bundle of transactions for potential inclusion in a respective next block of the blockchain, a) the respective current ledger state representation for each of the validating nodes and b) transactions generated or received by each of the validating nodes for processing; verify unanimous consent among all of the validating nodes, comparing the respective current ledger state representations as received with a respective current ledger state representation computed by the first node; process the transactions to produce validated transactions; prepare the respective next block, responsive to the validated transactions; add the respective next block to the blockchain maintained by the first node; update the current ledger maintained by the first node by applying the validated transactions; and compute a new one of the respective current ledger state representations from the current ledger.

The plurality of rules may include audit rules for initiating and performing an audit when a violation of the plurality of rules by at least one of the validating nodes is detected. Thus operations 4100 (e.g. 4104 in more detail when attempting to determine verification) may include (not shown), detecting at least one of the validating nodes is in violation; and initiating an audit in accordance with the audit rules.

Detecting at least one of the validating nodes is in violation may comprises one or more of:
- determining that one or more of the respective current ledger state representations is not the same as the one of the respective current ledger state representations computed by the first node; and
- determining that particular validating nodes are performing at least one of following in violation of the plurality of rules: communicating transactions or otherwise communicating with the computer network; processing transactions; generating transactions; splitting the computer network into two computer networks and two blockchain forks; and reintegrating two computer networks and two blockchain forks into one computer network and one blockchain.

The audit rules may provide for a penalty for a violating node from the plurality of validating nodes when results of the audit show the violating node is in violation. Each of the plurality of validating nodes may be mandated (e.g. by the rules) to post a performance bond comprising an amount of tokens transacted on the blockchain to a central system account and the penalty may comprise a forfeiture of at least some of the amount of tokens of the performance bond. The audit rules may provide for an incentive to the plurality of validating nodes to detect a violation and initiate an audit such as where the incentive includes a transfer of at least some tokens forfeited in response to penalty.

Operations may include using the plurality of rules to update the identification of validating nodes according to results of processing the transactions from the aggregated bundle.

The first node may generate new transactions, or receive requests for new transactions, to be processed by the validating nodes. Thus operations may include: generating or receiving or both generating and receiving transactions for processing by each of the validating nodes of the computer network; and communicating, in accordance with the plurality of rules, an aggregation of the transactions for processing by each of the validating nodes and the new one of the respective current ledger state representation computed by the first node in a node transactions bundle for aggregation with respective node transactions bundles from others of the validating nodes to define the aggregated bundle of transactions. The transactions for processing by each of the validating nodes that are received by the first node may be received either from respective computing devices providing respective user transactions for the blockchain or from other computing devices comprising nodes that provide active node transactions to become one of the validating nodes of the computer network (e.g. requests to participate). The rules to communicate between the plurality of validating nodes may include rules for the first node to: a) communicate the node transactions bundle; and b) receive the aggregated bundle of transactions; in accordance with a hub and spoke network topology applied to the computer network. For each block to be added, the plurality of rules (e.g. randomly or pseudo randomly) determine one or more hub nodes from the validating nodes, each other of the validating nodes defining spoke nodes, wherein the hub nodes receive respective node transactions bundles from the spoke nodes for aggregation into the aggregated bundle of transactions and communicate the aggregated bundle of transactions to the spoke nodes thereby to share the responsibilities and vulnerabilities of hub communications about the computer network. The plurality of rules may determine pseudo randomly in response to the new one of the respective current ledger state representations which of the plurality of validating nodes are the one or more hubs.

The respective node transactions bundles may be respectively signed by the validating nodes that originate the respective node transactions bundles and the aggregated bundle of transactions may be signed by the respective hub which originates the aggregated bundle of transactions.

Before communicating the node transactions bundle, the operations may use the plurality of rules to: perform initial verification of each transaction received from the respective user computing devices to define verified transactions, discarding any which cannot be verified; sign each verified transaction to generate respective transaction signatures; sign the node transactions bundle to generate a node transactions bundle signature; and include the respective transaction signatures, node transactions bundle signature and a public key of the first node with the verified transactions in the node transactions bundle. Operations may use the plurality of rules to wrap the node transactions bundle in a network communication wrapper including an identification of the first node, the hub, a network communication signature of the node transactions bundle and a public key for the network communication signature. Operations may use the plurality of rules to: generate certificates for recording a status of respective communications between the first node and user computing devices and first node and other nodes; and include such certificates as proof of proper communications in the node transactions bundle before the node transactions bundle signature is generated.

The plurality of rules may include rules to verify any signatures in the aggregated bundle of transactions, the respective node transactions bundles therein and the respective transactions in the respective node transactions bundles.

The user transactions received from respective computing devices may be defined by the respective computing devices in accordance with the plurality of rules received at the respective computing devices, the plurality of rules including rules defining a due diligence smart contract (DDSC) to prepare the user transactions for the computer network and to include a proof of due diligence for evaluation by a receiving node. The DDSC may require the respective computing devices to perform non trivial work, responsive to changes in the blockchain, and produce respective representations of the non-trivial work for communicating with the respective user transactions to provide the proof of due diligence. The plurality of rules may define rules for the respective computing devices to communicate user transactions to the nodes of the computer network using certificates to record proof of communications, where the rules for the respective computing devices to communicate user transactions define a NCSC, which NCSC signs also the communications and where the NCSC of the receiving node verifies the signing and verifies the proof of due diligence.

The aggregated bundle of transactions may comprise T user transactions that transfer tokens and that are provisionally individually processed as valid by the first node, where T is a count of such user transactions and N is a count of validating nodes. The operations may comprise using by the first node the plurality of rules to write T provisional token transactions to transfer transaction processing fees to a processing fee account from respective accounts associated with the T user transactions as a payment source and to write a further N provisional token transfer transactions to transfer tokens to N respective node accounts to share out the transaction processing fees from the processing fee account.

The operations may use the plurality of rules to process the T user transactions and the T+N provisional token transactions for collective validity, wherein each of the T user transactions and the T+N provisional token transactions transfers tokens out of respective accounts associated with the T user transactions and the T+N provisional token transactions and wherein a set of related transactions associated with a same account of the respective accounts are collectively valid if a balance of tokens available in the same account is sufficient to satisfy the set of related transactions.

The aggregated bundle of transactions may comprise other transactions than ones which transfer tokens. Operations may use the plurality of rules to: write additional provisional token transactions for at least some of the other transactions; and process the additional provisional token transactions with the T user transactions and the T+N provisional token transactions for collective validity.

Operations may use the plurality of rules to define a provisional transaction block comprising the validated transactions and define the respective next block for committing to the block chain. The respective next block may comprise the provisional transaction block, the aggregated bundle of transactions and zero or more of: a block number; a time stamp of the aggregated bundle of transactions; a hash of the provisional transaction block and the aggregated bundle of transactions; and a hash of a current ledger state computed for an immediately previous block.

One of the validated transactions may comprise a data transaction to add or modify data in the current ledger state, other than a transaction to transfer a token associated with an account, and operations may use the plurality or rules to process the data transaction and add or modify the current ledger state in response.

The plurality of rules may include rules to execute user smart contracts stored to the current ledger state and operations may use the plurality of rules to execute user smart contracts.

The plurality of rules may be defined as respective blockchain constating smart contracts to configure execution of a processing unit of the first node.

The initial block may contain pre-mined tokens and/or rules under which tokens are created.

FIG. 42 illustrates a flowchart of operations 4200 providing a method of generating and maintaining a computer network comprising a plurality of computing devices including a plurality of validating nodes to validate transactions. The computer network provides a database storing a blockchain comprising data stored in successive blocks and a current ledger derivable from the blockchain. Operations 4200 are performed by a first validating node (e.g. an arbitrary node) of the plurality of validating nodes. At 4202 operations receive an identification of at least one of the validating nodes of the computer network (e.g. to facilitate communication). At 4204 operations receive a key pair including a public key defining an address of a token account stored on the current ledger. At 4206 operations generate an active node transaction. The active node transaction defines a request to be one of the validating nodes, the active node transaction including the public key, an IP address associated with the first validating node and a request, explicit or implied, to transfer an amount of tokens from the token account to a performance bond account; and signing the active node transaction with a private key of the key pair. A plurality of rules of the computer network provide a penalty comprising a deduction of tokens from the performance bond account in forfeiture when a violation by the first computing node of the plurality of rules is detected and proved by any one of others of the plurality of validating nodes. Operations may communicate the transaction for processing by the computer network.

The plurality of rules may provide for a removal of the first computing node as one of the validating nodes when the violation by the first computing node is detected and proved.

Operations 4200 may comprise receiving by the first computing node an initial block of the blockchain (e.g. a genesis block). The initial block may define the plurality of rules such as described herein in accordance with operations 4100 at 4102.

The plurality of rules provide that each of the validating nodes computes a respective current ledger state representation representing a state of the current ledger (e.g. a hash of the current ledger state) associated with a respective most recent block of the blockchain (which may be performed as operation 4200). The rules also provide that the respective current ledger state representations are communicated to each of the validating nodes to verify unanimous consent among all of the validating nodes that the state of the current ledger and the respective most recent block added by each of the validating nodes are the same at each of the validating nodes (which may be performed as operations 4200).

Like in operations 4100, in operations 4200, the plurality of rules may include audit rules for initiating and performing an audit when a violation of the plurality of rules by at least one of the validating nodes is detected. The operations 4200 may comprise detecting at least one of the validating nodes is in violation; and initiating an audit in accordance with the audit rules. Detecting at least one of the validating nodes is in violation may comprise operations as previously described and incentive(s) may be as previously described.

Operations 4200 may comprise, in response to a network failure or other insufficient network communication capabilities in which the first computing node as a validating node is unable to communicate sufficiently to perform operations of an validating node in the computer network and upon resumption of sufficient network communications: communicating an active node transaction comprising a suspension request to one of the validating nodes to enter the first computing node into a suspended state; if necessary, obtaining one or more missing blocks from the blockchain of one of the validating nodes which one or more blocks are not stored by the first node; performing due diligence on the one or more missing blocks, if necessary, and an instance of the blockchain stored by one of the validating nodes to verify its correctness; if necessary, updating using the one or more missing blocks an instance of the blockchain and current ledger stored by the first computing node; and communicating an active node transaction comprising a reactivation request to one of the validating nodes to reactivate the first computing node into an active node state.

Operations 4200 may comprise receiving from another of the validating nodes an active node transaction comprising either a suspension request or a reactivation request; and processing then communicating the active node transaction as applicable in accordance with the plurality of rules to update each of the validating nodes.

The plurality of rules may include rules for the first computing node to, in accordance with a hub and spoke network topology applied to the computer network: aggregate originating transactions in a node transactions bundle, the originating transactions received for originating computing devices or generated by the first computing node for processing in a next block of the blockchain; communicate the node transactions bundle; and receive an aggregated bundle of transactions comprising node transactions bundles from all of the validating nodes for the next block. For each block to be added, the plurality of rules determine (e.g. randomly or pseudo randomly) one or more hub nodes from the validating nodes, each other of the validating nodes defining spoke nodes, where the hub nodes receive respective node transactions bundles from the spoke nodes for aggregation into the aggregated bundle of transactions and communicate the aggregated bundle of transactions to the spoke nodes thereby to share the responsibilities and vulnerabilities of hub communications about the computer network.

In response to a failure to communicate to a current one of the hubs by the first computing node, operations 4200 may comprise: choosing a new computer network by the first computing node in accordance with the plurality of rules; receiving a new hub message from a one of the validating nodes determined to be a new hub in the new network in accordance with the plurality of rules, the new hub message include proof that the current one of the hubs is offline; verifying the new hub in accordance with the plurality of rules; and continuing to receive, communicate and process transactions in accordance with plurality of rules, building on the instance of the blockchain maintained by the first computing node.

In response to a) the computer network splitting into a first and as second computer network in which the respective blockchain on each of the first and second computer network defines respective forks and b) the first and second network re-establishing communications, the operations may comprises invoking the plurality of rules defining a fork reintegration smart contract to evaluate an honesty of each of the respective forks; and in response to the honesty evaluation, reconciling transactions in both forks, block by block, to define a new set of blocks building the blockchain from a point at which the respective forks were established.

FIG. 43 illustrates a flowchart of operations 4300 showing a method to provide federated blockchains within a computer network where the network comprises a plurality of computing devices defining validating nodes to validate transactions. The validating nodes including a first node (e.g. an arbitrary node). The computer network provides a database storing a current ledger and a blockchain comprising data stored in successive blocks. Operations 4300 are in respect of the first node.

At 4302, operations receive an initial block of the blockchain (e.g. a genesis block), the initial block defining a plurality of rules. The plurality of rules may be as stated in respect of operations 4100 and further include rules to split the computer network and blockchain into two computer networks and two blockchains defining respective blockchain forks; and rules to reintegrate two computer networks and respective blockchain forks into one computer network and one blockchain. At 4304 operations use the rules to at least one of split the computer network and blockchain or reintegrate the two computer networks and respective blockchain forks.

The blockchain may store at least a first type of tokens with which to pay blockchain fees for processing transactions, where respective amounts of the first type of tokens are stored in association with respective accounts on the blockchain. Operations may perform such that when the blockchain is split into the respective blockchain forks, some of the respective accounts move to one of the respective blockchain forks and a remainder of the respective accounts move to the other of the respective blockchain forks thereby to move the respective amounts of the first type to each of the respective blockchain forks.

The blockchain may store a second type of tokens and/or other data where respective amounts of the second type of tokens and/or other data are stored in association with second respective accounts on the blockchain Operations may perform such that, when the blockchain is split into the respective blockchain forks, some of the second respective accounts move to one of the respective blockchain forks and the remainder of the second respective accounts move to the other of the respective blockchain forks thereby to move the respective amounts of the second type and/or other data to each of the respective blockchain forks.

The rules to split the computer network and blockchain may operate to assign respective validating nodes to the two computer networks in response to respective public keys of the respective validating nodes and assign respective user accounts to the respective blockchain forks in response to respective values (public keys) of the respective user accounts. Operations may perform such that any data and smart contracts are assigned in a like manner to user accounts.

The rules may operate to configure the first node to receive block splitting transactions from a respective hub node of the computer network comprising ranges of nodes, accounts and data items to be deleted from the identification of validating nodes where the respective blockchain and the respective current ledger is maintained by the first node.

Each validating node may comprise rules requiring each of the validating nodes to compute a respective current ledger state representation representing a state of the current ledger (e.g. a hash of the current ledger state) associated with a respective most recent block of the blockchain, the respective current ledger state representation communicated to each of the validating nodes to verify unanimous consent among all of the validating nodes that the state of the current ledger and the respective most recent block added by each of the validating nodes are the same at each of the validating nodes. The current ledger state representation may include an identification of the respective blockchain fork relative to the blockchain in accordance with a naming convention. Each of the two computer networks may have a respective hub node through which all of the other validating nodes communicate. The rules to reintegrate may operate to configure the hub node on each of the two computer networks to: communicate a notice to the respective hub node of another one of the two computer networks to suspend block generating and initiate a reintegration of the two computer networks and respective blockchain forks; communicate one or more sets of current ledger state representations from each respective blockchain to the respective hub node of the other one of the two computer networks for determining a common block (B) in the respective blockchains; determine a metahub node from the hub node of each of the two computer networks, the metahub node to receive all divergent blocks subsequent to the common block B from the respective hub node of the other of the two computer networks and the identification of all of the validating nodes communicating with the respective hub node of the other of the two computer networks; generate by the metahub node a reintegration aggregated transaction bundle from the divergent blocks subsequent to the common block B from both respective blockchain forks; and communicate the reintegration aggregated transaction bundle to the validating nodes of the two computer networks for processing to generate one computer network and one blockchain.

In accordance with any of the operations (e.g. 4100, 4200, 4300) the rules of the initial block may define rules for transferring tokens from the blockchain defining a first blockchain to a second blockchain, the second blockchain federated with the first blockchain by having a common set of rules for communicating and transferring tokens, the common set of rules on the first node operating to configure the first node to: receive a token chain transfer transaction from a requesting computing device, signed by a user having tokens on the first blockchain, the request identifying a second blockchain validating node to receive the tokens to be transferred; check and communicate the token chain transfer transaction to the computer network via a respective hub node of the computer network the hub node adding a token destruction transaction; process the token chain transfer transaction and token destruction transaction received from the hub node; and generate two validated transactions responsive to the processed token chain transfer transaction and token destruction transaction if validated and updating the respective next block of the first blockchain accordingly.

The first node may comprise a next hub node for processing transactions of a respective next block of the blockchain, the common set of rules may operate to configure the first node to: create an outgoing token transfer transaction responsive to the two validated transactions, communicating the outgoing token transfer transaction only to the second blockchain validating node. The common set of rules may operate to configure the first node to: receive from the second blockchain a notice of failure if the outgoing token transfer transaction fails a check on the second blockchain, the notice of failure communicated from the first node to the computer network via a next respective hub node to include as a data record in the next respective block following receipt from the second blockchain. The common set of rules may operate to configure the first node to: receive an outgoing token transfer transaction from the second blockchain; perform a check and respond with a notice if the check fails; if the check passes, convert the outgoing token transfer transaction to an incoming token transfer transaction; and communicate the incoming token transfer transaction to the computer network via a respective hub node for processing by each validating node to validate the incoming token transfer transaction and discard if not validated and, if validated, update the first blockchain and current ledger maintained by the first node.

The initial block of the second blockchain may comprises at least some rules (e.g. blockchain constating rules) which are different from the rules of the initial block of the first blockchain while having the common set of rules thereby to permit users to transfer tokens to the second blockchain with a different set of protocols from the first blockchain. The at least some rules may correct errors in the rules of the first blockchain Any of the rules may be implemented as smart contracts.

Each validating node may maintain a respective blockchain and respective current ledger and wherein each validating node comprises a plurality of rules requiring each of the validating nodes to compute a respective current ledger state representation representing a state of the current ledger (e.g. a hash of the current ledger state) associated with a respective most recent block of the blockchain, the respective current ledger state representation communicated to each of the validating nodes to verify unanimous consent among all of the validating nodes that the state of the current ledger and the respective most recent block added by each of the validating nodes are the same at each of the validating nodes.

FIG. 44 is a flowchart of operations 4400 showing a method for a user computing device to communicate transactions with a computer network comprising a plurality of validating nodes to validate transactions. The validating nodes comprise computing devices and the computer network provides a database storing a blockchain comprising data stored in successive blocks and a current ledger derivable from the blockchain. Each validating node processes transactions submitted to or generated by the computer network in accordance with rules to honestly maintain respective instances of the current ledger and the blockchain such that each respective instance is the same on each validating node. Each of the validating nodes stores respective instances of the current ledger and blockchain for public access. Operations are in respect of the user computing device.

At 4402 operations receive by the user computing device a client application defining a plurality of rules. The rules comprise: rules to establish and maintain an identification of the validating nodes; rules to communicate between the user computing device and the validating nodes; rules to process transactions by the validating nodes; rules to define transactions for communicating to the computer network for processing; and rules to identify transactions and data generated from processing such transactions from respective blocks stored to respective instances of the blockchain for public access.

At 4404 operations use the plurality of rules to identify honest validating nodes. Operations 4404 comprise: receiving one or more respective blocks of one respective instance of the blockchain and the current ledger associated with one of the validating nodes; validating the one or more respective blocks to identify as honest or dishonest the one of the validating nodes; and responsive to the validating to identify a dishonest one of the validating nodes, generating and communicating an audit transaction for processing by the computer network, the audit transaction requiring each validating node to audit a processing of transactions by the validating nodes to confirm honesty or dishonesty of particular validating nodes.

The rules to maintain honesty require each of the validating nodes to compute a respective current ledger state representation representing a state of the current ledger (e.g. a hash of the current ledger state) associated with a respective most recent block of the blockchain, the respective current ledger state representation communicated to each of the validating nodes to verify unanimous consent among all of the validating nodes that the state of the current ledger and the respective most recent block added by each of the validating nodes are the same at each of the validating nodes.

Operations 4400 may comprise identifying an honest one of the validating nodes and communicating the audit transaction to the honest one.

The user computing device may store or be coupled to a key pair for signing user transactions for processing by the computer network, the user transactions handling (e.g. storing or moving) tokens or data in association with a public key of the key pair in the blockchain and current ledger. Operations 4400 may comprise generating a particular user transaction; selecting a particular validating node identified as honest and sending the user transaction to the particular validating node. Operations use the rules to compute a proof of due diligence and communicate such proof with the particular user transaction for the particular validating node receiving the user transaction to confirm performance of due diligence. The proof of due diligence may comprise non-trivial work, responsive to changes in the blockchain, that produces respective representations of the non-trivial work for communicating with the user transaction to provide the proof of due diligence.

The computer network may have processed the transactions received or generated by the computer network so as to define at least two blockchains defining respective blockchain forks. Operations of the user computing device may determine as honest or dishonest a first validating node storing an instance of a first fork and as honest or dishonest a second validating node storing an instance of a second fork, thereby to enable a selection between the two blockchain forks.

There is also provided a system for performing the operations as described. The system may comprise a computing device. FIG. 45 is a block diagram of a simplified and representative computing device 4500 comprising a processing unit 4502, memory or other storage device (4504) coupled to the processing unit and a communication subsystem 4506 coupled to the processing unit to communicate with other computing devices of a network (e.g. of FIG. 1 or FIG. 2, etc. The processing unit may be a CPU, GPU, ASIC or other processing device. The memory or other storage device stores instructions (data) which when execute by the processing unit configures the computing device (hence the system) to perform the operations of a node of the computing network (e.g. a first node) as described. Similarly there is provided a user computing device comprising a processing unit, memory or other storage device coupled to the processing unit and a communication subsystem coupled to the processing unit to communicate with other computing devices of a network to perform the operations of the user computing device as described.

In addition to computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects stored herein.

XIII. GeeqChain Application and Validation Layers

GeeqChain architecture may include two separate blockchain layers—a validation layer and an application layer, each with their own blockchains and ledger states. The validation layer contains only GeeqCoin accounts for users and nodes and allows only simple accounting transactions. This minimizes potential attack surfaces and protects Geeq-Chains from contamination by dangerous smart contract code or having slanderous, racist, or copyrighted material written immutably into the ledger. The main purpose of the validation layer is to make payments to nodes for the validation and virtual machine services they provide to the application layer. GeeqCoin itself is a utility token that can be moved across all instances of GeeqChain and lubricates the transaction validation engine that is the foundation of the Geeqosystem.

The GeeqChain application layer is designed to give developers a flexible, secure, and efficient platform upon which to build out their visions. Applications can be written in a variety of programming languages and can include native tokens, arbitrary data objects, smart contracts, and any sort of business logic a use case requires. Applications can be configured to interoperate with one another or to firewall themselves off from the rest of the Geeqosystem. Each application may run on its own instance (or instances) of GeeqChain. This means that applications do not compete with one another for the computational resources provided by the validating node network.

The developer's applications are fixed by including them in the genesis block e.g. as application related rules. This allows users to know exactly what an application does and to independently verify that the rules are being honestly executed by the network of validators. Applications might include native tokens that are divisible and used for transactions, that tokenize property titles and so are not divisible, that represent ownership of automobiles and so can be created or destroyed by a DMV or other authority, and so on. Data objects of any type could be hashed and kept on the application layer ledger, could be kept off-chain in the InterPlanetary File System (IPFS) or other data storage solution, could be used as triggering events for smart contracts, etc. Applications could call on outside data-sources, have permissioning or encryption structures, or call on other applications though APIs.

Building in all of these possibilities would create a great deal of complexity and overhead that most developers would never need. Even if GeeqChain did so, it is unlikely we would be able to anticipate what features might be needed in the future. Thus, instead of attempting to build a Swiss army knife that tries to be all things to all users, GeeqChain creates a flexible application layer with its own customized blockchain that is independent of the underlying validation protocol. Developers can create exactly what they need without carrying elements for which they have no use.

The validation layer is kept simple, robust, and bulletproof. Users pay transactions fees to validating nodes to move GeeqCoins between accounts, for processing native token transactions, and for running smart contracts that live on the application layer.

The result is that the network of validators functions as a trustless virtual machine to run code written by application developers. Since applications live on their own instance (or instances) of GeeqChain, they do not compete for these services with other applications and so are protected from negative externalities if other applications happen to demand large amounts of computational effort from their own networks. Developers do not need to include code elements or functions that they do not use and this both streamlines applications and reduces potential attack surfaces. Finally, the underlying validation layer is protected from contamination by dangerous smart contract code or having slanderous, racist, or copyrighted material written immutably into the ledger.

Bitcoin, Ethereum, EOS, Stellar, and other major platforms are all built around a single instance of a blockchain They may connect to side chains, have lightning networks, or use bridge networks to interlink with other blockchains, allow smart contracts that include their own additional consensus systems, but they all ultimately depend on the validation network on the mother-chain for security. This creates a single point of failure as well as imposing a one size fits all solution to a greater or lesser extent. Applications built on such chains compete with one another for validation resources and transactions space in newly created blocks. This can lead to greater transactions costs and longer finality windows. In contrast, each federated instance of a Geeq-Chain has its own independent validation network. This implies that the size of the network and the block writing interval can be customized to the needs of each specific applications. An instance could also be configured to use quantum resistant signatures, stronger forms of data encryption, and custom permissioning layers if the extra computational cost was justified by an application. Other instances that do not have these requirements would not be forced to support them. The federated structure also keeps similar data in one place and separate from unrelated data. Public records for a given city would be kept on an entirely separate blockchain instance than medical records for a hospital or chain of custody records for prescription medications.

Flexibility

Federated chains can be structured to interoperate in a variety of ways. Different applications may choose to exchange applications layer tokens and data objects on any basis they wish. Applications may also choose not to interact with any others. GeeqCoins are always able to move across all instances of all applications within the validation layer. Applications each live on their own instances and have their own set of validators. They are not affected by actions, overhead, or demands of applications in the rest of the Geeqosystem. GeeqChain applications don't step on each other's toes.

XIV. Applications Specialized to Geeq's Architecture

IoT on Geeq

In this section, we discuss IoT on Geeq from the standpoint of implementation and describe a number of important use cases.

Enabling a Device for GeeqChain Telemetry Capture

IoT devices may be connected via PCS, WiFi, Zigbee, Bluetooth or even be wired. At some level, they must be configured to communicate with a router, hub, or other device. These communications may be structured to send and receive instructions, or simply to pass audio, video, and other sensor data. We will refer to this information collectively as telemetry.

Access to the device and the telemetry it creates may be permissioned through passwords or other authentication, and may be encrypted. To be of any value, however, some other device, which we will refer to as the hub, must be able to read and access the telemetry. The hub serves as the interface that connects the device to a GeeqChain.

While there are ongoing efforts to establish IoT telemetry and communications protocol standards, adoption is not widespread. Indeed, many devices communicate only with their manufacturers and do so in proprietary and oblique ways. Owners and users of such devices have little control over what their devices share, and are unlikely even to be aware of exactly what is being sent. This means that device makers will need to decide what part of the telemetry they receive from devices should be placed in the blockchain.

Connecting to instances of GeeqChain is relatively easy. Instances devoted to recording and certifying telemetry will do so through standardized transactions requests that device makers can create automatically and then send using a headless user client/API. In general, we would expect that data sent for inclusion in the GeeqChain would consist of hashes of raw telemetry that the device maker stores, makes public, or shares with the device owner. However, in some cases where telemetry has a small volume (a sensor recording of a level every few minutes or sending an alarm, for example) raw, unencrypted data might be included as well.

In practice, a device manufacture will have to go through the following steps:

1. Decide what constitutes a unit of data that needs to be recorded in the blockchain. For devices that create discrete data at regular or irregular intervals, the decision is probably obvious. On the other hand, for devices that create continuous telemetry data such as audio or video streams, EKG or other medical device data, level or pressure data, and so on, the stream might be cut into separate files every few minutes.

2. Decide whether to send encrypted or unencrypted data, or simply hashes of data kept elsewhere to GeeqChain.

3. Decide which instance of GeeqChain to use, register the device with the chain, and make a deposit of GeeqCoins on the chain to pay for its services. (Recall that different instances of GeeqChain are configured and optimized for different use cases.)

4. The device maker or user who registers the device with the GeeqChain would then be responsible for:

4.A. Authenticating to its satisfaction that the device is not compromised and is sending accurate telemetry. Man in the middle, MAC spoofing, and physical interference with the device are beyond the control of Geeq. If a user or maker transmits bad data to Geeq, it is simply recorded as having been attested to by the creator of the transaction.

4.B. Having good security protocols in place on the hub to maintain exclusive control of the private keys it uses to interact with the chain. If these are compromised, then GeeqCoins held in the account can be stolen and new transactions can be added to the chain containing false telemetry.

Regarding the decision to send hashes of data kept elsewhere, hashes are sometimes referred to as a "fingerprint" of a digital file. Running any file (e.g. the data thereof), regardless of length, through a hash function (such as SHA-256) returns a (256 bit) binary string (the hash) unique to the file and returns the same hash each time the hash function is applied to the same data. A data file may be stored elsewhere than the GeeqChain and the hash stored to the GeeqChain. Later, a data file may be verified by using the same hash function and comparing the result to the stored hash.

Use Case: Compliance and Liability

Recording real time, contemporaneous records, and then keeping them in a tamper-proof and secure way allows companies and others to inexpensively prove that they are in compliance with various regulations or that they followed correct procedures.

Medical monitors and devices: Blood pressure and EKG monitors, morphine drips, implantable or wearable biosensors, and so on, could write periodic hashes of their telemetry to the blockchain. If ways could be devised to credibly record the actions of health care providers, when they were taken, and by whom, it would be even better. This would create a real time record that would allow a hospital to prove that it followed procedure in the event of a bad medical outcome. It would not be possible to "lose" records or alter them by recording something in the chart that should have happened, but actually did not. It would also make it possible to identify the party responsible for any failure to follow procedures. The key is that the data is recorded in real time. Doctors and other hospital personnel would not know in advance what data they would like to censor or alter to protect themselves. To the extent that hospitals find it difficult to prove they are not guilty of malpractice because of the lack of a credible and complete medical history, this could limit liability and create significant value. On the other hand, to the extent that the lack of such data makes it difficult to prove malpractice, hospitals may not wish to create such records. In this case, it may be good public policy to change compliance regulations to force hospitals to keep auditable records in blockchain.

Infrastructure devices: Suppose that transformers, substations, water mains, gas pipelines, communications grids, roads, bridges, rail lines, dams, and so on, were instrumented to create useful data showing their performance, state of health, potential for failure, or actual failure. Suppose that real time records of maintenance performed on these systems could also be created. Putting this data in a public blockchain allows the agencies or companies responsible to prove that they have been good stewards. Power sometimes fails, but if the failure is due to a detectable problem or a lack of maintenance, then the power company might be liable. Similarly, train and auto crashes, failed or slow communications networks, fires that might have been started by transformers or gas leaks, etc. can crate liability which can be warded off with credible records.

Industrial and agricultural devices: Industrial and agricultural sensors can prove that companies and farmers are in compliance with OSHA, environmental and other regulations. They can also make it possible to show that correct remediation was undertaken if a problem was reported.

Use Case: Transparency and Accountability

Smart devices record all kinds of data. Owners of devices have no real idea what data is being collected or sent back to manufactures. As citizens, we also have a right to know what data our governments are collecting or producing in many cases. Secrecy is the beginning of tyranny. As the technological ability to collect and analyze data grows, it is even more vital that governments and corporations be as transparent as possible. Blockchain can help in many ways.

Video: Police dashboard cameras are widely deployed and body cameras are becoming more common. Recording hashes of 10 minute intervals of video as they are uploaded to servers for storage would give citizens assurance that the record has not been modified to protect misbehaving officers or to make citizens appear guilty of crimes. If metadata was included indicating the time the video was recorded and the context (by what officer, at what location, etc.) then citizens would also be able to know that relevant video existed and was not simply forgotten or erased. Note that this does not require that the video itself be automatically released. This decision could be made by policy or through courts. Knowing the video exists and has not be altered, however, is a necessary first step. The same model could be extended to traffic, security, and any other camera deployed by a government agency.

Official proceedings: Audio, video, and transcripts of court proceedings and legislative debates could receive the same treatment as outlined above.

Allocation of public services: Police vehicles, road repair equipment, snow removal equipment, etc. could be instrumented to record their location and perhaps some part of their activities. Placing these records in a public blockchain would allow citizens to know that government resources were being allocated fairly. Are certain neighborhood receiving too much or too little police attention? Has the pothole on your street been fixed or ignored? If it was ignored, was this selective and unfair? If it was fixed, how long did the fix last and what was the cost? This might require putting larger data payloads in a blockchains to fully describe the event in question, but it would not add a great deal of cost if GeeqChain is used. It might also require that data generated by humans instead of devices be included such as reports by repair crews or certifications by inspectors. These may be false, but this is true of the telemetry generated by devices as well. The point is that governments and government employees would be required to make real-time attestations regarding their actions. If these later proved to be false, the correct actors could be held accountable.

Public records: Land and car titles, certain tax and legal records, and licenses and permits are examples of records that the public has a right to know. Although some of this information might come from devices, most is generated by humans. Blockchain has two things to offer here. First, putting full copies of public records in an immutable and replicated blockchains gives the public easy and equal access to information they have a right to see. As it stands, getting such access often requires going to a specific office and requesting a specific record. This makes the information effectively invisible to the majority of the public. Second, it allows public records to be updated and amended in an externally verifiable way. As it stands, information brokers buy and aggregate such records and then sell access to facilitate background and credit checks. The problem is that brokers have little incentive to spend the effort to keep their data up-to-date and there is nothing a citizen can do to force the broker to remove inaccuracies. A citizen is unlikely to even know what this aggregated record contains. As a result, a person might be denied jobs, loans, or benefits because of an incorrect record of a DUI conviction, a lien, an unpaid student loan or other debt, or a court ruling. This might be due to new information the broker does not have, an identity theft, or even an error made by the agency that generated the data. When such records are keep current, visible, and accessible, citizens are able to find inaccurate data, get it corrected, and have it propagated.

More General Use Cases

The two-layered, federated architecture of GeeqChain makes it uniquely adaptable to almost any use case. For example: Tokenized trading of stocks, bonds, and other assets; Internal payment networks such as those used on college campuses; Tokenized transfers of land and automobile titles; Logistics chains and provenance verification; Interbank settlements; Distributed business processes such as real estate transactions, payments of medical and other insurance claims, and coordination of independent contractors and gig economy workers; Auctions and other two-sided markets (think Craigslist and ebay); Identity and credential verification; storing and sharing medical and educational records in privacy compliant ways; and storing and making available verifiable and immutable public records to improve transparency and responsiveness of government bodies and agencies at all levels.

In some of these examples, GeeqCoin would be needed to complete a secure but trustless transaction. For example, GeeqCoin might be held in escrow and transferred under smart contracts for interbank settlements, real estate transactions, or two-sided markets. In other cases, GeeqCoins would be needed to pay more substantial virtual machine fees to nodes for applications with complicated smart contracts. For example, smart contracts might automate business processes or coordinate permissioning to allow authorized agents to see private financial or medical records stored on external storage services such as IPFS. In all cases, nodes are required to post Good Behavior Bonds in Geeq-Coins to become validators. The amount of this stake is proportional to the value of the transactions, data, native tokens, or of what is represented by the native tokens on any given instance of GeeqChain.

Microtransactions on Geeq

GeeqCoins are a purely transactional cryptocurrency. Their primary use is to pay the validation networks for their services and allow validators to stake GBBs. GeeqCoins, however, could be used for any payment application. In addition to the high level of security and low transactions costs already discussed, the Geeq project uses an algorithmic monetary policy designed to reduce (but not completely eliminate) the volatility of GeeqCoin's value relative to dollars. This makes GeeqCoins an attractive vehicle for ordinary payments as well as micropayments.

Markets exist to take advantage of gains from trade. When one person values something more than another person, they can agree on a sales price that leaves them both better off. What happens when the gains from trade are on the scale of fractions of pennies? Markets in this case are only possible if transactions costs are less than potential gain. It makes no sense to pay five cents to complete a transaction that is only worth half a cent.

At present, there does not exist a good way to make micropayments. Credit cards have high, fixed transaction fees, and making small ACH payments from your bank account is difficult and risks exposing financial information. It was hoped the blockchain would provide a solution, but the most popular cryptocurrencies have high transactions costs, long finality windows, and are cumbersome to use. This is probably why almost all content on the web is provided for free, is funded by advertising (a kind of indirect micropayment) or is offered through subscriptions or in other bundles.

A browser plugin could be created and configured to capture the GeeqCoin account information from a vendor, such as a content provider, automatically. The plugin would connect to the user's GeeqChain client, and with the permission of the user, would create a stream of small payment transactions to the vendor from the user's GeeqChain account. Users would not have enter their credit card information and authorize a payment, as they do now. As a result, the user could stream small payments to the vendor for a long as the vendor was streaming services to the user.

Geeq micropayments enable the creation of entirely new markets and even new types of markets that would not be possible otherwise. Any kind of content, including streaming content or services can be purchased in almost any increment that the buyer and seller find mutually beneficial. Examples include: Spotify, Netflix, YouTube, podcast and any other streaming content service; lectures, webinars, live podcasts, video, and audio content created by individuals; on-line newspaper, magazine articles and other journalistic content, blogs, novels, political commentary, and every other kind of written content; live services such as tech support, medical or professional services, and mechanical turk services; and gaming by the minute and renting or buying useful items within a game.

As it stands, users must subscribe to streaming content and news services at relatively high monthly rates. This means that a user who wishes to listen to single song, watch a particular video or read an interesting story from the Wall Street Journal is out of luck. Major content providers like Netflix, Spotify and newspapers miss out on a great many potential sales when putting paywalls in front of content that require users to make an all or nothing purchase decision.

Individual content producers such as musicians, writers, photographers, visual artists, and video creators don't produce enough content to even offer subscriptions. As a result, they are forced to use platforms such as YouTube, SoundCloud, Shutterstock, and Etsy. These platforms impose their own rates of payment, promote content as they choose, and can also remove or censor content they don't like. Geeq micropayments allow creators and consumers to connect directly without a platform imposing rules or taking a cut. This could make it possible for talented creators to make a living and for consumers to have access to a much wider array of offerings.

New types of on-demand services also become practical. Users might be willing pay $0.25 or $0.50 a minute to get help with a computer problem, or get advice from a plumber, a nurse, or a tutor. Payments would stream until the help session was concluded. The user would avoid a service call or a doctor visit, and would not have to provide credit card information or subscribe to a service.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process.

What is claimed is:

1. A method to determine participation in a computer network comprising a plurality of validating nodes, including a first node and other validating nodes, the validating nodes comprising respective computing devices, each validating node of the computer network processing transactions to provide respective instances of a blockchain comprising data stored in successive blocks and a respective ledger state derivable from all of the successive blocks of the blockchain, the method comprising:

receiving, by the first node, active node list information;
 receiving, by the first node, active node status information;
 storing, by the first node, an active node list that comprises the active node list information and the status information;
 storing an instance of the blockchain;
 receiving, by the first node, a bundle of transactions to be processed from a hub node comprising one of the validating nodes;
 determining, by the first node, a next block of the successive blocks of the instance of the blockchain in accordance with the bundle of transactions as received for processing;

updating, by the first node, the ledger state for the instance of the blockchain stored by the first node in accordance with the bundle of transactions as received for processing;

verifying, by the first node, the ledger state as updated by the first node is the same as each respective ledger state as independently updated by each of the other validating nodes that process the bundle of transactions;

auditing, by the first node, a particular one of the other validating nodes in response to the verifying, the particular one of the other validating nodes having a respective ledger state that differs from the ledger state of the first node; and removing, by the first node, the particular one of the other validating nodes from the active node list in response to the auditing.

2. The method of claim 1, comprising committing, by the first node, the next block to the instance of the blockchain.

3. The method of claim 1 comprising communicating, by the first node, transactions to the hub node for inclusion in the bundle of transactions, wherein the transactions comprise one or more of:
a user transaction received from a blockchain user;
a node transaction received from a prospective validating node requesting to be included in the active node list as one of the validating nodes of the computer network; and
a transaction generated by the first node.

4. The method of claim 1 comprising determining, by the first node, which of the plurality of validating nodes is the hub node using the active node list and a hub choosing method.

5. The method of claim 4, wherein the step of determining the hub node determines that the first node is the hub node, and wherein the method comprises:
receiving transactions from any of the validating nodes in accordance with the active node list;
processing the transactions received to include in the bundle of transactions; and
communicating the bundle of transactions, for independent processing, to the validating nodes in accordance with the active node list.

6. The method of claim 1, wherein the blockchain comprises an initial block of the successive blocks, the initial block defining a genesis block storing a plurality of smart contracts comprising:
a active node smart contract for updating the active node list;
a communication smart contract to communicate between the validating nodes in accordance with the active node list;
a transaction processing smart contract to process transactions; and
a transaction results smart contract responsive to results of processing the transactions to:
define the next block to add to the instance of the blockchain; and
update the ledger state; and
wherein the method comprises, executing, by the first node, the plurality of smart contracts.

7. The method of claim 6, wherein an initial block of the successive blocks of the blockchain contains pre-mined tokens and/or one of the plurality of smart contracts comprises terms under which tokens are created, and wherein the method comprises, creating, by the first node, tokens in accordance with the terms, if present.

8. The method of claim 6, wherein auditing the particular one of the other validating nodes comprises determining that the particular one of the other validating nodes has committed a violation of any of the plurality of smart contracts.

9. The method of claim 8, wherein a violation comprises any one or more of:
communicating transactions or otherwise communicating with the computer network;
processing transactions;
generating transactions;
splitting the computer network into two computer networks and two blockchain forks; or
reintegrating two computer networks and two blockchain forks into one computer network and one blockchain; contrary to any of the plurality of smart contracts.

10. The method of claim 8, wherein the plurality of smart contracts comprises an audit smart contract to perform the auditing, and wherein the auditing smart contract provides for a penalty to be applied to the particular one of the other validating nodes in response to determining the violation and wherein the method comprises applying the penalty.

11. The method of claim 10, wherein the penalty is a forfeiture of at least some of an amount of tokens of a performance bond posted to ensure good performance by the particular one of the plurality of validating nodes.

12. The method of claim 7, wherein the plurality of smart contracts comprises an audit smart contract to perform the auditing, and wherein the audit smart contract provides for an incentive to the first node to initiate an audit to detect a violation, the incentive including a transfer of at least some tokens.

13. The method of claim 6 comprising:
generating or receiving or both generating and receiving, by the first node, transactions for processing by each of the validating nodes of the computer network;
communicating, by the first node, in accordance with the plurality of smart contracts, an aggregation of the transactions in a node transactions bundle for processing by each of the validating nodes; and
communicating a ledger state representation computed by the first node from the ledger state as updated by the first node to facilitate verification of the first node by each of the other validating nodes;
wherein the transactions as received by the first node and included in the node transactions bundle comprise transactions that are received by the first node either from respective computing devices providing respective user transactions for the blockchain or from other computing devices comprising nodes that provide active node transactions to become one of the validating nodes of the computer network.

14. The method of claim 13, wherein the step of receiving, by the first node, the bundle of transactions comprises receiving, by the first node, an aggregated bundle of transactions from the hub node, the aggregated bundle comprising respective node transactions bundles aggregated from the plurality of validating nodes in accordance with the plurality of smart contracts.

15. The method of claim 14 comprising:
confirming, by the first node, the aggregated bundle of transactions is signed by the respective hub which originates the aggregated bundle of transactions; and
confirming, by the first node, each of the respective node transactions bundles are respectively signed by the validating nodes which originate the respective node transactions bundles.

16. The method of claim 13 comprising, before communicating the node transactions bundle by the first node:
  performing, by the first node, initial verification of each transaction received from the respective computing devices providing user transactions to define verified user transactions, discarding any which cannot be verified;
  signing, by the first node, each verified transaction to generate respective transaction signatures;
  signing, by the first node, the node transactions bundle to generate a node transactions bundle signature; and
  including, by the first node, the respective transaction signatures, the node transactions bundle signature and a public key of the first node with the verified transactions in the node transactions bundle.

17. The method of claim 16, wherein the step of performing, by the first node, initial verification of the user transactions received from respective computing devices comprises verifying each transactions is defined by the respective computing device in accordance with a due diligence smart contract (DDSC) for preparing user transactions for the computer network, the DDSC requiring the inclusion of a proof of due diligence for evaluation by the first node.

18. The method of claim 17 comprising verifying, by the first node, that a respective user transaction received includes proof of due diligence in accordance with the DDSC, the due diligence comprising performance of non trivial work, responsive to changes in the blockchain, and the proof comprising a respective representation of the non-trivial work communicated with the respective user transaction.

19. The method of claim 17 comprising verifying, by the first node, each of: a certificate of proof of communication of the respective user transaction and a signature of the respective user transaction.

20. The method of claim 16 comprising wrapping, by the first node, the node transactions bundle in a network communication wrapper including an identification of the first node, the hub, a network communication signature of the node transactions bundle and a public key for the network communication signature.

21. The method of claim 16 comprising:
  generating, by the first node, certificates for recording a status of respective communications between the first node and user computing devices;
  generating, by the first node, certificates for recording a status of respective communications between the first node and other nodes; and
  including such certificates as proof of proper communications in the node transactions bundle before the node transactions bundle signature is generated.

22. The method of claim 1 wherein, the bundle of transactions comprises a plurality (T) of user transactions that transfer tokens, wherein N is a count of the plurality of validating nodes, and wherein the method comprises:
  processing, by the first node, the T user transactions to determine each are provisionally individually valid;
  writing, by the first node, T provisional token transactions to transfer transaction processing fees to a processing fee account from respective accounts associated with the T user transactions as a payment source; and
  writing, by the first node, a further N provisional token transfer transactions to transfer tokens to N respective node accounts to share out the transaction processing fees from the processing fee account.

23. The method of claim 22 comprising:
  processing, by the first node, the T user transactions and the T+N provisional token transactions for collective validity, each of the T user transactions and the T+N provisional token transactions transferring tokens out of respective accounts associated with the T user transactions and the T+N provisional token transactions; and
  wherein collectively validity comprises, determining, by the first node, that a set of related transactions associated with a same account of the respective accounts is collectively valid if a balance of tokens available in the same account is sufficient to satisfy the set of related transactions.

24. The method of claim 23, wherein the bundle of transactions comprises other transactions than ones which transfer tokens, and wherein the method comprises:
  writing, by the first node, additional provisional token transactions for at least some of the other transactions; and
  processing, by the first node, the additional provisional token transactions with the T user transactions and the T+N provisional token transactions for collective validity.

25. The method of claim 1, wherein the bundle of transactions comprises a user transaction to add or modify data in the ledger state, other than a transaction to transfer a token associated with an account, and wherein the method comprises, processing the user transaction to update the ledger state in response.

26. The method of claim 1, wherein the ledger state comprises a user smart contract, and wherein the method comprises executing, by the first node, the user smart contract to update the ledger state.

27. The method of claim 26, wherein the steps of verifying, auditing and removing are responsive to the ledger state as updated in accordance respective user smart contracts.

28. The method of claim 1, comprising making, by the first node, the ledger state available publicly.

29. A computer program product comprising a storage device storing instructions in a non-transitory manner, which instructions, when executed by a processing unit of a computing device, cause the computing device to:
  determine participation in a computer network comprising a plurality of validating nodes, including a first node and other validating nodes, the first node comprising the computing device and the other validating nodes comprising respective other computing devices, each validating node of the computer network processing transactions to provide respective instances of a blockchain comprising data stored in successive blocks and a ledger state derivable from all of the successive blocks, wherein to determine participation comprises:
    receiving, by the first node, active node list information;
    receiving, by the first node, active node status information;
    storing, by the first node, an active node list that comprises the active node list information and the status information;
    storing an instance of the blockchain;
    receiving, by the first node, a bundle of transactions to be processed from a hub node comprising one of the validating nodes;
    determining, by the first node, a next block of the successive blocks of the instance of the blockchain in accordance with the bundle of transactions as received for processing;

updating, by the first node, the ledger state for the instance of the blockchain stored by the first node in accordance with the bundle of transactions as received for processing;

verifying, by the first node, the ledger state as updated by the first node is the same as each respective ledger state as independently updated by each of the other validating nodes that process the bundle of transactions;

auditing, by the first node, a particular one of the other validating nodes in response to the verifying, the particular one of the other validating nodes having a respective ledger state that differs from the ledger state of the first node; and removing, by the first node, the particular one of the other validating nodes from the active node list in response to the auditing.

30. A computing device comprising a processing unit, memory or other storage device coupled to the processing unit, the memory or other storage device storing instructions, which when executed by the processing unit, cause the computing device to:

determine participation in a computer network comprising a plurality of validating nodes, including a first node and other validating nodes, the first node comprising the computing device and the other validating nodes comprising respective computing devices, each validating node of the computer network processing transactions to provide respective instances of a blockchain comprising data stored in successive blocks and a ledger state derivable from all of the successive blocks, wherein to determine participation comprises:

receiving, by the first node, active node list information;

receiving, by the first node, active node status information;

storing, by the first node, an active node list that comprises the active node list information and the status information;

storing an instance of the blockchain;

receiving, by the first node, a bundle of transactions to be processed from a hub node comprising one of the validating nodes;

determining, by the first node, a next block of the successive blocks of the instance of the blockchain in accordance with the bundle of transactions as received for processing;

updating, by the first node, the ledger state for the instance of the blockchain stored by the first node in accordance with the bundle of transactions as received for processing;

verifying, by the first node, the ledger state as updated by the first node is the same as each respective ledger state as independently updated by each of the other validating nodes that process the bundle of transactions;

auditing, by the first node, a particular one of the other validating nodes in response to the verifying, the particular one of the other validating nodes having a respective ledger state that differs from the ledger state of the first node; and removing, by the first node, the particular one of the other validating nodes from the active node list in response to the auditing.

\* \* \* \* \*